United States Patent
Ong

(10) Patent No.: US 8,339,529 B2
(45) Date of Patent: *Dec. 25, 2012

(54) PIXELS HAVING POLARITY EXTENSION REGIONS FOR MULTI-DOMAIN VERTICAL ALIGNMENT LIQUID CRYSTAL DISPLAYS

(75) Inventor: Hiap L. Ong, Diamond Bar, CA (US)

(73) Assignee: Hiap L. Ong and Kyoritsu Optronics Co., Ltd. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,807

(22) Filed: Sep. 12, 2011

(65) Prior Publication Data

US 2012/0002126 A1    Jan. 5, 2012

Related U.S. Application Data

(63) Continuation of application No. 12/018,675, filed on Jan. 23, 2008, now Pat. No. 8,018,537, which is a continuation-in-part of application No. 11/751,454, filed on May 21, 2007, now Pat. No. 8,107,030.

(51) Int. Cl.
*G02F 1/141* (2006.01)
*G09G 3/36* (2006.01)

(52) U.S. Cl. .............................. 349/37; 349/108; 349/48

(58) Field of Classification Search .................. 349/129, 349/106, 144, 37, 139, 143, 108, 145, 48; 430/7; 345/209, 96, 54, 88
See application file for complete search history.

(56) References Cited

U.S. PATENT DOCUMENTS 7,728,939 B2 * 6/2010 Tsai et al. ...................... 349/129
8,018,537 B2 * 9/2011 Ong ................................ 349/37

* cited by examiner

*Primary Examiner* — Thoi Duong
(74) *Attorney, Agent, or Firm* — Silicon Valley Patent Group, LLP.; Edward S. Mao

(57) ABSTRACT

A multi-domain vertical alignment liquid crystal display that does not require physical features on the substrate (such as protrusions and ITO slits) is disclosed. Each pixel of the MVA LCD is subdivided into color components, which are further divided into color dots. The color components include polarized extension regions that extend between color dots of neighboring color components (and neighboring pixels). The voltage polarity of the color dots and polarized extension regions are arranged so that fringe fields in each color dot causes multiple liquid crystal domains in each color dot. Specifically, the color dots and polarity extension regions of the display are arranged so that neighboring polarized elements have opposite polarities.

13 Claims, 43 Drawing Sheets

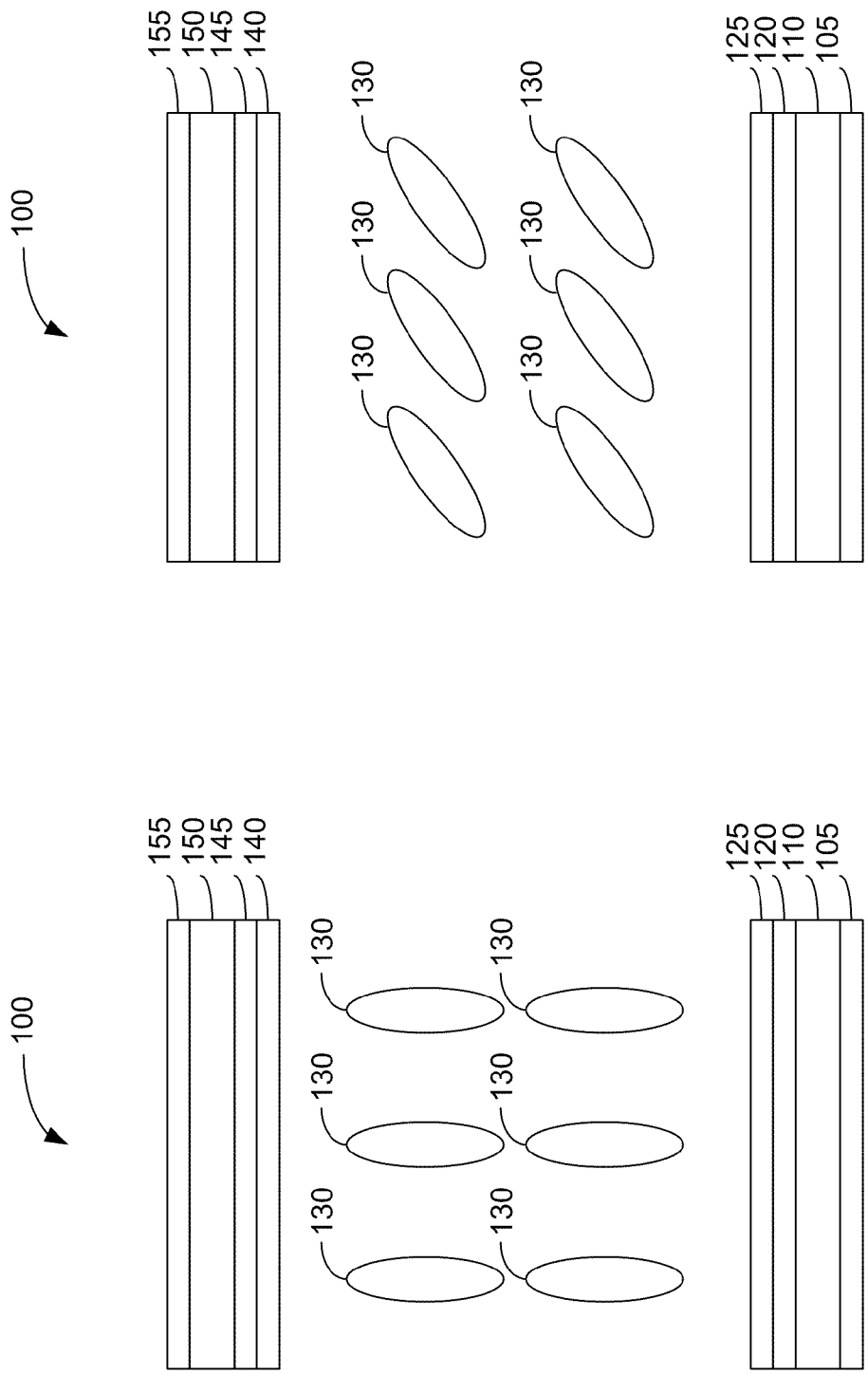

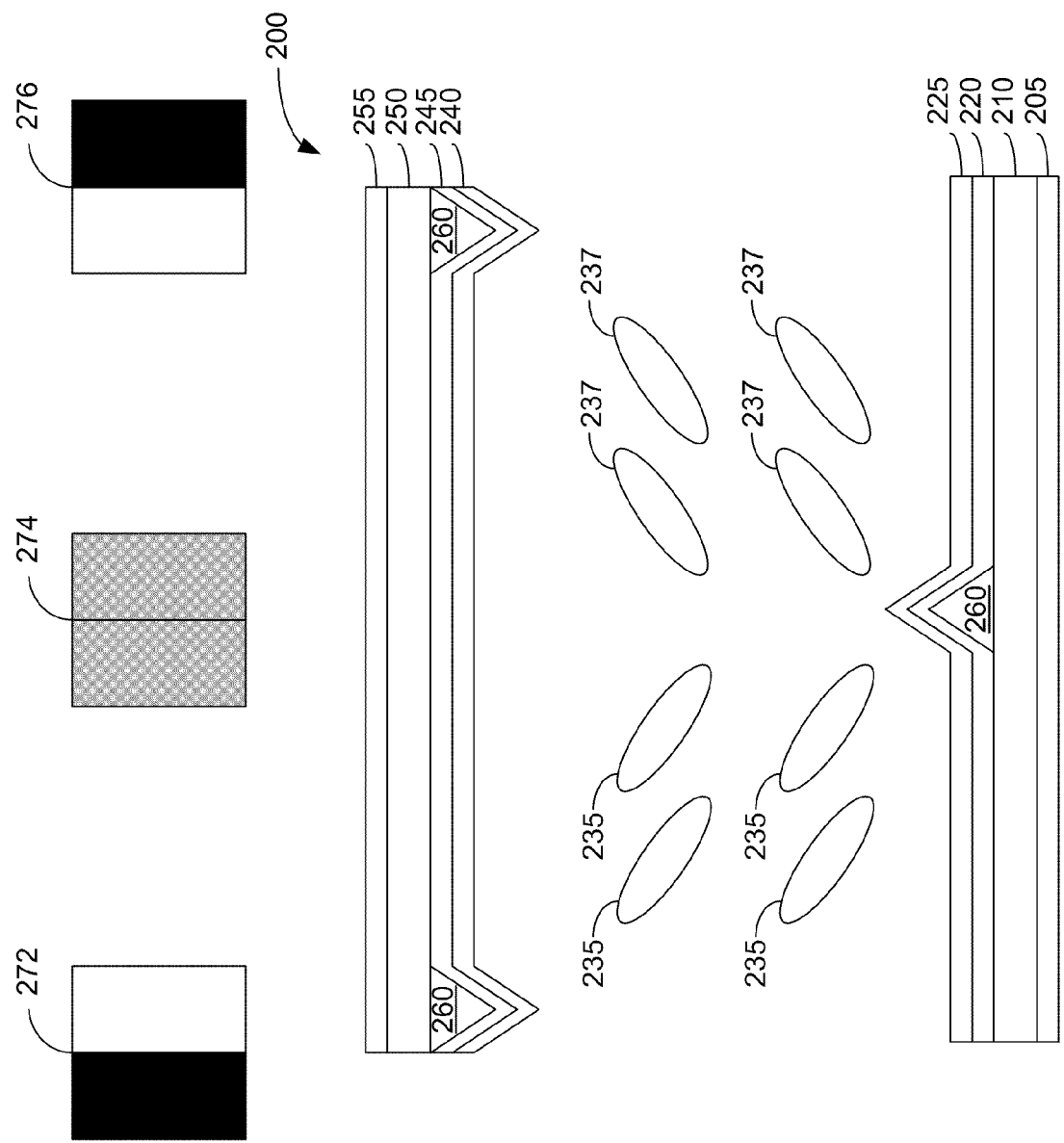

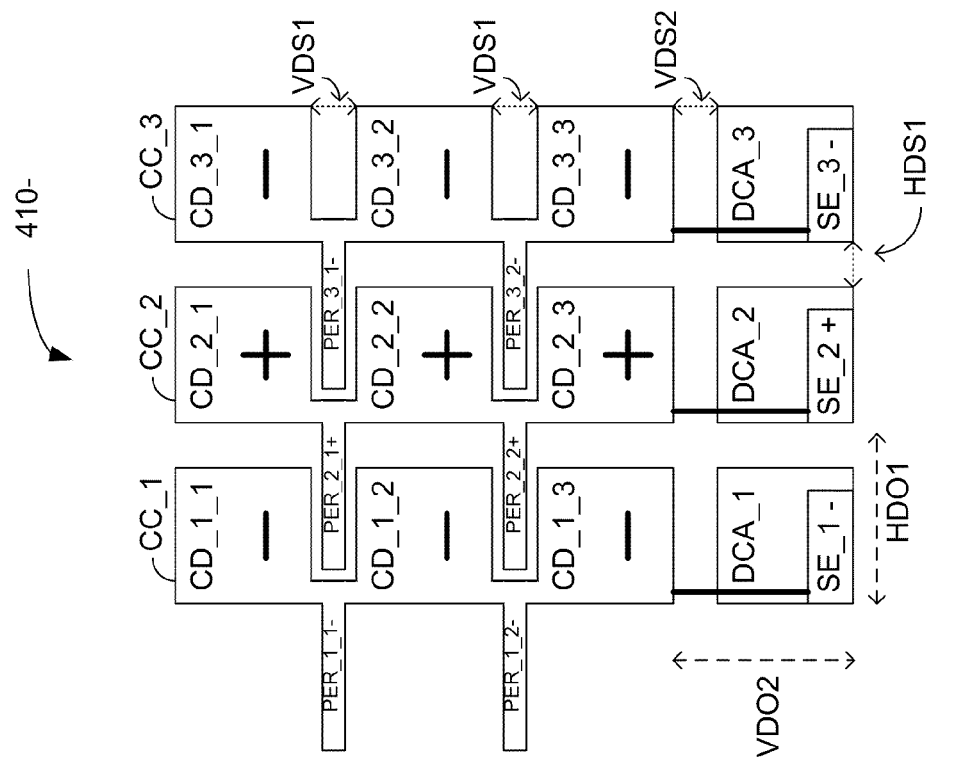
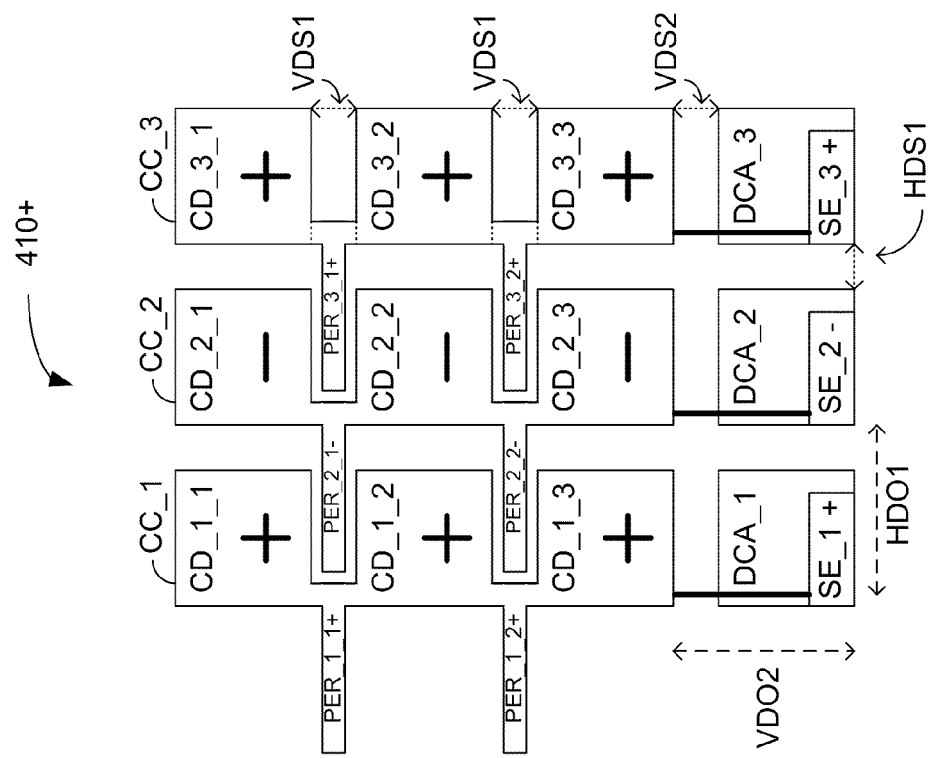

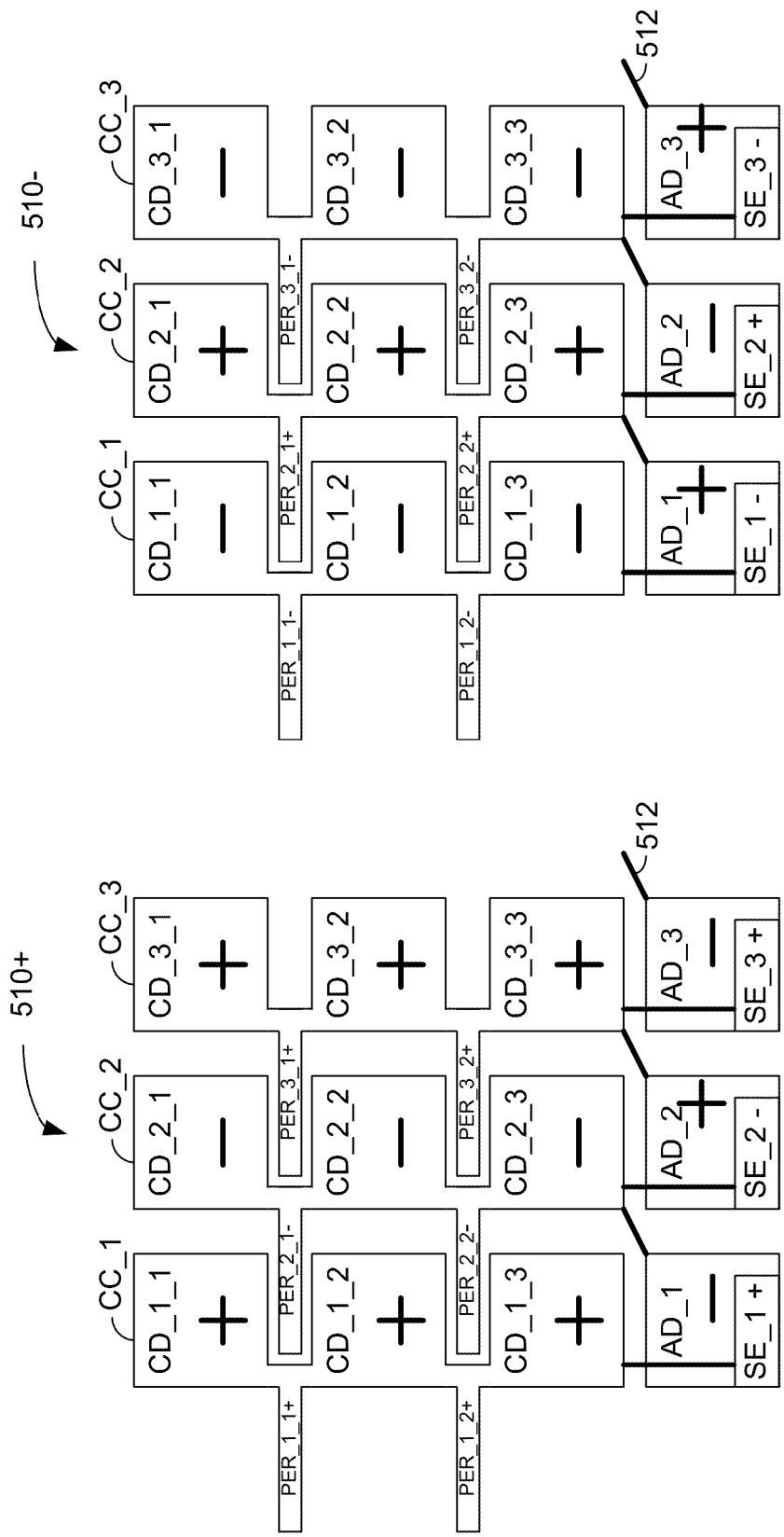

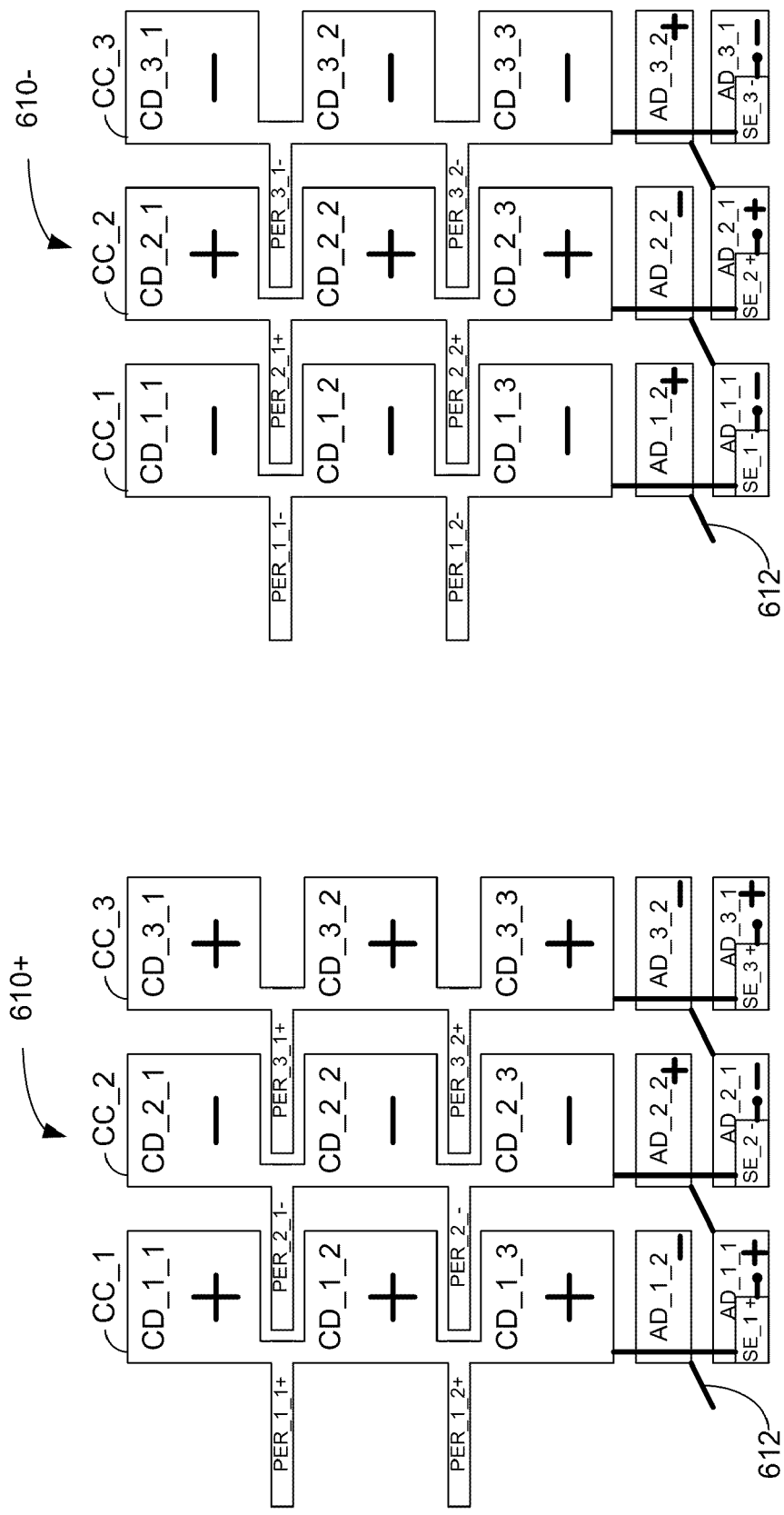

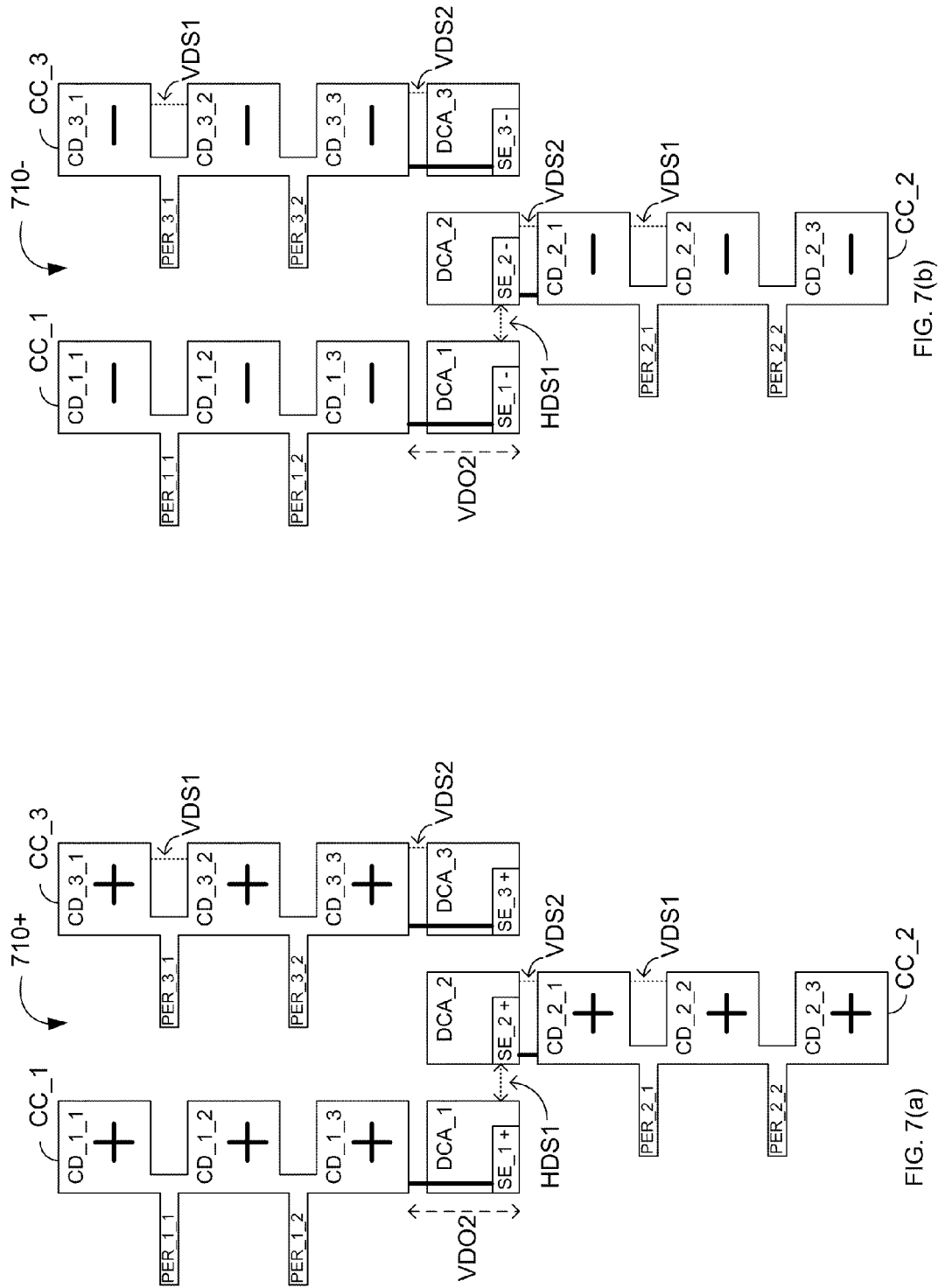

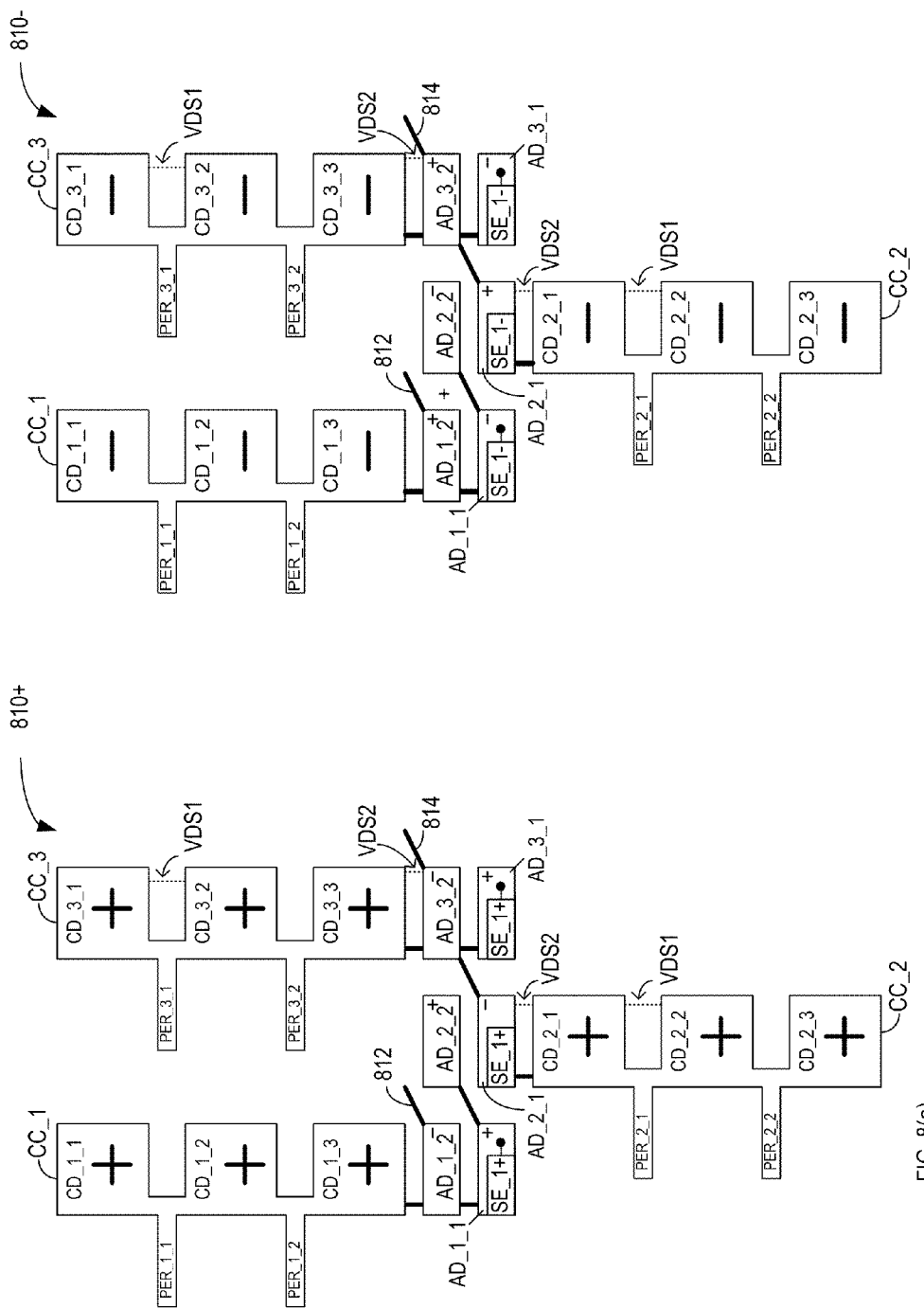

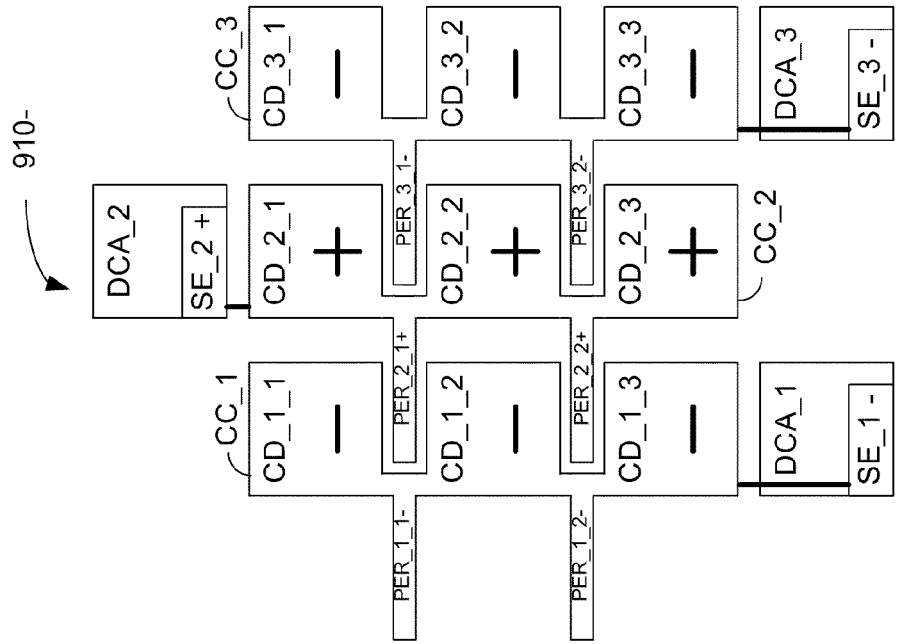
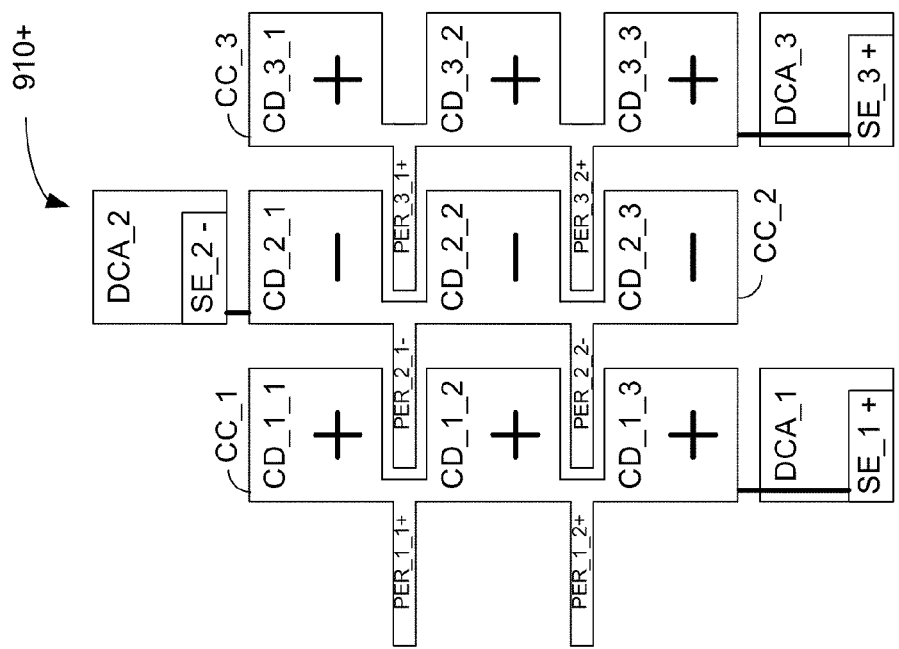
Fig. 9(b)
Fig. 9(a)

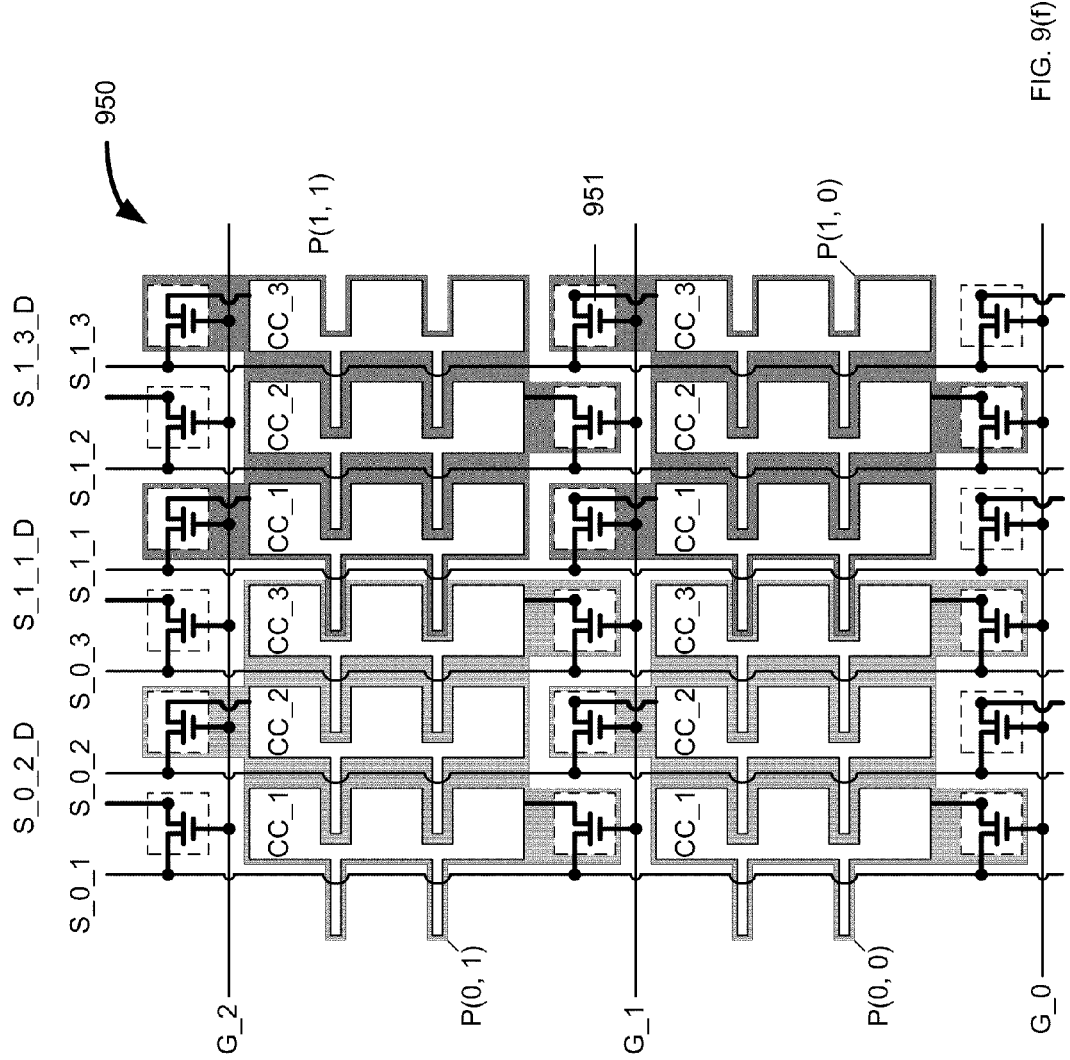

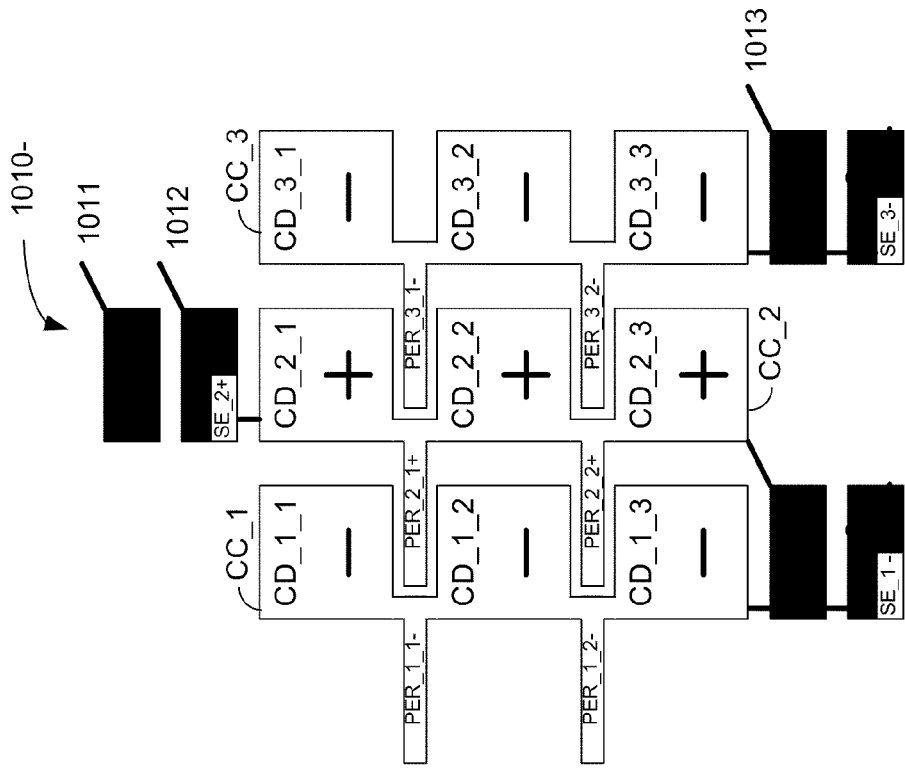
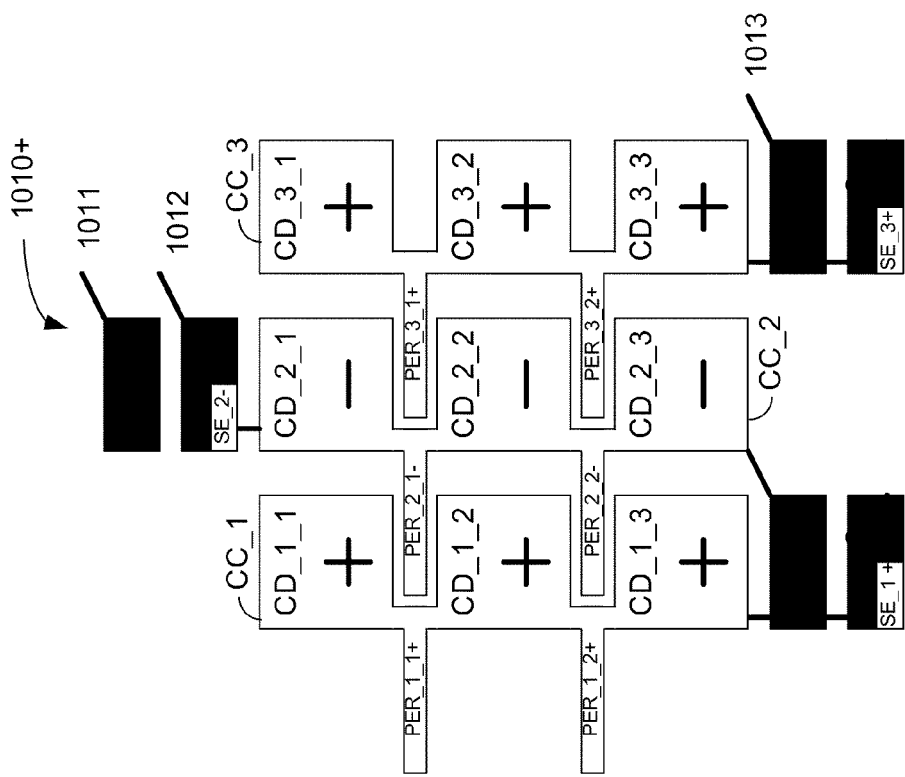
Fig. 10(b)
Fig. 10(a)

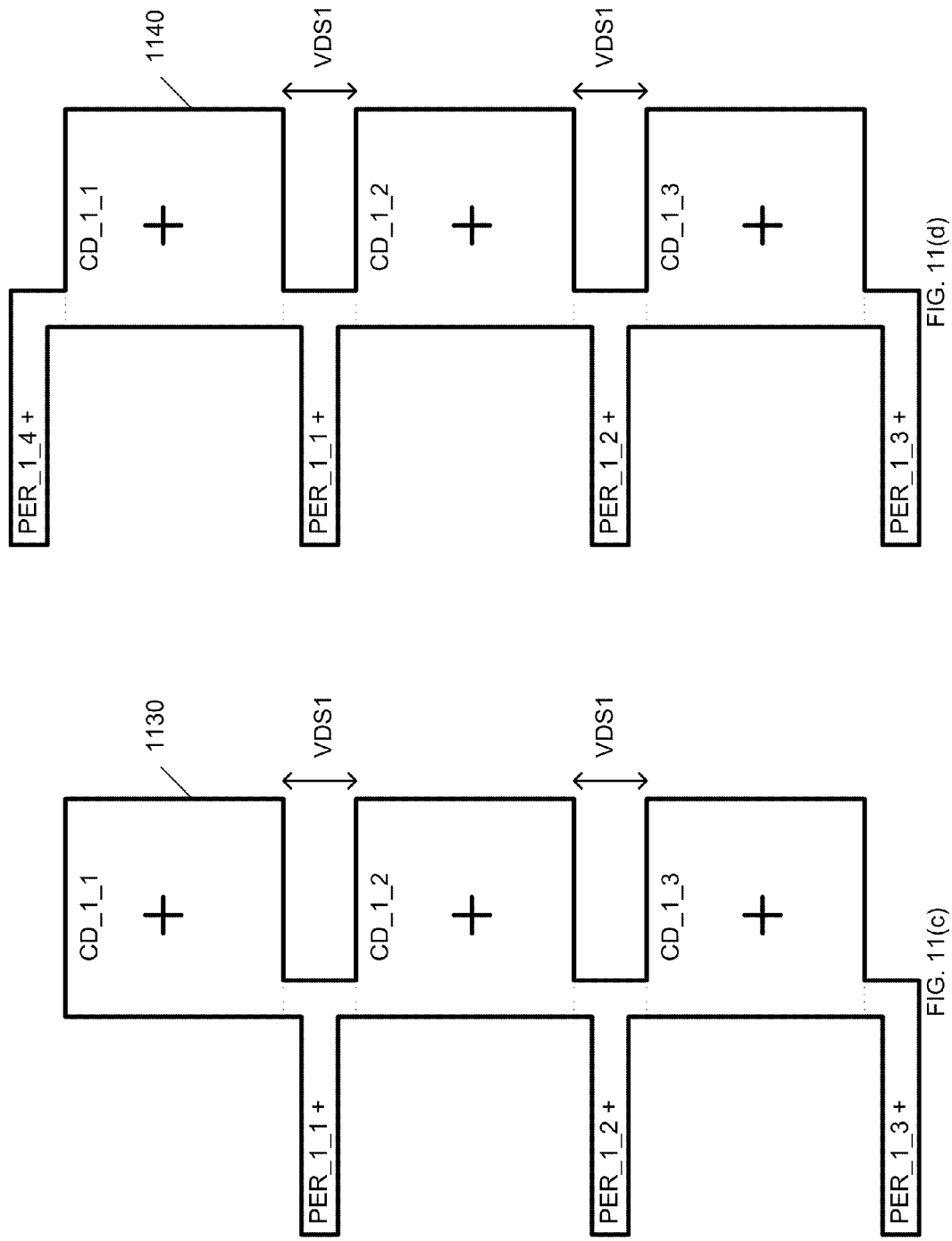

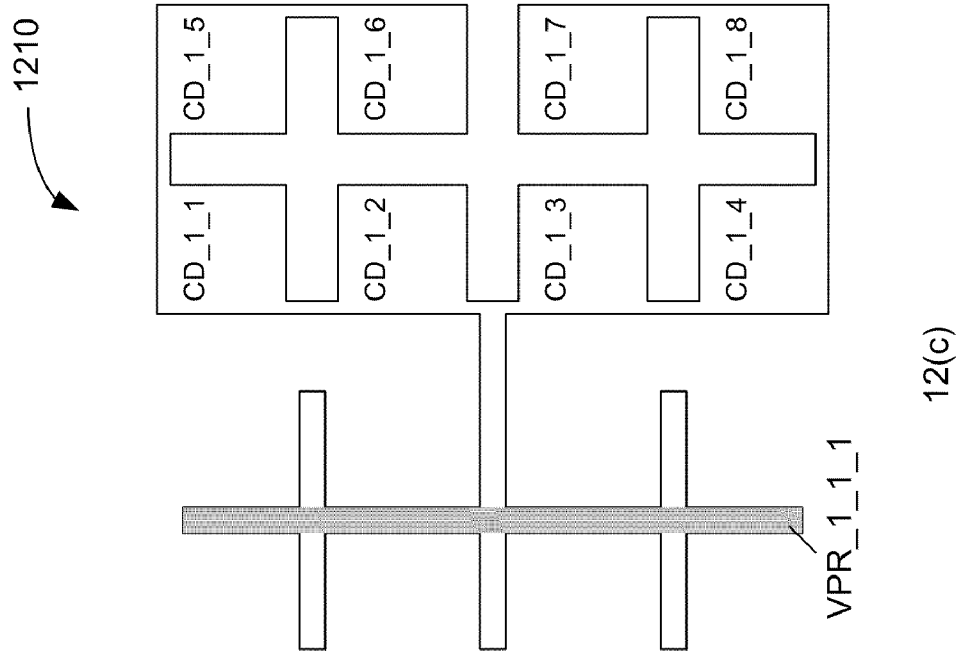
12(c)
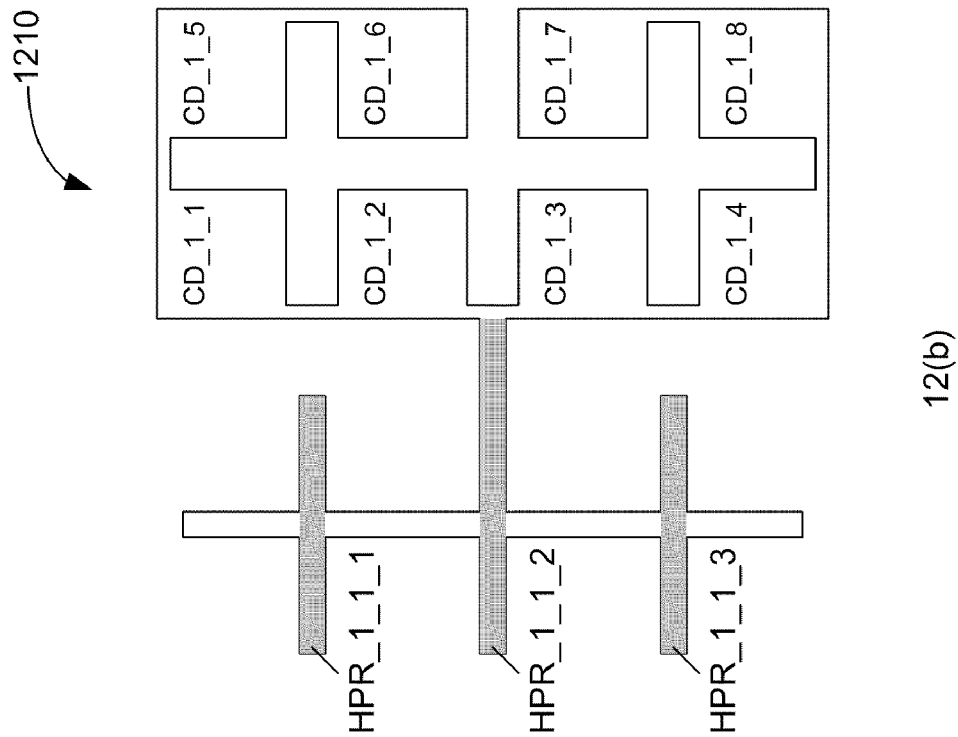
12(b)

PIXELS HAVING POLARITY EXTENSION REGIONS FOR MULTI-DOMAIN VERTICAL ALIGNMENT LIQUID CRYSTAL DISPLAYS

RELATED APPLICATIONS

The present application is a Continuation of and claims the benefit of U.S. Utility patent application Ser. No. 12/018,675 (Publication serial number US 2008/0291348 A1), entitled "Pixels Having Polarity Extension Regions for Multi-Domain Vertical Alignment Liquid Crystal Displays" by Hiap L. Ong, filed Jan. 23, 2008, which is incorporated herein in its entirety by reference. U.S. application Ser. No. 12/018,675 is a Continuation-In-Part of and claims the benefit of U.S. Utility patent application Ser. No. 11/751,454 (Publication serial number US 2008/0002072 A1), entitled "Pixels Using Associated Dot Polarity for Multi-Domain Vertical Alignment Liquid Crystal Displays" by Hiap L. Ong, filed May 21, 2007, which is incorporated herein in its entirety by reference. U.S. Utility patent application Ser. No. 11/751,454 claimed the benefit of U.S. Provisional Patent Application Ser. No. 60/799,815, entitled "Multi-domain vertical alignment liquid crystal display with row inversion drive scheme", by Hiap L. Ong, filed on May 22, 2006; U.S. Provisional Patent Application Ser. No. 60/799,815, entitled "Multi-domain Vertical Alignment liquid crystal display with row inversion drive scheme", by Hiap L. Ong, filed May 22, 2006; and U.S. Provisional Patent Application Ser. No. 60/799,843, entitled "Method To Conversion of Row Inversion To Have Effective Pixel Inversion Drive Scheme", by Hiap L. Ong, filed May 22, 2006.

BACKGROUND OF THE INVENTION

1. Field of the Invention

The present invention relates to liquid crystal displays (LCDs). More specifically, the present invention relates large-pixel multi-domain vertical alignment LCDs, which can be manufactured with smooth substrates.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays.

However, the primary drawback of conventional twisted nematic LCDs is the viewing angle is very narrow and the contrast ratio is low. Even the viewing angle of active matrixes is much smaller than the viewing angle for CRT. Specifically, while a viewer directly in front of an LCD receives a high quality image, other viewers to the side of the LCD would not receive a high quality image. Multi-domain vertical alignment liquid crystal displays (MVA LCDs) were developed to improve the viewing angle and contrast ratio of LCDs. FIGS. 1(a)-1(c) illustrate the basic functionality of a pixel of a vertical alignment LCD 120. For clarity, the LCD of FIG. 1 uses only a single domain. Furthermore, for clarity, the LCDs of FIGS. 1(a)-1(c) (and FIG. 2) described in terms of gray scale operation.

LCD 120 has a first polarizer 105, a first substrate 110, a first electrode 120, a first alignment layer 125, liquid crystals 130, a second alignment layer 140, a second electrode 145, a second substrate 150, and a second polarizer 155. Generally, first substrate 110 and second substrate 150 are made of a transparent glass. First electrode 120 and second electrode 145 are made of a transparent conductive material such as ITO (Indium Tin Oxide). First alignment layer 125 and second alignment layer 140, which are typically made of a polyimide (PI) layer, align liquid crystals 130 vertically in a resting state. In operation, a light source (not shown) sends light from beneath first polarizer 125, which is attached to first substrate 110. First polarizer 105 is generally polarized in a first direction and second polarizer 155, which is attached to second substrate 150, is polarized perpendicularly to first polarizer 105. Thus, light from the light source would not pass through both first polarizer 105 and second polarizer 155 unless the light polarization were to be rotated by 90 degrees between first polarizer 105 and second polarizer 155. For clarity, very few liquid crystals are shown. In actual displays, liquid crystals are rod like molecules, which are approximately 5 angstroms in diameter and 20-25 angstroms in length. Thus, there are over 12 million liquid crystal molecules in a pixel that is 120 μm width by 300 μm length by 3 μm height.

In FIG. 1(a), liquid crystals 130 are vertically aligned. In the vertical alignment, liquid crystals 130 would not rotate light polarization from the light source. Thus, light from the light source would not pass through LCD 100 and gives a completely optical black state and a very high contrast ratio for all color and all cell gap. Consequently MVA LCDs provide a big improvement on the contrast ratio over the conventional low contrast twisted nematic LCDs. However, as illustrated in FIG. 1(b), when an electric field is applied between first electrode 120 and second electrode 145, liquid crystals 130 reorientate to a tilted position. Liquid crystals in the tilted position rotate the polarization of the polarized light coming through first polarizer 105 by ninety degrees so that the light can then pass through second polarizer 155. The amount of tilting, which controls the amount of light passing through the LCD (i.e., brightness of the pixel), is proportional to the strength of the electric field. Generally, a single thin-film-transistor (TFT) is used for each pixel. However for color displays, a separate TFT is used for each color component (typically, Red, Green, and Blue)

However, the light passing through LCD 120 is not uniform to viewers at different viewing angles. As illustrated in FIG. 1(c), a viewer 172 that is left of center would see a bright pixel because the broad (light rotating) side of liquid crystals 130 face viewer 172. A viewer 174 that is centered on the pixel would see a gray pixel because the broad side of liquid crystals 130 is only partially facing viewer 174. A viewer 176 that is right of center would see a dark pixel because the broad side of liquid crystals 130 is barely facing viewer 176.

Multi-domain vertical alignment liquid crystal displays (MVA LCDs) were developed to improve the viewing angle problems of single-domain vertical alignment LCDs. FIG. 2 illustrates a pixel of a multi-domain vertical alignment liquid crystal display (MVA LCD) 200. MVA LCD 200 includes a first polarizer 205, a first substrate 210, a first electrode 220, a first alignment layer 225, liquid crystals 235, liquid crystals 237, protrusions 260s, a second alignment layer 240, a second electrode 245, a second substrate 250, and a second polarizer 255. Liquid crystals 235 form the first domain of the pixel and liquid crystals 237 form the second domain of the pixel. When an electric field is applied between first electrode 220 and second electrode 245, protrusions 260 cause liquid crystals 235 to tilt in a different direction than liquid crystals 237. Thus, a viewer 272 that is left of center would see the left domain (liquid crystals 235) as black and the right domain (liquid crystals 237) as white. A viewer 274 that is centered would see both domains as gray. A viewer 276 that is right of center would see the left domain as white and the right domain as black. However, because the individual pixels are small, all three viewers would perceive the pixel as being gray. As explained above, the amount of tilting of the liquid crystals is controlled by the strength of the electric field between electrodes 220 and 245. The level of grayness perceived by the viewer directly related to the amount of tilting of the liquid crystals. MVA LCDs can also be extended to use four domains so that the LC orientation in a pixel is divided into 4 major domains to provide wide symmetrical viewing angles both vertically and horizontally.

Thus, multi-domain vertical alignment liquid crystal displays, provide wide symmetrical viewing angles, however, the cost of manufacturing MVA LCDs are very high due to the difficulty of adding protrusions to the top and bottom substrates and the difficulty of properly aligning the protrusions on the top and bottom substrates. Specifically, a protrusion on the bottom substrate must be located at the center of two protrusions on the top substrate; any misalignment between the top and bottom substrates will reduce the product yield. Other techniques of using physical features to the substrates, such as ITO slits, which have been used in place of or in combination with the protrusions, are also very expensive to manufacture. Furthermore, the protrusions and ITO slits inhibit light transmission and thus reduce the brightness of the MVA LCDs. Hence, there is a need for a method or system that can provide multi-domain vertical alignment liquid crystal displays, without the need for difficult to manufacture physical features such as protrusions and ITO-slits, and without the need to have ultra precise alignment of the top and bottom substrates.

SUMMARY

Accordingly, the present invention provides an Amplified Intrinsic Fringe Field MVA LCD (AIFF MVA LCD) that does not require protrusions or ITO slits. Thus manufacturing of AIFF MVA LCDs in accordance with the present invention is less expensive than conventional MVA LCDs. Specifically, embodiments of the present invention use novel pixel designs that provide amplified intrinsic fringe fields to create the multiple domains in the AIFF MVA LCD. For example, in accordance with one embodiment of the present invention, pixels are sub-divided into color components, which include color dots (CDs) and polarity extension regions (PERs). Furthermore in some embodiments of the present invention, device component areas (DCAs), associated dots (AD) are formed where the switching elements and storage capacitors may be located by adding an electrode that can be electrically biased. In addition additional associated dots may be included in the pixels. In most embodiments of the present invention, the color dots, the polarity extension portions, and the associated dots (which are electrically biased) are arrange so that color dots are surrounded by neighboring elements (i.e. other color dots, polarity extension regions, and/or associated dots) having opposite polarity. Fringe fields in each color dot are amplified by the different dot polarities of neighboring elements. The amplified fringe fields of a color dot cause the liquid crystals inside the color dot to reorientate and tilt in different direction to form multiple crystal domains. In many embodiments of the present invention polarity extension regions and the associated dots are transparent to improve the contrast ration of the display.

In one embodiment of the present invention, a pixel includes a first color component with a first first-component color dot, a second first-component color dot that is adjacent to the first first-component color dot in a first dimension (e.g. vertical), and a first-first-component polarity extension region that is coupled to the first first-component color dot and the second first-component color dot. The first first-component polarity extension region extends beyond the first first-component color dot and the second first-component color dot in a second dimension (e.g. horizontal). The pixel also includes a second color component that includes a first second-component color dot, a second second-component color dot that is adjacent to the first second-component color dot in the first dimension (e.g. vertical), and a first second-component polarity extension region that extends beyond the first second-component color dot and the second second-component color dot. Furthermore, the first second-component polarity extension region extends between the first first-component color dot and the second first-component color dot.

The pixel further includes a first switching element coupled to the first color component and a second switching element coupled to the second color component. The switching elements are configured so that when the first switching element is at a first polarity (e.g. positive) the second switching is at a second polarity (e.g. negative). Thus, the first second-component polarity extension region has an opposite polarity as compared to the first first-component color dot and the second first component color dot. Therefore, the polarity arrangement amplifies the fringe field in the color dots. The amplified fringe fields of a color dot cause the liquid crystals inside the color dot to reorientate and tilt in different direction to form multiple crystal domains.

In a second embodiment of the present invention a display includes a first pixel and a second pixel. The first pixel includes a first first-pixel color component that includes a first first-pixel first-component color dot, a second first-pixel first-component color dot adjacent to the first first-pixel first-component color dot in a first dimension (e.g. vertical), and a first first-pixel first-component polarity extension region coupled to the first first-pixel first-component color dot and the second first-pixel first-component color dot. The first first-pixel first component polarity extension region extends beyond the first first-pixel first-component color dot and the second first-pixel first-component color dot along a second dimension (e.g. horizontal). The second pixel includes a first second-pixel color component that includes a first second-pixel first-component color dot, a second second-pixel first-component color dot adjacent to the first first-pixel first-component color dot in the first dimension (e.g. vertical), and a first second-pixel first-component polarity extension region coupled to the first second-pixel first-component color dot and the second second-pixel first-component color dot, wherein the first second-pixel first-component polarity extension region extends beyond the first second-pixel first-component color dot and the second second-pixel first-component color dot along a second dimension (e.g. horizontal). Furthermore, the first second-pixel first-component polarity extension region extends between the first first-pixel first-component color dot and the second first-pixel first-component color dot. The first pixel includes a first first-pixel switching element coupled to the first first-pixel color component. The second pixel includes a first second-pixel switching element coupled to the first second-pixel color component. The first first-pixel switching element and the first second-pixel switching element are configured to opposite polarity. Thus, the first second-pixel first-component polarity extension region has opposite polarity compared to the first first-pixel first-component color dot and the second first-pixel first-component color dot. This polarity arrangement amplifies the fringe field in the color dots which results in better MVA performance.

The present invention will be more fully understood in view of the following description and drawings.

BRIEF DESCRIPTION OF THE DRAWINGS

FIGS. 1(a)-1(c) are three illustrations of a pixel of a conventional single domain vertical alignment LCD.

FIG. 2 is an illustration of a pixel of a conventional multi-domain vertical alignment LCD.

FIGS. 4(a)-4(b) illustrate a pixel design in accordance with one embodiment of the present invention.

FIGS. 5(a)-5(b) illustrate a pixel design in accordance with one embodiment of the present invention.

FIGS. 6(a)-6(b) illustrate a pixel design in accordance with one embodiment of the present invention.

FIGS. 7(a)-7(b) illustrate a pixel design in accordance with one embodiment of the present invention.

FIGS. 8(a)-8(b) illustrate a pixel design in accordance with one embodiment of the present invention.

FIGS. 9(a)-9(b) illustrate a pixel design in accordance with one embodiment of the present invention.

FIG. 9(f) illustrates the source lines and gate lines of a liquid crystal display in accordance with one embodiment of the present invention.

FIGS. 10(a)-10(b) illustrate a pixel design in accordance with one embodiment of the present invention.

FIGS. 11(a)-11(g) illustrate color components for pixel designs in accordance with various embodiments of the present invention.

FIGS. 12(a)-12(b) illustrate a pixel design in accordance with one embodiment of the present invention.

FIG. 12(c) illustrates a pixel design in accordance with one embodiment of the present invention.

DETAILED DESCRIPTION

As explained above, conventional MVA LCDs are very expensive to manufacture due to the use of physical features, such as protrusions or ITO slits, for creating the multiple domains of each pixel. However, MVA LCDs in accordance with the principles of the present invention use fringe fields to create multiple-domains and do not require the use of physical features (such as protrusions or ITO slits) on the substrate. Furthermore, without the requirement of physical features the difficulty of aligning the physical features of the top and bottom substrate is also eliminated. Thus, MVA LCDs in accordance with the present invention are higher yield and less expensive to manufacture than conventional MVA LCDs.

Figure 1C:
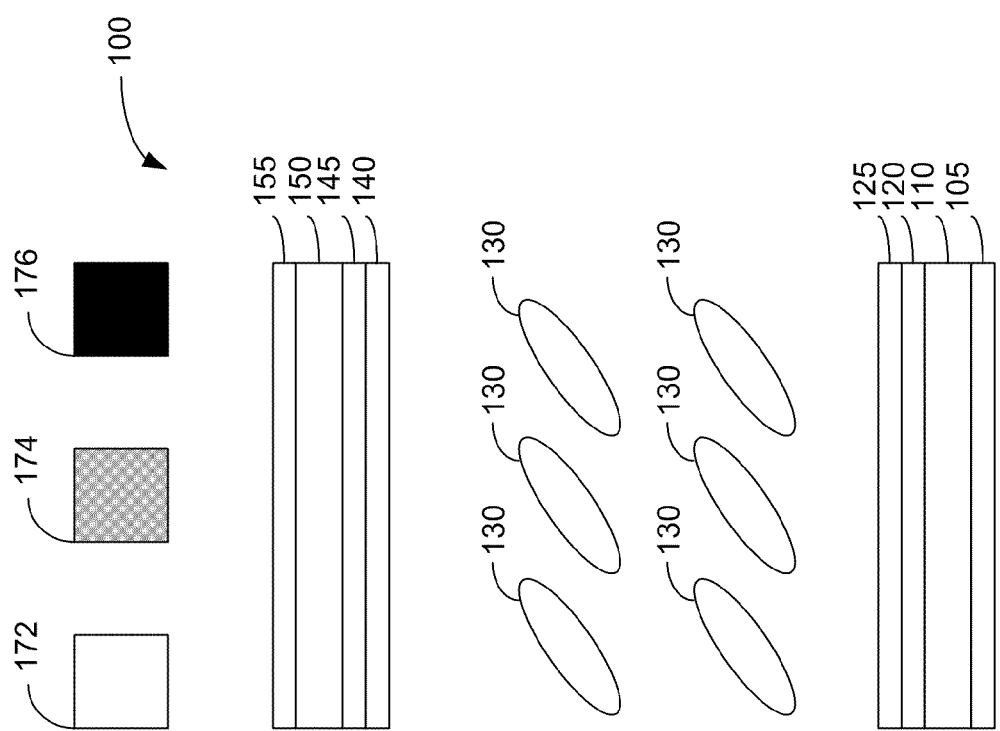
Figure 3A:
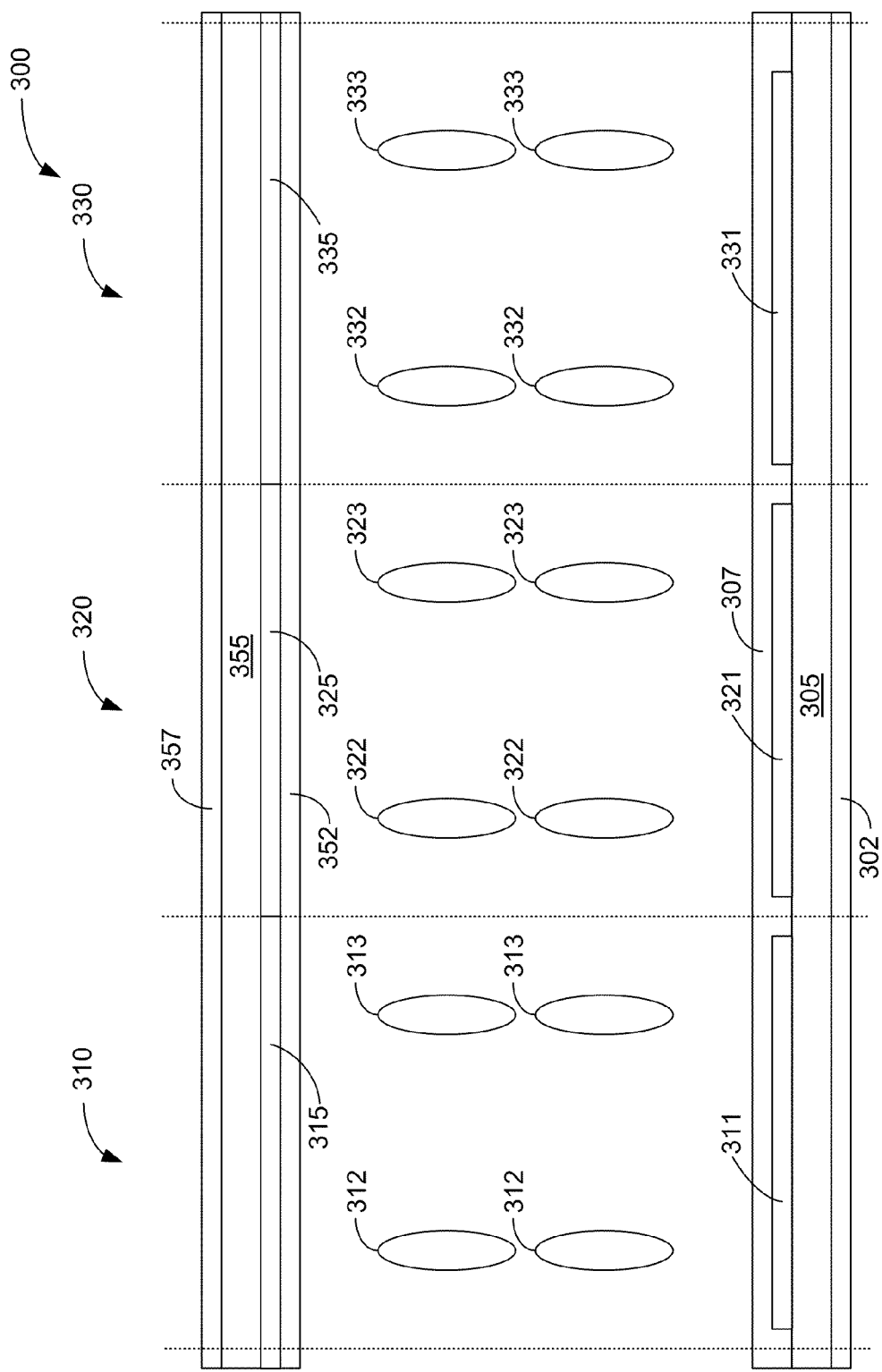
FIGS. 3(a)-3(b) illustrate a multi-domain vertical alignment liquid crystal display in accordance with one embodiment of the present invention.
Figure 3B:
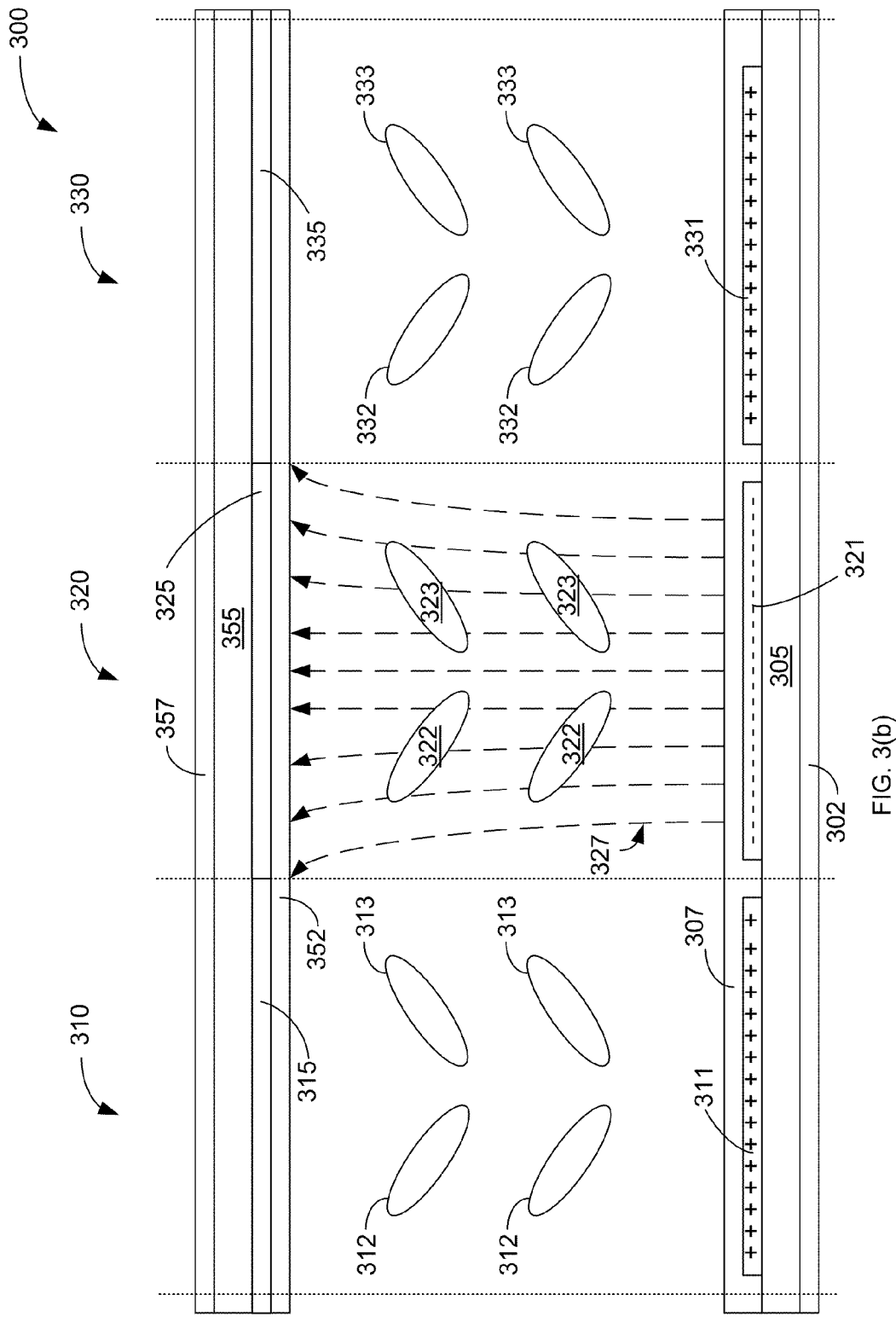

FIGS. 3(a) and 3(b) illustrate the basic concept used in accordance with the present invention to create a multi-domain vertical alignment liquid crystal display (MVA LCD) 300 without resorting to physical features on the substrates. Specifically FIG. 3 shows pixels 310, 320, and 330 in between a first substrate 305 and a second substrate 355. A first polarizer 302 is attached to first substrate 305 and a second polarizer 357 is attached to second substrate 355. Pixel 310 includes a first electrode 311, liquid crystals 312, liquid crystals 313 and a second electrode 315. Pixel 320 includes a first electrode 321, liquid crystals 322, liquid crystals 323 and a second electrode 325. Similarly, pixel 330 includes a first electrode 331, liquid crystals 332, liquid crystals 333 and a second electrode 335. The electrodes are typically constructed using a transparent conductive material such as ITO. Furthermore, a first alignment layer 307 covers the electrodes on first substrate 305. Similarly a second alignment layer 352 covers the electrodes on second substrate 355. Both LC alignment layers 307 and 352 provide a vertical LC alignment. As explained in more detail below, electrodes 315, 325, and 335 are held at a common voltage V_Com. Therefore, to ease manufacturing, electrodes 315, 325, and 335 are created as a single structure (as shown in FIGS. 3(a) and 3(b)). MVA LCD 300 operates pixels 310, 320, and 330 using alternating polarities. For example, if the polarities of pixels 310 and 330 are positive then the polarity of pixel 320 would be negative. Conversely, if the polarities of pixel 310 and 330 are negative then the polarity of pixel 320 would be positive. Generally, the polarity of each pixel would switch between frames, but the pattern of alternating polarities is maintained in each frame. In FIG. 3(a), pixels 310, 320, and 330 are in the "OFF" state, i.e. with the electric field between the first and second electrodes turned off. In the "OFF" state some residual electric field may be present between the first and second electrode. However, the residual electric field is generally too small to tilt the liquid crystals.

In FIG. 3(b), pixels 310, 320, and 330 are in the "ON" state. 3(b) uses "+" and "−" to denote the voltage polarity of the electrodes. Thus, electrodes 311, and 331 have positive voltage polarity and electrodes 321 has negative voltage polarity. Substrate 355 and electrodes 315, 325, and 335 are kept at common voltage V_com. The voltage polarity is defined with respect to the V_com voltage, where a positive polarity is obtained for voltages higher than V_com, and a negative polarity is obtained for voltage smaller than V_com. Electric field 327 (illustrated using field lines) between electrodes 321 and 325 causes liquid crystals 322 and liquid crystals 323 to tilt. In general, without protrusions or other features the tilting direction of the liquid crystals is not fixed for liquid crystals with a vertical LC alignment layers at 307 and 352. However, the fringe field at the edges of the pixel can influence the tilting direction of the liquid crystals. For example, electric field 327 between electrode 321 and electrode 325 is vertical around the center of pixel 320 but is tilted to the left in the left part of the pixel, and tiled to the right in the right part of the pixel. Thus, the fringe field between electrode 321 and electrode 325 cause liquid crystals 323 to tilt to the right to form one domain and cause liquid crystals 322 to tilt to the left to from a second domain. Thus, pixel 320 is a multi-domain pixel with a wide symmetrical viewing angle.

Similarly, the electric field (not shown) between electrode 311 and electrode 315 would have fringe fields that cause liquid crystals 313 to reorientate and tilt to the right in the right side in pixel 312 and cause liquid crystals 312 to tilt to the left in the left side in pixel 310. Similarly, the electric field (not shown) between electrode 331 and electrode 335 would have fringe fields that cause liquid crystals 333 to tilt to the right in the right side in pixel 330 and cause liquid crystals 332 to tilt to the left in the left side in pixel 330.

Alternating polarity of adjacent pixels amplifies the fringe field effect in each pixel. Therefore, by repeating the alternating polarity pattern between rows of pixels (or columns of pixels), a multi domain vertical alignment LCD is achieved without physical features. Furthermore, an alternating polarity checkerboard pattern can be used to create four domains in each pixel.

However, fringe field effects are relatively small and weak, in general. Consequently, as pixels become larger, the fringe fields at the edge of the pixels would not reach all the liquid crystals within a pixel. Thus, in large pixels the direction of tilting for the liquid crystals not near the edge of the pixels would exhibit random behavior and would not produce a multi-domain pixel. Generally, fringe field effects of pixels would not be effective to control liquid crystal tilt when the pixels become larger than 40-60 μm. Therefore, for large pixel LCDs a novel pixel division method is used to achieve multi-domain pixels. Specifically, for color LCDs, pixels are divided into color components. Each color component is controlled by a separate switching device, such as a thin-film transistor (TFT). Generally, the color components are red, green, and blue. In accordance with the present invention, the color components of a pixel are further divided into color dots.

The polarity of each pixel switches between each successive frame of video to prevent image quality degradation, which may result from twisting the liquid crystals in the same direction in every frame. However, the dot polarity pattern switching may cause other image quality issues such as flicker if all the switching elements are of the same polarity. To minimize flicker, the switching elements (e.g. are transistors) are arranged in a switching element driving scheme that include positive and negative polarities. Furthermore, to minimize cross talk the positive and negative polarities of the switching elements should be arranged in a uniform pattern, which provides a more uniform power distribution. Various switching element driving schemes are used by the embodiments of the present invention. The three main switching element driving schemes are switching element point inversion driving scheme, switching element row inversion driving scheme, and switching element column inversion driving scheme. In the switching element point inversion driving scheme, the switching elements form a checkerboard pattern of alternating polarities. In the switching element row inversion driving scheme, the switching elements on each row have the same polarity; however, each switching element in one row has the opposite polarity as compared to the polarity of switching elements in adjacent rows. In the switching element column inversion driving scheme, the switching elements on each column have the same polarity; however, a switching element in one column has the opposite polarity as compared to the polarity of switching elements in adjacent columns. While the switching element point inversion driving scheme provides the most uniform power distribution, the complexity and additional costs of switching element point inversion driving scheme over switching element row inversion driving scheme or switching element column inversion driving scheme may not be cost effective. Thus, most LCD displays for low cost or low voltage applications are manufactured using switching element row inversion driving scheme while switching element point inversion driving scheme is usually reserved for high performance applications.

Pixels in accordance with embodiments of the present invention include various key components arranged in novel arrangements to achieve high quality low cost display units. For example, pixel can include color components, color dots, polarity extension regions, switching elements, device component areas, and associated dots. The device component area encompasses the area occupied by the switching elements and/or storage capacitor as well as the area that was used to manufacture the switching elements and/or storage capacitors. For clarity, a different device component area is defined for each switching element.

Associated dots are polarized areas that are not part of the color components. In many embodiments of the present invention, associated dots covers the device component areas. For these embodiments, the associated dots are manufactured by depositing an insulating layer over the switching element and/or storage capacitors. Followed by depositing an electrically conductive layer to form the associated dot. The associated dots are electrically connected to specific switching element and or other polarized components (such as color dots). The storage capacitors are electrically connected to specific switching element and color dot electrodes to compensate and offset the capacitance change on the liquid crystal cells during the switching-on and switching-off processes of the liquid crystal cells. Consequently, the storage capacitors are used to reduce the cross-talk effects during the switching-on and switching-off processes of the liquid crystal cells. A patterning mask is used when it is necessary to form the patterned electrode for the associated dots. A color layer is added to form a light shield for the associated dot. In general, the color layer is black however some embodiments use different color to achieve a desired color pattern or shading. In some embodiments of the present invention, the color layer is manufactured on top or underneath the switching element. Other embodiments may also place a color layer on top of the glass substrate of the display.

In other embodiments of the present invention, the associated dot is an area independent of the switching elements. Furthermore, some embodiments of the present invention, have additional associated dots not directly related to the switching elements. Generally, the associated dot includes an active electrode layer such as ITO or other conductive layer, and is connected to a nearby color dot or powered in some other manner. For opaque associated dots, a black matrix layer can be added on the bottom of the conductive layer to form the opaque area. In some embodiments of the present invention, the black matrix can be fabricated on the ITO glass substrate side to simplify the fabrication process. The additional associated dots improve the effective use of display area to improve the aperture ratio and to form the multiple liquid crystal domains within the color dots. Some embodiments of the present invention use associate dots to improve color performance. For example, careful placement of associated dots can allow the color of nearby color dots to be modified from the usual color pattern.

Furthermore, the pixels in accordance with embodiments of the present invention include polarity extension regions within some of the polarized elements (e.g. color components, color dots, and/or associated dots) of the pixel. The polarity extension region of a first polarity extend between color dots of a second polarity to enhance the fringe fields of the color dots.

In general, the color dots, associated dots, and device component areas are arranged in a grid pattern and are separated from adjacent neighbors by a horizontal dot spacing HDS and a vertical dot spacing VDS. In some embodiments of the present invention multiple vertical dot spacings and multiple horizontal dot spacings may be used. Each color dot, associated dot, and device component area has two adjacent neighbors (e.g. color dots, associated dots, or device component areas) in a first dimension (e.g. vertical) and two adjacent neighbors in a second dimension (e.g. horizontal). Furthermore, two adjacent neighbors can be aligned or shifted (e.g. see FIG. 11(g)). Each color dot has a color dot height CDH and a color dot width CDW. Similarly, each associated dot has an associated dot height ADH and an associated dot width ADW. Furthermore, each device component area has device component area height DCAH and a device component area width DCAW. In some embodiments of the present invention, color dots, associated dots and device component areas are the same size. However in many embodiments of the present invention color dots, associated dots and device component areas could be of different size or shapes. For example in many embodiments of the present invention associated dots have a smaller height than color dots.

FIGS. 4(a) and 4(b) show different dot polarity patterns of a pixel design 410 (labeled 410+ and 410− as described below) that can be used in displays having a switching element point inversion driving scheme or a switching element column inversion driving scheme. In actual operation a pixel will switch between a first dot polarity pattern and a second dot polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Specifically, in FIG. 4(a), pixel design 410 has a positive dot polarity pattern (and is thus labeled 410+) and in FIG. 4(b), pixel design 410 has a negative dot polarity pattern (and is thus labeled 410−). Furthermore, the polarity of each polarized component in the various pixel designs are indicated with "+" for positive polarity or "−" for negative polarity.

Pixel design 410 has three color components CC_1, CC_2 and CC_3. Each of the three color components includes three color dots and two polarity extension regions. For clarity, the color dots are referenced as CD_X_Y, where X is a color component (from 1 to 3) and Y is a dot number (from 1 to 3). Similarly, the polarity extension regions are referenced as PER_J_K, where J is a color component (from 1 to 3) and K is a region number (from 1 to 2).

Figure 4C:
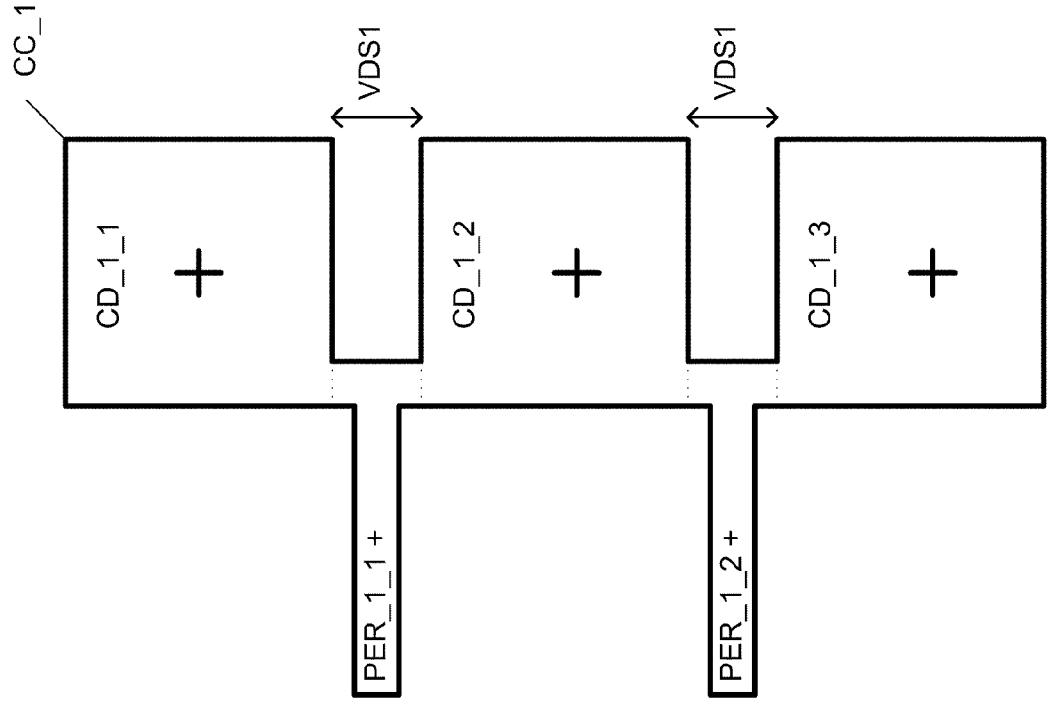
FIG. 4(c) is an enlarged view of a color component in accordance with one embodiment of the present invention.

Pixel design 410 also includes a switching element (referenced as SE_1, SE_2, and SE_3) for each color component. Switching elements SE_1, SE_2, and SE_3 are arranged in a row. Device component areas DCA_1, DCA_2, and DCA_3 are indicated around switching element SE_1, SE_2, and SE_3 respectively. Specifically, device component areas DCA_1, DCA_2, and DCA_3 also form a row and are separated by horizontal dot spacing HDS1. First color component CC_1 of pixel design 410 has three color dots CD_1_1, CD_1_2, and CD_1_3 and two polarity extension regions PER_1_1 and PER_1_2. FIG. 4(c) provides an enlarged view of color component CC_1. In FIG. 4(c), for clarity, dashed lines are used to illustrate a "border" between color dots and polarity extension regions. However, in most embodiments of the present invention the color dots and polarity extension regions share one continuous electrode to minimize manufacturing cost. However other embodiments of the present invention may use separate electrodes for each color dot and polarity extension region. As shown in FIG. 4(c), the color dots of color component CC_1 are aligned in a first dimension with polarity extension regions extending beyond the color dot in a second dimension. Specifically, the color dots are arranged in a column with each vertically adjacent color dot separated by a first vertical dot spacing VDS1. Color dot CD_1_1 is vertically adjacent to and above color dot CD_1_2 as well as being horizontally aligned with color dot CD_1_2. Color dot CD_1_2 is vertically adjacent to and above color dot CD_1_3, as well as being horizontally aligned with color dot CD_1_3. Polarity extension regions PER_1_1 and PER_1_2 extend to the left of color dots CD_1_1, CD_1_2, and CD_1_3. Polarity extension regions PER_1_1 and PER_1_2 have a rectangular shape with a height that is less than vertical dot separation VDS1 and a width that is approximately one color dot width CDW. In general, the height of polarity extension regions is 4-6 micrometers and the width is 4-6 micrometers less than the color dot width. For example in one embodiment of the present invention, a color dot has a width of 43 micrometers, a height of 47 micrometers and the polarity extension regions have a width of 37 micrometers and a height of 6 micrometers. Polarity extension region PER_1_1 is vertically centered between color dot CD_1_1 and CD_1_2. Polarity extension region PER_1_2 is vertically centered between color dots CD_1_2 and CD_1_3. Returning to FIG. 4(a), color component CC_1 is arranged so that color dot CD_1_3 is horizontally aligned with device component area DCA_1 and vertically offset from device component area DC_1 by a vertical dot offset VDO2 so that color dot CD_1_3 is vertically separated from device component area DCA_1 by vertical dot spacing VDS2. Vertical dot offset VDO2 as used herein refers to the distance which causes the "offset" dots to be vertically separated by vertical dot spacing VDS2 and thus is dependent on the color dot height, associated dot height and/or device component area height. For example if the color dot height is equal to the associated dot height the vertical dot offset is equal to the color dot height plus the vertical dot spacing. In general, to improve the optical transmission of a pixel, vertical dot spacing VDS2 is much smaller than the color dot heights. Horizontal dot offset HDO1 is used similarly for horizontal offsets i.e. so that offset dots horizontally separated by horizontal dot spacing HDS1. In general, to have symmetrically amplified fringe field effects, the vertical dot spacing is equal to the horizontal dot spacing for the color dot. "Above" and "below" denote positioning in the plane of the page. The electrode(s) in color component CC_1 is coupled to switching element SE_1. Generally, the electrodes and conductors are formed a transparent conductive material such as ITO (Indium Tin Oxide).

Second color component CC_2 of pixel design 410 has three color dots CD_2_1, CD_2_2, and CD_2_3 and two polarity extension regions PER_2_1 and PER_2_2. The color dots of color component CC_2 are also arranged in a column with each adjacent color dot being separated by vertical dot spacing VDS1. Specifically, Color dot CD_2_1 is vertically adjacent to and above color dot CD_2_2 as well as being horizontally aligned with color dot CD_2_2. Color dot CD_2_2 is vertically adjacent to and above color dot CD_2_3, as well as being horizontally aligned with color dot CD_2_3. Polarity extension regions PER_2_1 and PER_2_2 extend to the left of color dots CD_2_1, CD_2_2, and CD_2_3. Polarity extension regions PER_2_1 and PER_2_2 have a rectangular shape with a height that is less than vertical dot separation VDS1 and a width that is approximately one color dot width CDW. Polarity extension region PER_2_1 is vertically centered between color dot CD_2_1 and CD_2_2. Polarity extension region PER_2_2 is vertically centered between color dots CD_2_2 and CD_2_3. Color component CC_2 is arranged so that color dot CD_2_3 is horizontally aligned with device component area DCA_2 and offset vertically above device component area DCA_2 by a vertical dot offset VDO2 so that color dot CD_2_3 is vertically separated from device component area DCA_2 by vertical dot spacing VDS2. Furthermore, color component CC_2 is vertically aligned with color component CC_1 and horizontally offset from color component CC_1 by horizontal dot offset HDO1 so that color dot CD_2_1 is separated from color dot CD_1_1 by horizontal dot spacing HDS1. This placement of second color component CC_2 places polarity extension region PER_2_1 in between color dots CD_1_1 and CD_1_2 and places polarity extension region PER_2_2 in between color dots CD_1_2 and CD_1_3. The electrode of color component CC_2 is coupled to switching element SE_2.

Third color component CC_3 of pixel design 410 has three color dots CD_3_1, CD_3_2, and CD_3_3 and two polarity extension regions PER_3_1 and PER_3_2. The color dots of color component CC_3 are also arranged in a column with each adjacent color dot being separated by vertical dot spacing VDS1. Specifically, the color dots are arranged in a column with each vertically adjacent color dot separated by a first vertical dot spacing VDS1. Color dot CD_3_1 is vertically adjacent to and above color dot CD_3_2 as well as being horizontally aligned with color dot CD_3_2. Color dot CD_3_2 is vertically adjacent to and above color dot CD_3_3, as well as being horizontally aligned with color dot CD_3_3. Polarity extension regions PER_3_1 and PER_3_2 extend to the left of color dots CD_3_1, CD_3_2, and CD_3_3. Polarity extension regions PER_3_1 and PER_3_2 have a rectangular shape with a height that is less than vertical dot separation VDS1 and a width that is approximately one color dot width CDW. Polarity extension region PER_3_1 is vertically centered between color dot CD_3_1 and CD_3_2. Polarity extension region PER_3_2 is vertically centered between color dots CD_3_2 and CD_3_3. Color component CC_3 is arranged so that color dot CD_3_3 is horizontally aligned with device component area DCA_3 and offset vertically above device component area DCA_3 by a vertical dot offset VDO2 so that color dot CD_3_3 is vertically separated from device component area DCA_3 by vertical dot spacing VDS2. Furthermore, color component CC_3 is vertically aligned with color component CC_2 and horizontally offset from color component CC_2 by horizontal dot offset HDO1 so that color dot CD_3_1 is separated from color dot CD_2_1 by horizontal dot spacing HDS1. This placement of color component CC_3 places polarity extension region PER_3_1 in between color dots CD_2_1 and CD_2_2 and places polarity extension region PER_3_2 in between color dots CD_2_2 and CD_2_3. The electrode of color component CC_3 is coupled to switching element SE_3.

The polarity of the color dots, associated dots, polarized extension regions, and switching elements are shown using "+" and "−" signs. Thus, in FIG. 4(a), which shows the positive dot polarity pattern of pixel design 410+, switching elements SE_1, and SE_3; color dots CD_1_1, CD_1_2, CD_1_3, CD_3_1, CD_3_2, and CD_3_3; and polarity extension regions PER_1_1, PER_1_2, PER_3_1, and PER_3_2 have positive polarity as denoted by "+". Switching element SE_2; color dots CD_2_1, CD_2_2, and CD_2_3; and polarity extension regions PER_2_1, and PER_2_2 have negative polarity as denoted by "−". Device component areas DC_1, DCA_2, and DCA_3 are not polarized.

FIG. 4(b) shows pixel design 410 with the negative dot polarity pattern. For the negative dot polarity pattern, Switching element SE_2; color dots CD_2_1, CD_2_2, and CD_2_3; and polarity extension regions PER_2_1, and PER_2_2 have positive polarity as denoted by "+". Switching elements SE_1, and SE_3; color dots CD_1_1, CD_1_2, CD_1_3, CD_3_1, CD_3_2, and CD_3_3; and polarity extension regions PER_1_1, PER_1_2, PER_3_1, and PER_3_3, negative polarity as denoted by "−".

As explained above fringe fields in each of the color dots are amplified if adjacent components have opposite polarities. The present invention makes use of the polarity extension regions (and associated dots in other embodiments as explained below) as well as the color dots to achieve multiple liquid crystal domains. In general, the polarities of the polarized components are assigned so that a color dot of a first polarity has neighboring polarized components of the second polarity. For example for the positive dot polarity pattern of pixel design 410 (FIG. 4(a)), color dot CD_2_2 has negative polarity. However the neighboring polarized components (Color dots CD_1_2, and CD_3_2, and polarity extension regions PER_3_1 and PER_3_2 have positive polarity. Thus, the fringe field of color dot CD_2_2 is amplified. Some color dots such as color dot CD_2_3, have a non polarized neighbor, i.e., device component area DCA_2. However, the fringe field of color dot CD_2_3 is still amplified by the presence of three neighboring polarized components having opposite polarity. Some embodiments of the present invention (e.g. see FIG. 5(a)) adds associated dots to the device component areas to provide a polarized neighbor for the color dots neighboring the device component areas. Furthermore, as explained below, the polarity reversing scheme is carried out at the display level as well so that the color dot of another pixel that is placed next to color dot CD_1_2 would have negative polarity (see FIG. 4(d)).

Figure 4D:
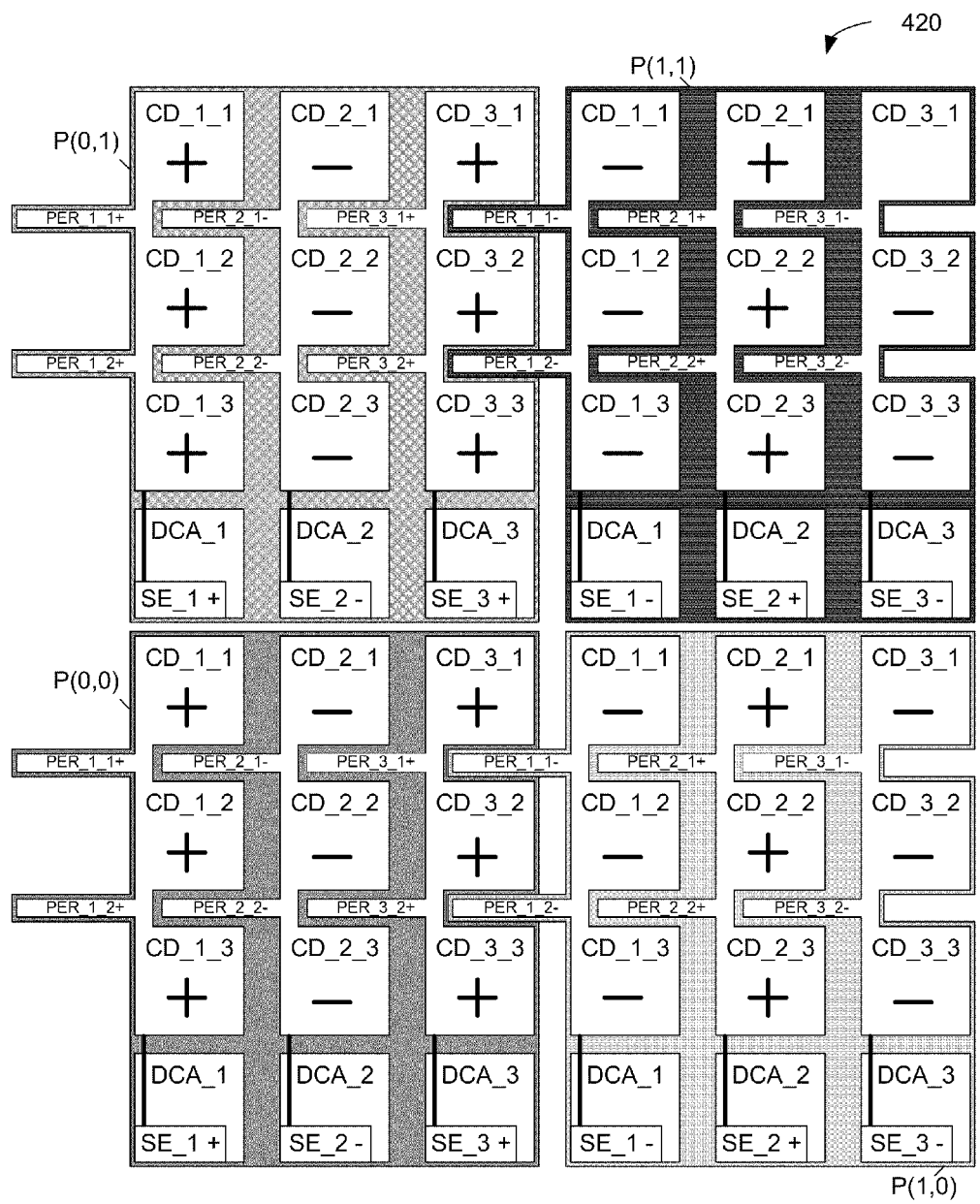
FIG. 4(d) illustrates a liquid crystal display in accordance with one embodiment of the present invention.
Figure 4E:
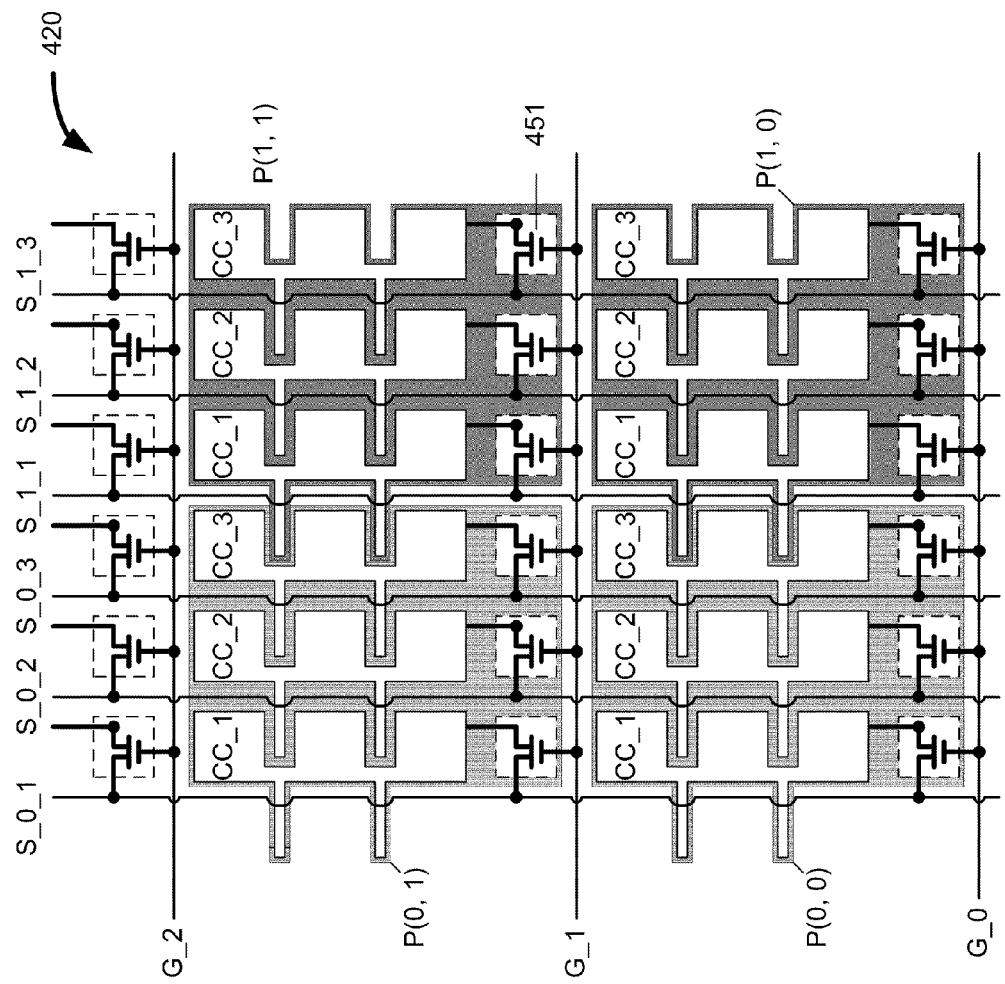
FIG. 4(e) illustrates the source lines and gate lines of a liquid crystal display in accordance with one embodiment of the present invention.

Pixels using pixel design 410 of FIGS. 4(a) and 4(b) can be used in displays using switching element column inversion driving schemes or switching element point inversion driving scheme. FIG. 4(d) shows a portion of display 420 using pixels P(0, 0), P(1, 0), P(0, 1), and P(1, 1) of pixel design 410 with a switching element column inversion driving scheme. For clarity, the gate lines and source lines that power the switching elements are omitted in FIG. 4(d). Gate lines and source lines are illustrated in FIG. 4(e). Furthermore, to better illustrate each pixel, the area of each pixel is shaded; this shading is only for illustrative purposes in FIG. 4(d) and has no functional significance. In the displays presented herein, a pixel P(x, y) is in the x-th column (from the left and the y-th row starting from the bottom, with pixel P(0,0) being the bottom left corner. In display 420 the pixels are arranged so that all pixels in a column have the same dot polarity pattern (positive or negative) and each successive column should alternate between positive and negative dot polarity pattern. Thus, pixels P(0, 0) and P(0, 1) in the first column have positive dot polarity pattern and pixels P(1, 0) and P(1, 1) in the second column have the negative dot polarity pattern. However, at the next frame the pixels will switch dot polarity patterns. Thus in general a pixel P(x, y) has a first dot polarity pattern when x is even and a second dot polarity pattern when x is odd. Furthermore, in each row of pixels the polarity extension regions of the first color component are placed in between the color dots of the third color component of an adjacent pixel. Thus, a close examination of display 420 shows that if a color dot has a first polarity, any neighboring polarized components have a second polarity. For example, Color dot CD_3_2 of pixel P(0, 1) has positive polarity while, color dot CD_2_2 of pixel P(0, 1), polarity extension regions PER_1_1 and PER 1_2 of pixel P(1, 1), and color dot CD_1_2 of pixel P(1, 1) have negative polarity. Device component areas serve as a non-polarized buffers between the rows of pixels. For example, both color dot CD_1_3 of pixel P(0, 1) and color dot CD_1_1 of pixel P(0, 0) have the positive polarity. However, the presence of non polarized device component area DCA_1 of pixel P(0, 1) prevents degradation of the fringe fields of the color dots. In a particular embodiment of the present invention, each color dot has a width of 43 micrometers and a height of 47 micrometers. Each polarity extension region has a width of 37 micrometers and a height of 6 micrometers. The horizontal and vertical dot spacing is 4 micrometers.

FIG. 4(e) illustrates the same portion of a display 420 as FIG. 4(d) (i.e., pixels P(0, 0), P(1, 0), P(0, 1), and P(1, 1). However, FIG. 4(e) emphasizes the gate and source lines and thus for clarity some pixel details (such as color dot references and polarity which are shown in FIG. 4(d)) are omitted in FIG. 4(e). To better illustrate each pixel, the area of each pixel is shaded; this shading is only for illustrative purposes in FIG. 4(e) and has no functional significance. FIG. 4(e) is drawn showing source lines (S_0_1, S_0_2, S_0_3, S_1_1, S_1_2, and S_1_3) and gate lines (G_0, G_1 and G_2). In general, a source line S_X_Z and gate line G_Y is used for the color component CC_Z of pixel P(X,Y). The source terminal of a transistor is coupled to a source line and the gate terminal of the transistor is coupled to a gate line. The drain terminal of the transistor is coupled to the electrode of the various color components. For clarity, transistors, which are used as the switching elements in display 420, are referenced as transistor T(S_X_Z, G_Y) where S_X_Z is the source line coupled to the transistor and G_Y is the gate line coupled to the transistor. Thus transistor 451 in FIG. 4(e) is referenced herein as transistor T(S_1_3, G_1) because the source terminal of transistor 451 is coupled to source line S_1_3 and the gate terminal of transistor 451 is coupled to gate line G_1. Each transistor is located within a device component area. Specifically, a transistor T(S_X_Z, G_Y) is located within device component area DCA_Z of pixel P(X, Y). Electrode connections are drawn in bold lines. Thus for example in pixel P(0, 1), which is controlled by gate line G_1 and source lines S_0_1, S_0_2, and S_0_3, the drain terminal of transistor T(S_0_1, G_1) is coupled to the electrode(s) of color component CC_1. Similarly, the drain terminal of transistor T(S_0_2, G_1) is coupled to the electrode(s) of color component CC_2 and the drain terminal of transistor T(S_0_3, G_1) is coupled to the electrode(s) of color component CC_3. Furthermore, the gate terminals of transistors T(S_0_1, G_1), T(S_0_2, G_1), and T(SO_3, G_1) are coupled to gate line G_1 and the source terminals of transistors T(S_0_1, G_1), T(S_0_2, G_1), and T(SO_3, G_1) are coupled to source lines S_0_1, S_0_2, and S_0_3, respectively. Similarly, the components of pixel P(1,1) are coupled to gate line G_1 and source lines S_1_1, S_1_2, and S_1_3. The components of pixel P(0, 0) are coupled to gate line G_0 and source lines S_0_1, S_0_2, and S_0_3; and the components of pixel P(1, 0) are coupled to gate line G_0 and source lines S_1_1, S_1_2, and S_1_3.

Each gate line extends from the left side of display 420 to the right side and controls all the pixels on one row of display 420. Display 420 has one gate line for each row of pixels. Each source line runs from the top to the bottom of display 420. Display 420 has three times the number of source lines as the number of pixels on each row (i.e. one source line for each color component of each pixel in a row of pixels). During operation only one gate line is active at a time. All transistors in the active row are rendered conductive by a positive gate impulse from the active gate line. Transistors in other rows are blocked by grounding the non-active gate lines. All source lines are active at the same time and each source line provides video data to one transistor on the active row (as controlled by the active gate line). Therefore, gate lines are often called bus lines and source lines are often called data lines due to the way the gate lines and source lines operate. The voltage charges the electrode of the color component to create a desired gray scale level (color is provided by color filters). When inactive, the electrodes of the color dot are electrically isolated and thus can maintain the field to control the liquid crystals. However, parasitic leakage is unavoidable and eventually the charge will dissipate. For small screens with fewer rows, the leakage is not problematic because the row is "refreshed" quite often. However, for larger displays with more rows there is a longer period between refreshes. Thus, some embodiments of the present invention include one or more storage capacitors for each color dot. The storage capacitors are charged with the electrodes of the color dots and provides a "maintenance" charge while the row is inactive. Generally, the data lines and bus lines are manufactured using an opaque conductor, such as Aluminum (Al) or Chromium (Cr).

Figure 4F:
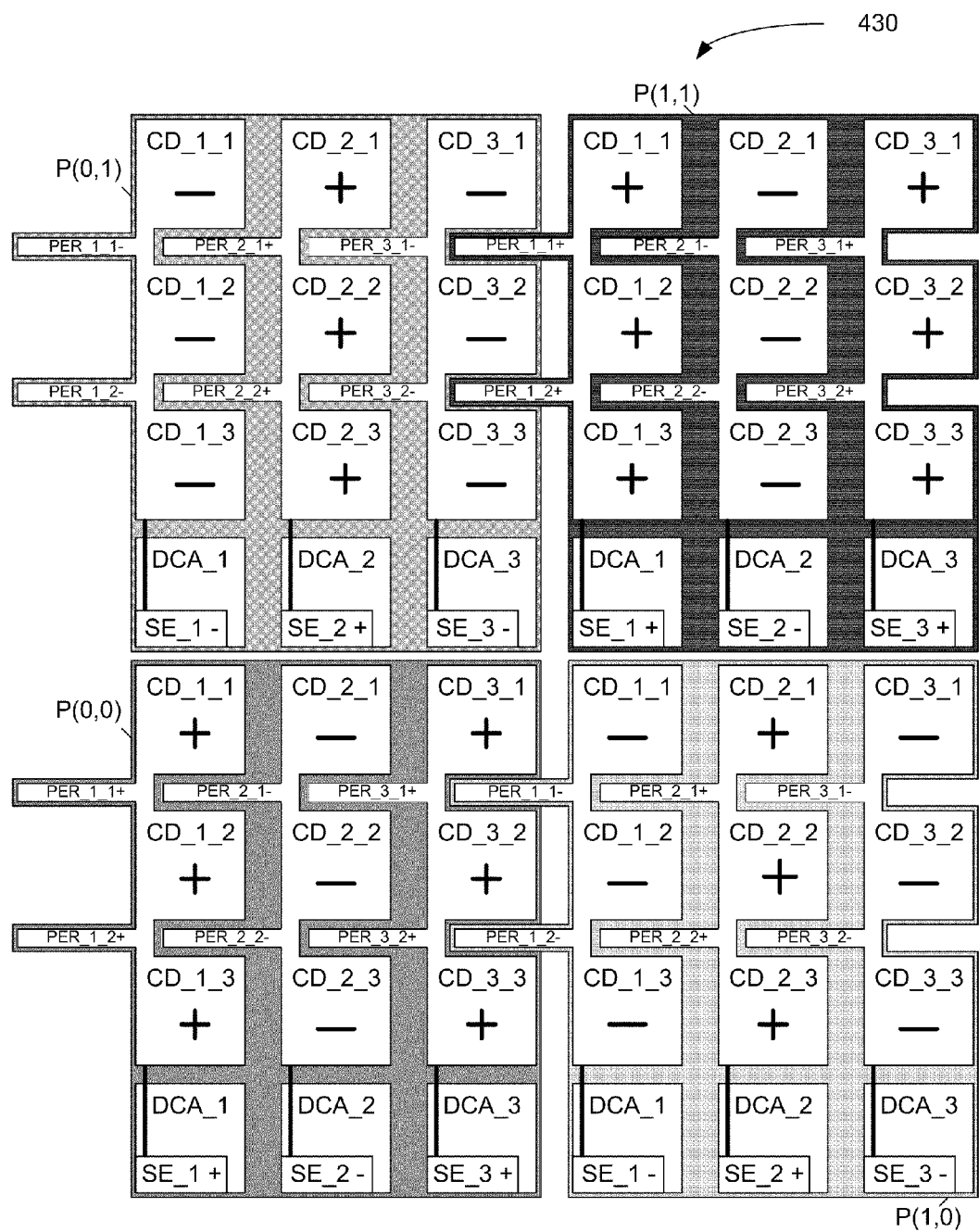
FIG. 4(f) illustrates a liquid crystal display in accordance with one embodiment of the present invention.

FIG. 4(f) shows a portion of display 430 using pixels P(0, 0), P(1, 0), P(0, 1), and P(1, 1) of pixel design 410 with a switching element point inversion driving scheme. Because the gate line and source line connections of display 430 would be identical to the gate line and source line connections of display 420 as shown in FIG. 4(e), the gate lines and source lines that power the switching elements are omitted in FIG. 4(f). To better illustrate each pixel, the area of each pixel is shaded; this shading is only for illustrative purposes in FIG. 4(f) and has no functional significance. In display 430 the pixels should be arranged in a checkerboard pattern of dot polarity patterns. Thus, pixels P(0, 0) and P(1, 1), have the positive dot polarity pattern and pixels P(0, 1) and P(1, 0) have the negative dot polarity pattern. Thus, in FIG. 4(f) a pixel P(x, y) has the negative dot polarity pattern if x plus y is an odd number. Conversely, pixel P(x, y) has the positive dot polarity pattern if x plus y is an even number. However, at the next frame the pixels will switch dot polarity patterns. Thus, more generally, a MVA LCD using the pixel designs of FIGS. 4(a) and 4(b) with switching element point inversion driving scheme has a first set of pixels having a first dot polarity pattern and a second set of pixels having a second dot polarity pattern. The first set of pixels and the second set of pixels are arranged in a checkerboard pattern. Furthermore, in each row of pixels the polarity extension regions of the first color component are placed in between the color dots of the third color component of an adjacent pixel. Thus, a close examination of display 430 shows that if a color dot has a first polarity, any neighboring polarized components have a second polarity. For example, Color dot CD_3_2 of pixel P(0, 1) has negative polarity while, color dot CD_2_2 of pixel P(0, 1), polarity extension regions PER_1_1 and PER 1_2 of pixel P(1, 1), and color dot CD_1_2 of pixel P(1, 1) have positive polarity. In a particular embodiment of the present invention, each color dot has a width of 43 micrometers and a height of 47 micrometers. Each polarity extension region has a width of 37 micrometers and a height of 6 micrometers. The horizontal and vertical dot spacing is 4 micrometers.

FIGS. 5(a) and 5(b) show the positive and negative dot polarity patterns of a pixel design 510. The layout of pixel design 510 is nearly identical to pixel design 410. Thus for brevity only the differences are described. Specifically, in pixel design 510, the device component areas are replaced by associated dots (as described above). Thus, device components DCA_1, DCA_2, and DCA_3 of pixel design 410 are replaced by associated dots AD_1, AD_2, and AD_3, respectively. As explained above, polarized components should have opposite polarity as compared with a neighboring color dot. Thus, associated dots AD_1, AD_2, and AD_3 should have opposite polarity as compared with color dots CD_1_3, CD_2_3, and CD_3_3.

Thus in FIG. 5(a), which shows the positive dot polarity pattern of pixel design 510+, switching elements SE_1, and SE_3; color dots CD_1_1, CD_1_2, CD_1_3, CD_3_1, CD_3_2, and CD_3_3; polarity extension regions PER_1_1, PER_1_2, PER_3_1, and PER_3_2, and associated dot AD_2 have positive polarity as denoted by "+". Switching element SE_2; color dots CD_2_1, CD_2_2, and CD_2_3; polarity extension regions PER_2_1, and PER_2_2, and associated dots AD_1 and AD_3 have negative polarity as denoted by "−". To receive negative polarity, the electrode of associated dot AD_1 is coupled to switching element SE_2 via the electrode of color component CC_2. Similarly, the electrode of associated dot AD_2 is coupled to switching element SE_3 via the electrode of color component CC_3 to receive positive polarity. Associated dot AD_3 would be coupled to a source of having opposite polarity to color dot CD_3_3. In many embodiments of the present invention, a polarity source in another pixel is used to provide the necessary polarity. For example, in a display using pixel design 510, the color dot next to color dot CD_3_3 would have an opposite polarity as compared to color dot CD_3_3, Thus, the electrode of associated dot AD_3 could be coupled to the electrode of the color dot next to color dot CD_3_3. For clarity, this connection is illustrated by ITO connector 512.

In FIG. 5(b), which shows the negative dot polarity pattern of pixel design 510−, switching elements SE_1, and SE_3; color dots CD_1_1, CD_1_2, CD_1_3, CD_3_1, CD_3_2, and CD_3_3; polarity extension regions PER_1_1, PER_1_2, PER_3_1, and PER_3_2, and associated dot AD_2 have negative polarity as denoted by "−". Switching element SE_2; color dots CD_2_1, CD_2_2, and CD_2_3; polarity extension regions PER_2_1, and PER_2_2, and associated dots AD_1 and AD_3 have positive polarity as denoted by "+".

Figure 5C:
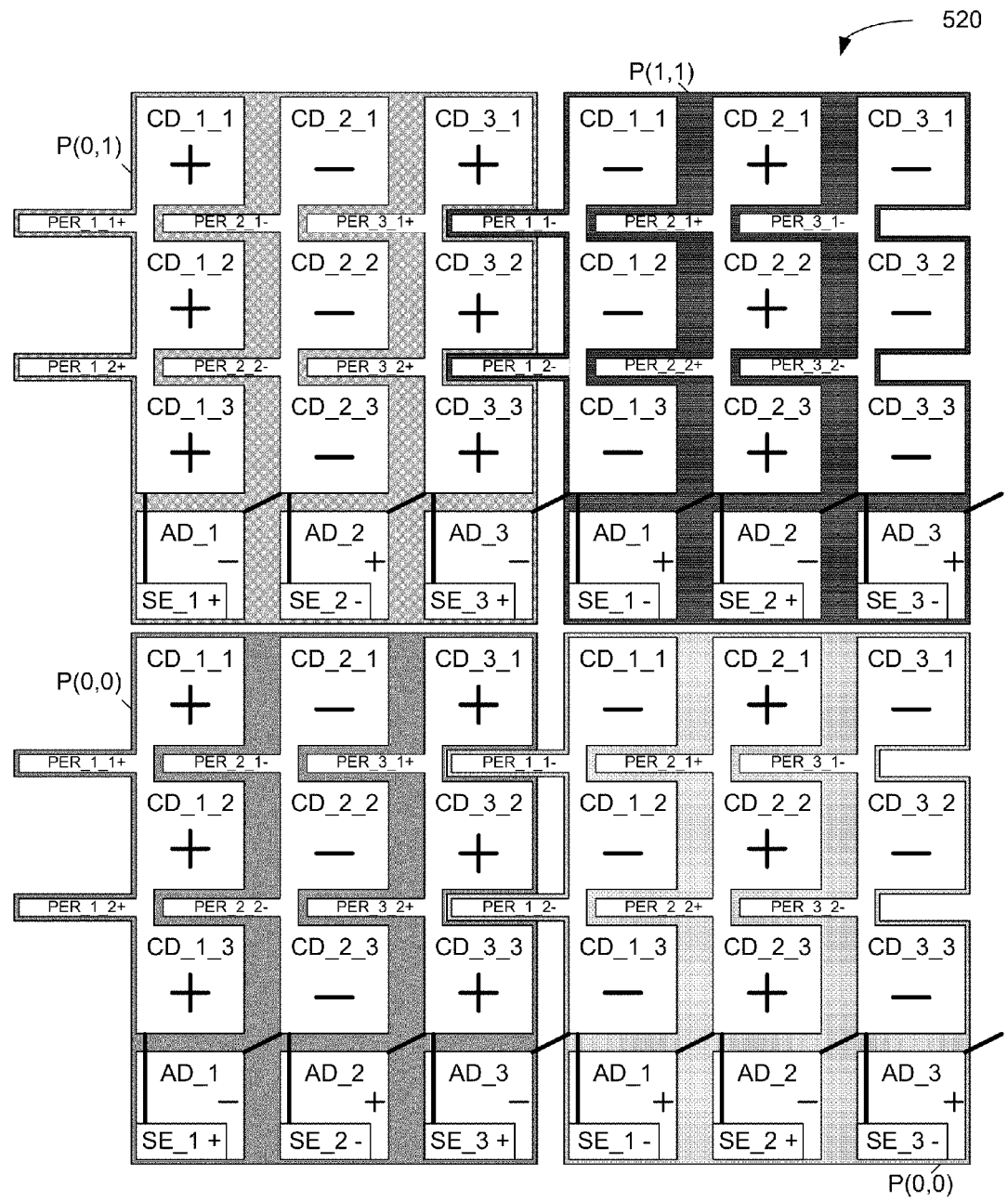
FIG. 5(c) illustrates a liquid crystal display in accordance with one embodiment of the present invention.

FIG. 5(c) shows a portion of display 520 using pixels P(0, 0), P(1, 0), P(0, 1), and P(1, 1) of pixel design 510 with a switching element column inversion driving scheme. Because the gate line and source line connections of display 520 would be identical to the gate line and source line connections of display 420 as shown in FIG. 4(e), the gate lines and source lines that power the switching elements are omitted in FIG. 5(c). To better illustrate each pixel, the area of each pixel is shaded; this shading is only for illustrative purposes in FIG. 5(c) and has no functional significance. In display 520 the pixels are arranged so that all pixels in a column have the same dot polarity pattern (positive or negative) and each column should alternate between positive and negative dot polarity pattern. Thus, pixels P(0, 0) and P(0, 1) in the first column have positive dot polarity pattern and pixels P(1, 0) and P(1, 1) in the second column have negative dot polarity pattern. However, at the next frame the pixels will switch dot polarity patterns. Thus in general a pixel P(x, y) has a first dot polarity pattern when x is even and a second dot polarity pattern when x is odd. Furthermore, in each row of pixels the polarity extension regions of the first color component are placed in between the color dots of the third color component of an adjacent pixel. Thus, a close examination of display 520 shows that if a color dot has a first polarity, any neighboring polarized components have a second polarity. For example, Color dot CD_3_2 of pixel P(0, 1) has positive polarity while, color dot CD_2_2 of pixel P(0, 1), polarity extension regions PER_1_1 and PER 1_2 of pixel P(1, 1), and color dot CD_1_2 of pixel P(1, 1) have negative polarity. As compared to display 420 (FIG. 4(d)) the polarized associated dots replace the non polarized device component areas to further enhance the fringe fields of the color dots near the associated dots. For example, the fringe fields of both color dot CD_1_3 of pixel P(0, 1) and color dot CD_1_1 of pixel P(0, 0) are amplified by the polarization of associated dot AD_1 of pixel P(0, 1). In a particular embodiment of the present invention, each color dot has a width of 43 micrometers and a height of 47 micrometers. Each associated dot has a width of 43 micrometers and a height of 39 micrometers. The horizontal and vertical dot spacing is 4 micrometers.

FIGS. 6(a) and 6(b) show the positive and negative dot polarity patterns of a pixel design 610. The layout of pixel design 610 is nearly identical to pixel design 410. Thus for brevity only the differences are described. Specifically, in pixel design 610, each of the device component areas are replaced by two associated dots. Thus, device component area DCA_1 is replaced by associated dot AD_1_1 and AD_1_2; device component area DCA_2 is replaced by associated dots AD_2_1 and AD_2_2, and device component area DCA_3 is replaced by associated dots AD_3_1 and AD_3_2. Specifically, associated dots AD_1_1, AD_2_1, and AD_3_1 form a row and encompass switching elements SE_1, SE_2, and SE_3, respectively. Associated dots AD_1_2, AD_2_2, and AD_3_2, are horizontally aligned with and located above associated dots AD_1_1, AD_2_1, and AD_3_1, respectively.

As explained above, polarized components should have opposite polarity as compared with a neighboring color dot. Thus, associated dots AD_1_2, AD_2_2, and AD_3_2 should have opposite polarity as compared with color dots CD_1_3, CD_2_3, and CD_3_3, respectively. As will be made clear in FIG. 6(c), the polarity of associated dots AD_1_1, AD_2_1, and AD_3_1 should be opposite of the polarity of associated dots AD_1_2, AD_2_2, and AD_3_2, respectively.

Thus, in FIG. 6(a), which shows the positive dot polarity pattern of pixel design 610+, switching elements SE_1, and SE_3; color dots CD_1_1, CD_1_2, CD_1_3, CD_3_1, CD_3_2, and CD_3_3; polarity extension regions PER_1_1, PER_1_2, PER_3_1, and PER_3_2, and associated dot AD_1_1, AD_2_2, and AD_3_1 have positive polarity as denoted by "+". Switching element SE_2; color dots CD_2_1, CD_2_2, and CD_2_3; polarity extension regions PER_2_1 and PER_2_2, and associated dots AD_1_2, AD_2_1, and AD_3_2 have negative polarity as denoted by "-".

In FIG. 6(b), which shows the negative dot polarity pattern of pixel design 610-, switching elements SE_1, and SE_3; color dots CD_1_1, CD_1_2, CD_1_3, CD_3_1, CD_3_2, and CD_3_3; polarity extension regions PER_1_1, PER_1_2, PER_3_1, and PER_3_2, and associated dots AD_1_1, AD_2_2, AD_3_1 have negative polarity as denoted by "-". Switching element SE_2; color dots CD_2_1, CD_2_2, and CD_2_3; polarity extension regions PER_2_1 and PER_2_2, and associated dots AD_1_2, AD_2_1 and AD_3_2 have positive polarity as denoted by "+".

To receive the proper polarity, the electrode of associated dot AD_1_2 is coupled to a polarity source from another pixel as represented by ITO connector 612. The electrode of associated dots AD_1_1, AD_2_1, and AD_3_1 are coupled directly to switching elements SE_1, SE_2, and SE_3, respectively. The electrode of associated dot AD_2_2 is coupled to switching element SE_1 via the electrode of associated dot AD_1_1. Similarly, the electrode of associated dot AD_3_2 is coupled to switching element SE_2 via the electrode of associated dot AD_2_1.

Figure 6C:
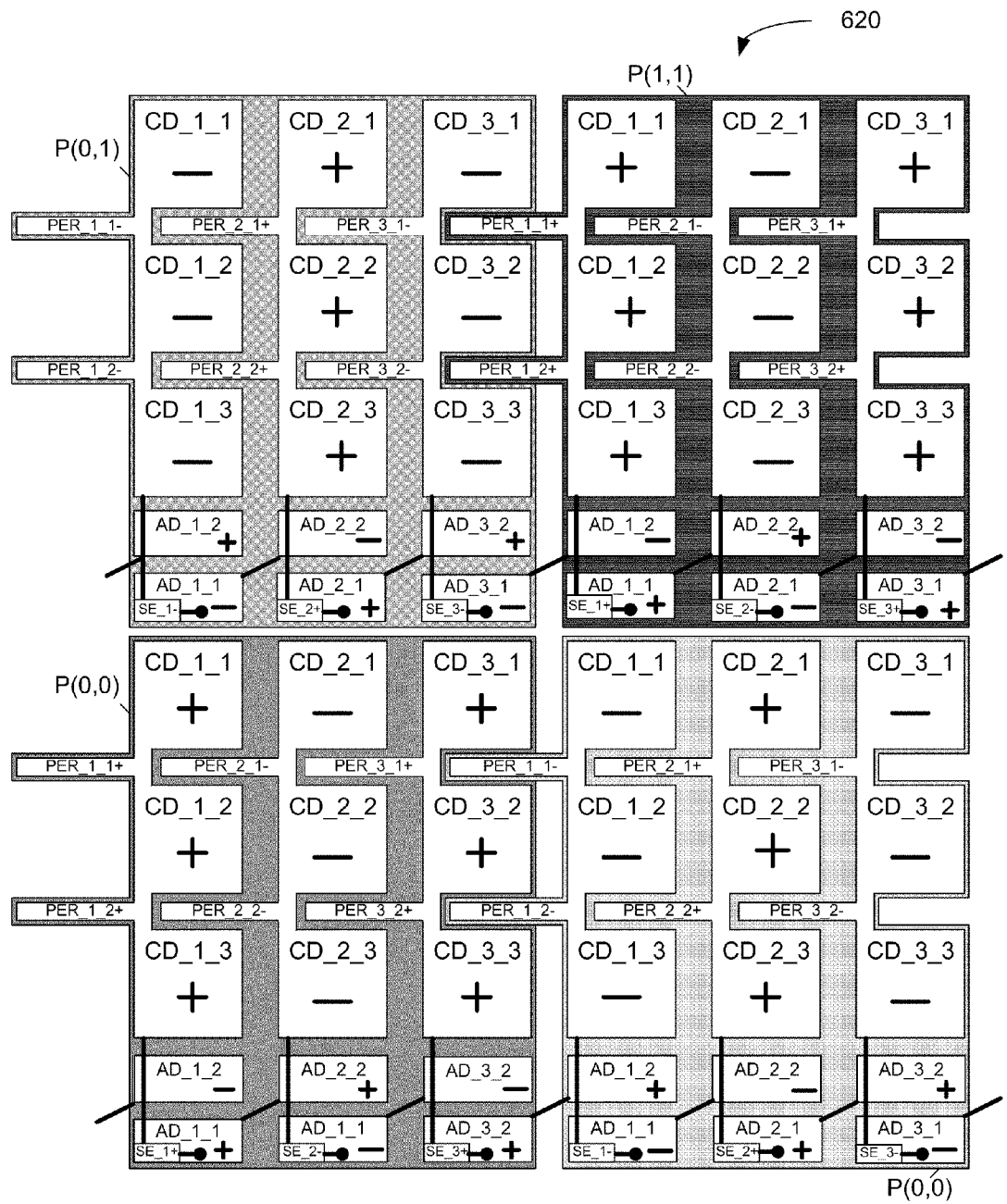
FIG. 6(c) illustrates a liquid crystal display in accordance with one embodiment of the present invention.

FIG. 6(c) shows a portion of display 620 using pixels P(0, 0), P(1, 0), P(0, 1), and P(1, 1) of pixel design 610 with a switching element point inversion driving scheme. Because the gate line and source line connections of display 620 would be identical to the gate line and source line connections of display 420 as shown in FIG. 4(e), the gate lines and source lines that power the switching elements are omitted in FIG. 6(c). To better illustrate each pixel, the area of each pixel is shaded; this shading is only for illustrative purposes in FIG. 6(c) and has no functional significance. In display 620 the pixels should be arranged in a checkerboard pattern of dot polarity pattern. Thus, pixels P(0, 0) and P(1, 1), have positive dot polarity pattern and pixels P(0, 1) and P(1, 0) have negative dot polarity pattern. Thus, in FIG. 6(c) a pixel P(x, y) has the negative dot polarity pattern if x plus y is an odd number. Conversely, pixel P(x, y) has the positive dot polarity pattern if x plus y is an even number. However, at the next frame the pixels will switch dot polarity patterns. Furthermore, in each row of pixels the polarity extension regions of the first color component are placed in between the color dots of the third color component of an adjacent pixel. Thus, a close examination of display 620 shows that if a color dot has a first polarity, any neighboring polarized components have a second polarity. For example, Color dot CD_3_2 of pixel P(0, 1) has positive polarity while, color dot CD_2_2 of pixel P(0, 1), polarity extension regions PER_1_1 and PER_1_2 of pixel P(1, 1), and color dot CD_1_2 of pixel P(1, 1) have negative polarity. As compared to display 430 (FIG. 4(f)) the polarized associated dots replace the non polarized device component areas and further enhance the fringe fields of the color dots near the associated dots. For example, the fringe fields of both color dot CD_1_3 of pixel P(0, 1) is amplified by the polarization of associated dot AD_1_2 of pixel P(0, 1). Similarly, the fringe field of color dot CD_1_1 of pixel P(0, 0) is amplified by the polarization of associated dot AD_1_1 of pixel P(0, 1). In a particular embodiment of the present invention, each color dot has a width of 43 micrometers and a height of 47 micrometers. Each associated dot has a width of 43 micrometers and a height of 39 micrometers. The horizontal and vertical dot spacing is 4 micrometers.

Figure 7D:
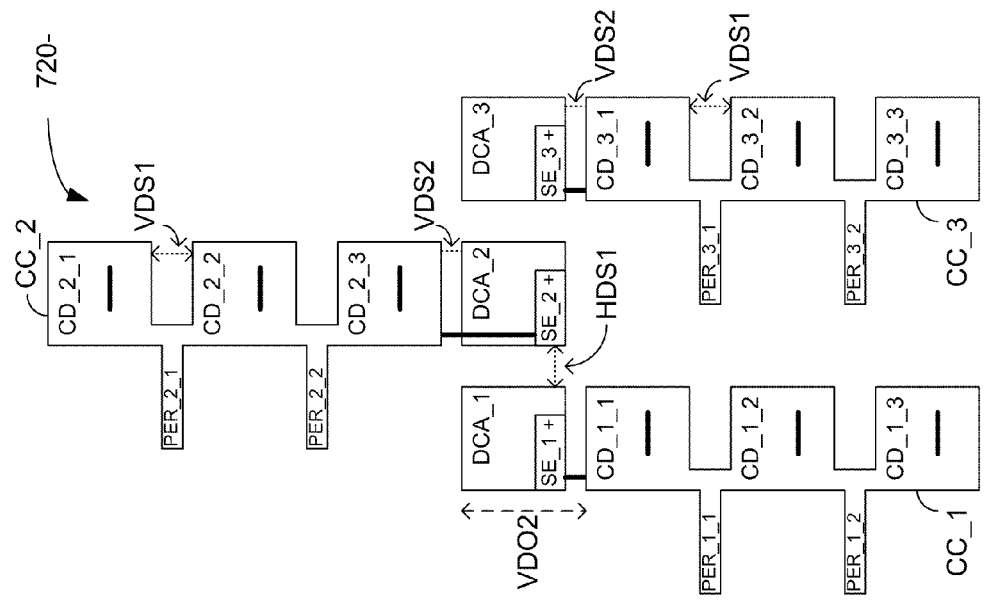
FIGS. 7(c)-7(d) illustrate a pixel design in accordance with one embodiment of the present invention.

FIGS. 7(a)-7(d) illustrate novel pixel designs that are used together in accordance with one embodiment of the present invention. The color components of the pixels in FIGS. 7(a)-7(d) are offset vertically to allow color components of multiple pixels to be interleaved. Specifically, FIGS. 7(a) and 7(b) show different dot polarity patterns of a pixel design 710 (labeled 710+ and 710- as described below) that are well suited for displays using a switching element row inversion driving scheme. Specifically, in FIG. 7(a), pixel design 710 has a positive dot polarity pattern (and is thus labeled 710+) and in FIG. 7(b), pixel design 710 has a negative dot polarity pattern (and is thus labeled 710-).

Pixel design 710 has three color components CC_1, CC_2, and CC_3. Each of the three color components is divided into three color dots and two polarity extension regions. In addition, pixel design 710 includes three switching elements SE_1, SE_2, and SE_3, which are arranged sequentially on a row. Switching elements SE_1, SE_2, and SE_3 are encompassed by device component areas DCA_1, DCA_2, and DCA_3, respectively.

In pixel design 710, the switching elements are arranged so that device component area DCA_1 is separated from device component area DCA_2 by a horizontal dot spacing HDS1. Similarly, device component area DCA_2 is separated from device component area DCA_3 by horizontal dot spacing HDS1.

Color component CC_1 of pixel design 710 has three color dots CD_1_1, CD_1_2, and CD_1_3 and two polarity extension regions PER_1_1 and PER_1_2. The color dots of color component CC_1 are arranged in a column with each adjacent color dot separated by vertical dot spacing VDS1. Specifically, color dot CD_1_1 is vertically adjacent to and above color dot CD_1_2, which is vertically adjacent to and above color dot CD_1_3. In addition, color dots CD_1_1, CD_1_2, and CD_1_3 are horizontally aligned. Polarity extension regions PER_1_1 and PER_1_2 extend to the left of color dots CD_1_1, CD_1_2, and CD_1_3. Specifically, polarity extension regions PER_1_1 and PER_1_2 have a rectangular shape with a height that is less than vertical dot separation VDS1 and a width that is approximately one color dot width CDW. Polarity extension region PER_1_1 is vertically centered between color dot CD_1_1 and CD_1_2. Polarity extension region PER_1_2 is vertically centered between color dots CD_1_2 and CD_1_3. Color component CC_1 is arranged so that color dot CD_1_3 is horizontally aligned with device component area DCA_1 and offset vertically above device component area DCA_1 by a vertical dot offset VDO2 so that color dot CD_1_3 is vertically separated from device component area DCA_1 by vertical dot spacing VDS2. The electrode(s) in color component CC_1 is coupled to switching element SE_1.

Second color component CC_2 of pixel design 710 has three color dots CD_2_1, CD_2_2, and CD_2_3 and two polarity extension regions PER_2_1 and PER_2_2. The color dots of color component CC_2 are arranged in a column with each adjacent color dot separated by vertical dot spacing VDS1. Specifically, color dot CD_2_1 is vertically adjacent to and above color dot CD_2_2, which is vertically adjacent to and above color dot CD_2_3. In addition, color dots CD_1_1, CD_1_2, and CD_1_3 are horizontally aligned. Polarity extension regions PER_2_1 and PER_2_2 extend to the left of color dots CD_2_1, CD_2_2, and CD_2_3. Specifically, polarity extension regions PER_2_1 and PER_2_2 have a rectangular shape with a height that is less than vertical dot separation VDS1 and a width that is approximately one color dot width CDW. Polarity extension region PER_2_1 is vertically centered between color dot CD_2_1 and CD_2_2. Polarity extension region PER_2_2 is vertically centered between color dots CD_2_2 and CD_2_3. Color component CC_2 is arranged so that color dot CD_2_1 is horizontally aligned with device component area DCA_2 and offset vertically below device component area DCA_2 by a vertical dot offset VDO2 so that color dot CD_2_1 is vertically separated from device component area DCA_2 by vertical dot spacing VDS2. The electrode of color component CC_2 is coupled to switching element SE_2.

Third color component CC_3 of pixel design 710 has three color dots CD_3_1, CD_3_2, and CD_3_3 and two polarity extension regions PER_3_1 and PER_3_2. The color dots of color component CC_3 are arranged in a column with each adjacent color dot separated by vertical dot spacing VDS1. Specifically, color dot CD_3_1 is vertically adjacent to and above color dot CD_3_2, which is vertically adjacent to and above color dot CD_3_3. In addition, color dots CD_1_1, CD_1_2, and CD_1_3 are horizontally aligned. Polarity extension regions PER_3_1 and PER_3_2 extend to the left of color dots CD_3_1, CD_3_2, and CD_3_3. Specifically, polarity extension regions PER_3_1 and PER_3_2 have a rectangular shape with a height that is less than vertical dot separation VDS1 and a width that is approximately one color dot width CDW. Polarity extension region PER_3_1 is vertically centered between color dot CD_3_1 and CD_3_2. Polarity extension region PER_3_2 is vertically centered between color dots CD_3_2 and CD_3_3. Color component CC_3 is arranged so that color dot CD_3_3 is horizontally aligned with device component area DCA_3 and offset vertically above device component area DCA_3 by a vertical dot offset VDO2 so that color dot CD_3_3 is vertically separated from device component area DCA_3 by vertical dot spacing VDS2. The electrode of color component CC_3 is coupled to switching element SE_3.

In pixel design 710, all the color dots have the same polarity for each dot polarity pattern. Thus, in FIG. 7(a), which shows the positive dot polarity pattern, switching elements SE_1, SE_2, and SE_3, all the color dots, and all the polarity extension regions have positive polarity. Conversely, in FIG. 7(b), which shows the negative dot polarity pattern, elements SE_1, SE_2, and SE_3, all the color dots, and all the polarity extension regions have negative polarity. Device component areas DCA_1, DCA_2, and DCA_3 are not polarized.

Figure 7C:
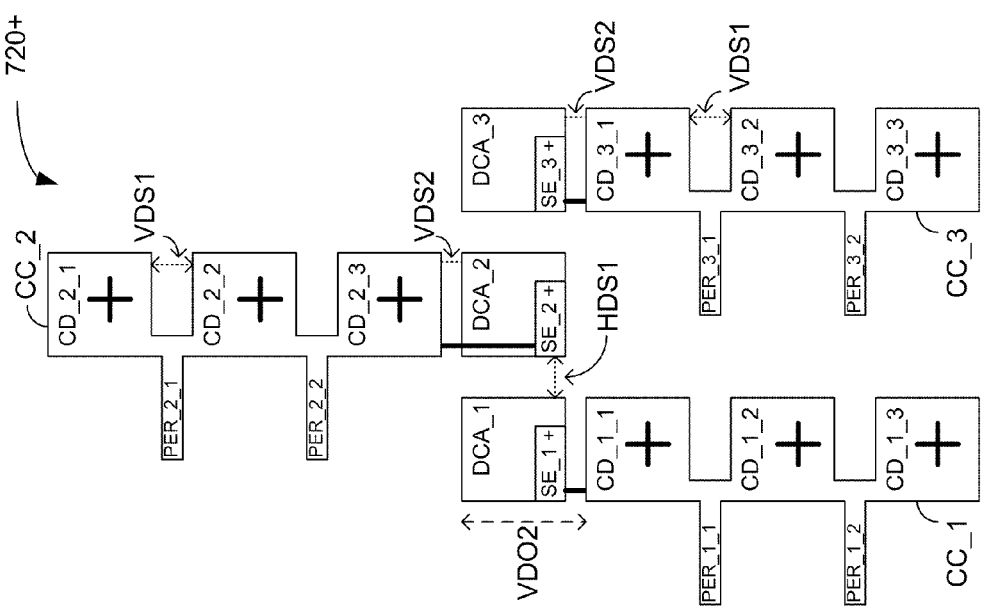

FIGS. 7(c) and 7(d) show different dot polarity patterns of a pixel design 720 (labeled 720+ and 720− as described below) that are well suited for displays using a switching element row inversion driving scheme. Specifically, in FIG. 7(c), pixel design 720 has a positive dot polarity pattern (and is thus labeled 720+) and in FIG. 7(d), pixel design 720 has a negative dot polarity pattern (and is thus labeled 720−).

Pixel design 720 has three color components CC_1, CC_2, and CC_3. Each of the three color components is divided into three color dots and two polarity extension regions. In addition, pixel design 720 includes device component areas (DCA_1, DCA_2, and DCA_3) for each color component. Switching elements SE_1, SE_2, and SE_3 (one for each color component) are located within device component areas DCA_1, DCA_2, and DCA_3, respectively.

In pixel design 720, device component areas DCA_1, DCA_2, and DCA_3 are arranged sequentially on a row. Device component area DCA_1 is separated from device component area DCA_2 by a horizontal dot spacing HDS1. Similarly, device component area DCA_2 is separated from device component area DCA_3 by horizontal dot spacing HDS1. Switching elements SE_1, SE_2, and SE_3 are positioned within device component areas, DCA_1, DCA_2, and DCA_3, respectively.

Color component CC_1 of pixel design 720 has three color dots CD_1_1, CD_1_2, and CD_1_3 and two polarity extension regions PER_1_1 and PER_1_2. The color dots of color component CC_1 are arranged in a column with each adjacent color dot separated by vertical dot spacing VDS1. Specifically, color dot CD_1_1 is vertically adjacent to and above color dot CD_1_2, which is vertically adjacent to and above color dot CD_1_3. In addition, color dots CD_1_1, CD_1_2, and CD_1_3 are horizontally aligned. Polarity extension regions PER_1_1 and PER_1_2 extend to the left of color dots CD_1_1, CD_1_2, and CD_1_3. Specifically, polarity extension regions PER_1_1 and PER_1_2 have a rectangular shape with a height that is less than vertical dot separation VDS1 and a width that is approximately one color dot width CDW. Polarity extension region PER_1_1 is vertically centered between color dot CD_1_1 and CD_1_2. Polarity extension region PER_1_2 is vertically centered between color dots CD_1_2 and CD_1_3. Color component CC_1 is arranged so that color dot CD_1_1 is horizontally aligned with device component area DCA_1 and offset vertically below device component area DCA_1 by a vertical dot offset VDO2 so that color dot CD_1_1 is vertically separated from device component area DCA_1 by vertical dot spacing VDS2. The electrode(s) in color component CC_1 is coupled to switching element SE_1.

Second color component CC_2 of pixel design 720 has three color dots CD_2_1, CD_2_2, and CD_2_3 and two polarity extension regions PER_2_1 and PER_2_2. The color dots of color component CC_2 are also arranged in a column with each adjacent color dot being separated by vertical dot spacing VDS1. Specifically, color dot CD_2_1 is vertically adjacent to and above color dot CD_2_2, which is vertically adjacent to and above color dot CD_2_3. In addition, color dots CD_1_1, CD_1_2, and CD_1_3 are horizontally aligned. Polarity extension regions PER_2_1 and PER_2_2 have a rectangular shape with a height that is less than vertical dot separation VDS1 and a width that is approximately one color dot width CDW. Polarity extension region PER_2_1 is vertically centered between color dot CD_2_1 and CD_2_2. Polarity extension region PER_2_2 is vertically centered between color dots CD_2_2 and CD_2_3. Color component CC_2 is arranged so that color dot CD_2_3 is horizontally aligned with device component area DCA_2 and offset vertically above device component area DCA_2 by a vertical dot offset VDO2 so that color dot CD_2_3 is vertically separated from device component area DCA_2 by vertical dot spacing VDS2. The electrode of color component CC_2 is coupled to switching element SE_2.

Third color component CC_3 of pixel design 720 has three color dots CD_3_1, CD_3_2, and CD_3_3 and two polarity extension regions PER_3_1 and PER_3_2. The color dots of color component CC_3 are also arranged in a column with each adjacent color dot being separated by vertical dot spacing VDS1. Specifically, color dot CD_3_1 is vertically adjacent to and above color dot CD_3_2, which is vertically adjacent to and above color dot CD_3_3. In addition, color dots CD_1_1, CD_1_2, and CD_1_3 are horizontally aligned. Polarity extension regions PER_3_1 and PER_3_2 extend to the left of color dots CD_3_1, CD_3_2, and CD_3_3. Specifically, polarity extension regions PER_3_1 and PER_3_2 have a rectangular shape with a height that is less than vertical dot separation VDS1 and a width that is approximately one color dot width CDW. Polarity extension region PER_3_1 is vertically centered between color dot CD_3_1 and CD_3_2. Polarity extension region PER_3_2 is vertically centered between color dots CD_3_2 and CD_3_3. Color component CC_3 is arranged so that color dot CD_3_1 is horizontally aligned with device component area DCA_3 and offset vertically below device component area DCA_3 by a vertical dot offset VDO2 so that color dot CD_3_1 is vertically separated from device component area DCA_3 by vertical dot spacing VDS2. The electrode of color component CC_3 is coupled to switching element SE_3.

In pixel design 720, all the color dots have the same polarity for each dot polarity pattern. Thus, in FIG. 7(c), which shows the positive dot polarity pattern, switching elements SE_1, SE_2, and SE_3, all of the color dots, and all of the polarity extension regions have positive polarity. Conversely, in FIG. 7(d), which shows the negative dot polarity pattern, elements SE_1, SE_2, and SE_3, all of the color dots, and all of the polarity extension regions have negative polarity. Device component areas DCA_1, DCA_2, and DCA_3 are not polarized.

Figure 7E:
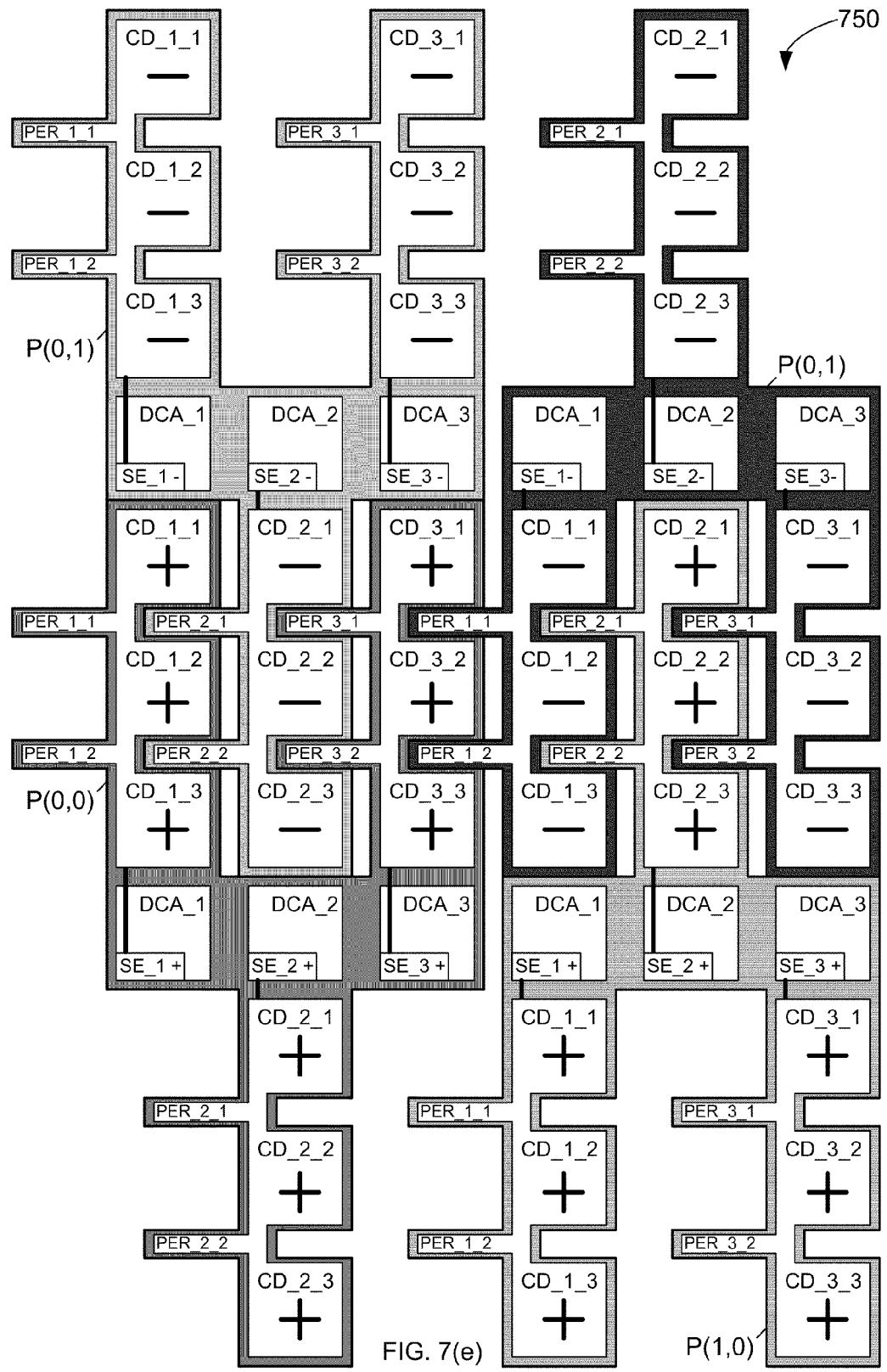
FIG. 7(e) illustrates a liquid crystal display in accordance with one embodiment of the present invention.
Figure 7F:
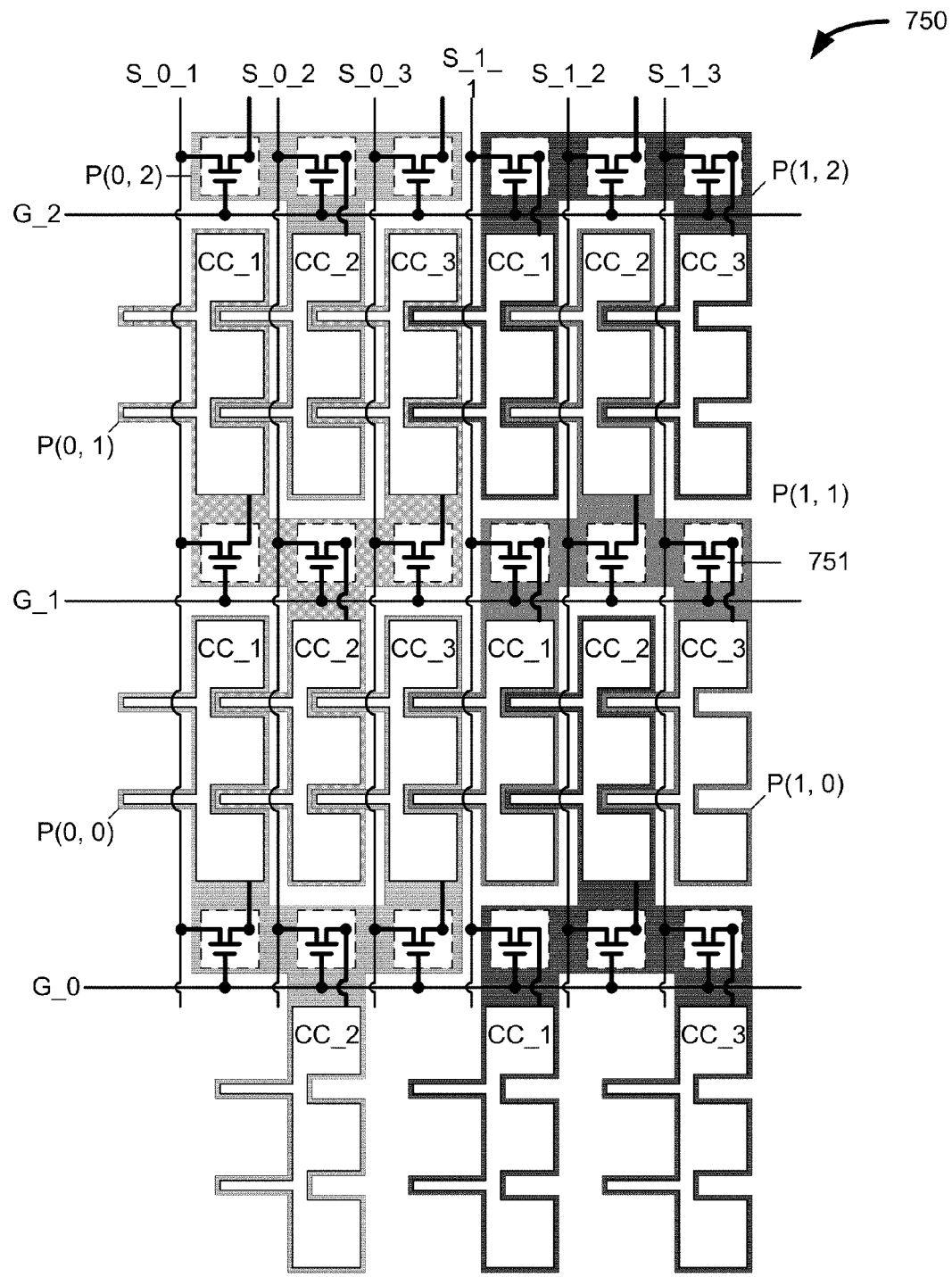
FIG. 7(f) illustrates the source lines and gate lines of a liquid crystal display in accordance with one embodiment of the present invention.

FIG. 7(e) shows a portion of a display 750 that combines pixels using pixel designs 710 and pixel design 720. For clarity, the gate lines and source lines that power the switching elements are omitted in FIG. 7(e). Gate line and source line connections for display 750 are shown in FIG. 7(f). To better illustrate each pixel, the area of each pixel is shaded; this shading is only for illustrative purposes in FIG. 7(e) and has no functional significance. Each row of display 750 has alternating pixels of pixel design 710 and pixel design 720. For example in row 0, pixel P(0,0) uses pixel design 710 and pixel P(1,0) uses pixel design 720. Pixel P(2,0) (not shown) would use pixel design 710. Similarly, in row 1, pixel P(0,1) uses pixel design 710 and pixel P(1,1) uses pixel design 720, and pixel P(2, 1) (not shown) uses pixel design 710. Within a row the device component area of adjacent pixels are vertically aligned and horizontally separated by one horizontal dot spacing HDS1 (not labeled in FIG. 7(e)). The rows in display 750 are horizontally aligned and vertically interleaved so polarity enhancement regions of one pixel is placed in between color dots of another pixel. For example, polarity enhancement region P_2_1 of pixel P(0, 1) is located in between color dots CD_1_1 and CD_1_2 of pixel P(0, 0). Similarly, polarity extension region PER_3_1 of pixel P(0, 0) is located between color dots CD_2_1 and CD_2_2 of pixel P(0, 1).

All the pixels on a row have the same polarity. However, alternating rows have different polarities. Thus for example, the pixels of row 0 are shown with positive dot polarity pattern while the pixels of row 1 are shown with negative dot polarity pattern. In the next frame the pixels of row 0 would have negative dot polarity pattern while the pixels of row 1 would have positive dot polarity pattern. In general, pixels in even-numbered rows have a first dot polarity pattern and pixels in odd-numbered rows have a second dot polarity pattern. This arrangement of row polarity is an example of switching element row inversion driving scheme, which is often referred to as simply "row inversion." In general a pixel P(X,Y) in display 750 uses pixel design 710 where X is even and uses pixel design 720 where X is odd. Furthermore, pixel P(X,Y) has a first dot polarity pattern when Y is even and a second dot polarity pattern when Y is odd. In a particular embodiment of the present invention, each color dot has a width of 43 micrometers and a height of 47 micrometers. Each device component area has a width of 43 micrometers and a height of 39 micrometers. The horizontal and vertical dot spacing is 4 micrometers.

As illustrated in FIG. 7(e), using the pixel designs described above, the color dots of display 750 have opposite polarity as compared to neighboring polarized components. Thus, the fringe fields in each color dot are amplified to produce multiple liquid crystal domains. Because each row of switching elements have the same polarity, while alternating rows of switching elements of opposite polarity, display 750 uses a switching element row inversion driving scheme.

FIG. 7(f) illustrates the same portion of a display 750 as FIG. 7(e) (i.e., pixels P(0, 0), P(1, 0), P(0, 1), and P(1, 1). In addition, FIG. 7(f) includes portions of pixels P(0, 2) and P(1, 2). FIG. 7(f) emphasizes the gate and source lines of display 750 and thus for clarity some pixel details (such as color dot references and polarity which are shown in FIG. 7(e)) are omitted in FIG. 7(f). Furthermore, the area of each pixel is shaded; this shading is only for illustrative purposes in FIG. 7(f) and has no functional significance. FIG. 7(f) is drawn showing source lines (S_0_1, S_0_2, S_0_3, S_1_1, S_1_2, and S_1_3) and gate lines (G_0, G_1 and G_2). In general, a source line S_X_Z and gate line G_Y is used for the color component CC_Z of pixel P(X, Y). The source terminal of a transistor is coupled to a source line and the gate terminal of the transistor is coupled to a gate line. The drain terminal of the transistor is coupled to the electrode of the various color components. For clarity, transistors, which are used as the switching elements in display 750, are referenced as transistor T(S_X_Z, G_Y) where S_X_Z is the source line coupled to the transistor and G_Y is the gate line coupled to the transistor. Thus transistor 751 in FIG. 7(f) is referenced herein as transistor T(S_1_3, G_1) because the source terminal of transistor 751 is coupled to source line S_1_3 and the gate terminal of transistor 751 is coupled to gate line G_1. Each transistor is located within a device component area. Specifically, a transistor T(S_X_Z, G_Y) is located within device component area DCA_Z of pixel P(X, Y). Electrode connections are drawn in bold lines. Thus for example in pixel P(0, 1), which is controlled by gate line G_1 and source lines S_0_1, S_0_2, and S_0_3, the drain terminal of transistor T(S_0_1, G_1) is coupled to the electrode color component CC_1. Similarly, the drain terminal of transistor T(S_0_2, G_1) is coupled to the electrode of color component CC_2 and the drain terminal of transistor T(S_0_3, G_1) is coupled to the electrode of color component CC_3. Furthermore, the gate terminals of transistors T(S_0_1, G_1), T(S_0_2, G_1), and T(SO_3, G_1) are coupled to gate line G_1. The source terminals of transistors T(S_0_1, G_1), T(S_0_2, G_1), and T(SO_3, G_1) are coupled to source lines S_0_1, S_0_2, and S_0_3, respectively. Similarly, the components of pixel P(1, 1) are coupled to gate line G_1 and source lines S_1_1, S_1_2, and S_1_3. The components of pixel P(0, 0) are coupled to gate lines G_0 and source lines S_0_1, S_0_2, and S_0_3; and the components of pixel P(1, 0) are coupled to gate lines G_0 and source lines S_1_1, S_1_2, and S_1_3.

During operation only one gate line is active at a time. All transistors coupled to the active gate line are rendered conductive by a positive gate impulse from the active gate line. Transistors in other rows are blocked by grounding the non-active gate lines. All source lines are active at the same time and each source line provides video data to one transistor on the active row (as controlled by the active gate line).

FIGS. 8(a) and 8(b) show the positive and negative dot polarity patterns of a pixel design 810. The layout of pixel design 810 is nearly identical to pixel design 710. Thus for brevity only the differences are described. Specifically, in pixel design 810, each of the device component areas is replaced by two associated dots. Thus, device component area DCA_1 is replaced by associated dot AD_1_1 and AD_1_2; device component area DCA_2 is replaced by associated dots AD_2_1 and AD_2_2, and device component area DCA_3 is replaced by associated dots AD_3_1 and AD_3_2. Specifically, associated dots AD_1_1, AD_2_1, and AD_3_1 form a row and encompass switching elements SE_1, SE_2, and SE_3, respectively. Associated dots AD_1_2, AD_2_2, and AD_3_2, are horizontally aligned with and located above associated dots AD_1_1, AD_2_1, and AD_3_1, respectively.

As explained above, polarized components should have opposite polarity as compared with a neighboring color dot. Thus, associated dots AD_1_2, AD_2_1, and AD_3_2 should have opposite polarity as compared with color dots CD_1_3, CD_2_1, and CD_3_3, respectively. As will be made clear in FIG. 8(e), the polarity of associated dots AD_1_1, AD_2_2, and AD_3_1 should be opposite of the polarity of associated dots AD_1_2, AD_2_1, and AD_3_2, respectively.

Thus, in FIG. 8(a), which shows the positive dot polarity pattern of pixel design 810+, all of the switching elements, color dots, and polarity extension region have positive polarity. Furthermore, associated dots AD_1_1, AD_2_2, and AD_3_1 also have positive polarity. However associated dots AD_1_2, AD_2_1, and AD_3_2 have negative polarity. In FIG. 8(b), which shows the negative dot polarity pattern of pixel design 810−, all of the switching elements, color dots and polarity extension region have negative polarity. Furthermore, associated dots AD_1_1, AD_2_2, and AD_3_1 also have negative polarity. However associated dots AD_1_2, AD_2_1, and AD_3_2 have positive polarity. Because, all the switching elements have the same polarity, associated dots AD_1_2, AD_2_1, and AD_3_2 are coupled to receive polarity from another pixel. This coupling is represented by ITO connectors 812 and 814. Specifically, ITO connector 812 couples the electrode of associated dot AD_1_2 to the electrode of a color dot from another pixel that would be located in between color dots CD_1_1 and CD_1_3. Similarly, ITO connector 814 couples the electrode of associated dot AD_3_2 to the electrode of a color dot from another pixel that would be located to the right of color dot CD_3_3. In addition the electrode of associated dot AD_2_1 is coupled to receive polarity via the electrode of associated dot AD_3_2. Conversely, associated dots AD_1_1, AD_2_2, and AD_3_1 have the same polarity as switching elements SE_1, SE_2, and SE_3. Therefore, in pixel design 810, the electrode of associated dot AD_1_1 and AD_3_1 are coupled to switching element SE_1 and SE_3, respectively. The electrode of associated dot AD_2_2 is coupled to the electrode of associated dot AD_1_1.

Figures 8C, 8D:
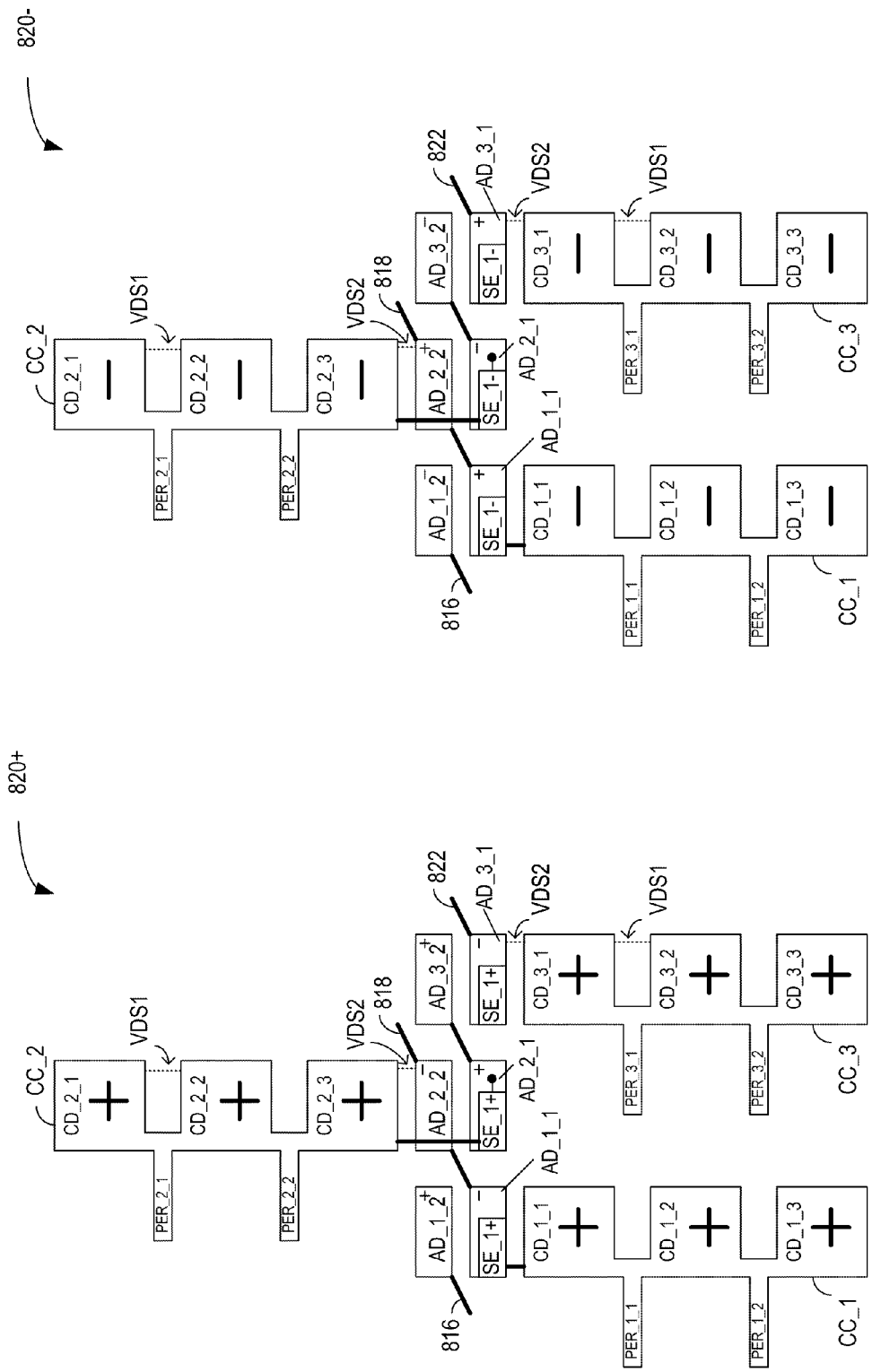
FIGS. 8(c)-8(d) illustrate a pixel design in accordance with one embodiment of the present invention.

FIGS. 8(c) and 8(d) show the positive and negative dot polarity patterns of a pixel design 820. The layout of pixel design 820 is nearly identical to pixel design 720 (FIGS. 7(c) and 7(d)). Thus for brevity only the differences are described. Specifically, in pixel design 820, each of the device component areas are replaced with two associated dots. Thus, device component area DCA_1 is replaced by associated dot AD_1_1 and AD_1_2; device component area DCA_2 is replaced by associated dots AD_2_1 and AD_2_2, and device component area DCA_3 is replaced by associated dots AD_3_1 and AD_3_2. Specifically, associated dots AD_1_1, AD_2_1, and AD_3_1 form a row and encompass switching elements SE_1, SE_2, and SE_3, respectively. Associated dots AD_1_2, AD_2_2, and AD_3_2, are horizontally aligned with and located above associated dots AD_1_1, AD_2_1, and AD_3_1, respectively.

As explained above, polarized components should have opposite polarity as compared with a neighboring color dot. Thus, associated dots AD_1_1, AD_2_2, and AD_3_1 should have opposite polarity as compared with color dots CD_1_1, CD_2_3, and CD_3_1, respectively. As will be made clear in FIG. 8(e), the polarity of associated dots AD_1_2, AD_2_1, and AD_3_2 should be opposite of the polarity of associated dots AD_1_1, AD_2_2, and AD_3_1, respectively.

Thus, in FIG. 8(c), which shows the positive dot polarity pattern of pixel design 820+, all of the switching elements, color dots, and polarity extension region have positive polarity. Furthermore, associated dots AD_1_2, AD_2_1, and AD_3_2 also have positive polarity. However associated dots AD_1_1, AD_2_2, and AD_3_1 have negative polarity. In FIG. 8(d), which shows the negative dot polarity pattern of pixel design 820−, all of the switching elements, color dots, and polarity extension region have negative polarity. Furthermore, associated dots AD_1_2, AD_2_1, and AD_3_2 also have negative polarity. However associated dots AD_1_1, AD_2_2, and AD_3_1 have positive polarity. Because, all the switching elements have the same polarity, associated dots AD_1_2, AD_2_1, and AD_3_2 are coupled to receive polarity from another pixel. This coupling is represented by ITO connectors 818 and 822. Specifically, ITO connector 818 couples the electrode of associated dot AD_2_2 to the electrode of a color dot from another pixel that would be located to the right of color dot CD_2_3. In addition, the electrode of associated dot AD_1_1 is coupled to receive polarity from the electrode of associated dot AD_2_2. ITO connector 822 couples the electrode of associated dot AD_3_1 to the electrode of an associated dot from another pixel that would be located to the right of associated dot AD_3_2. Conversely, associated dots AD_1_2, AD_2_1, and AD_3_2 have the same polarity as switching elements SE_1, SE_2, and SE_3. Therefore, in pixel design 820, the electrode of associated dot AD_2_1 is coupled to switching element SE_2. In addition. The electrode of associated dot AD_3_2 is coupled to receive polarity from the electrode of associated dot AD_2_1. Associated dot AD_1_2 could be coupled to receive polarity from one of the switching elements in pixel design 820. However in the embodiment of FIGS. 8(c) and 8(d), ITO connector 816 couples the electrode of associated dot AD_1_2 to the electrode of an associated dot from another pixel that would be located to the left of associated dot AD_1_1.

Figure 8E:
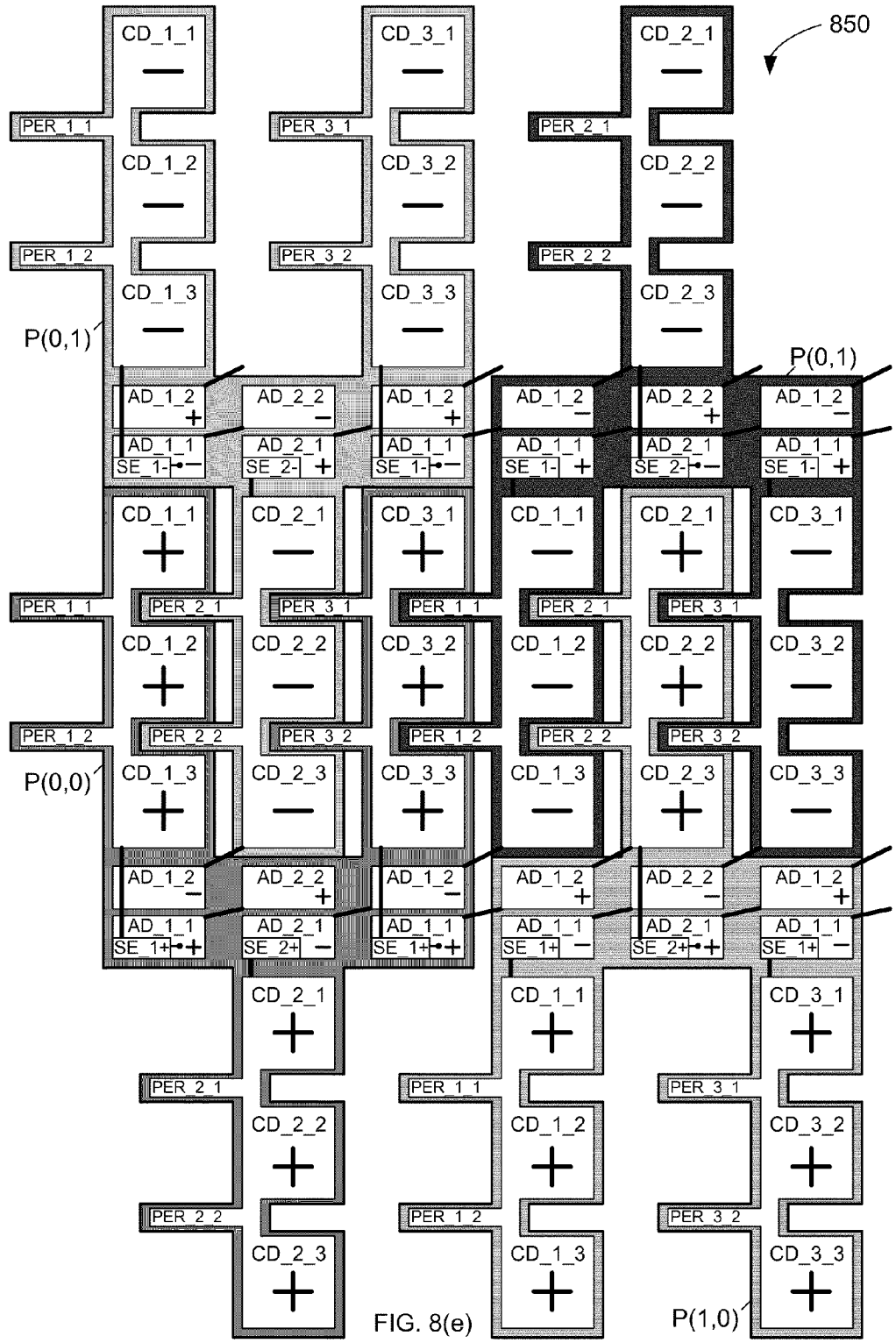
FIG. 8(e) illustrates a liquid crystal display in accordance with one embodiment of the present invention.
Figure 9D:
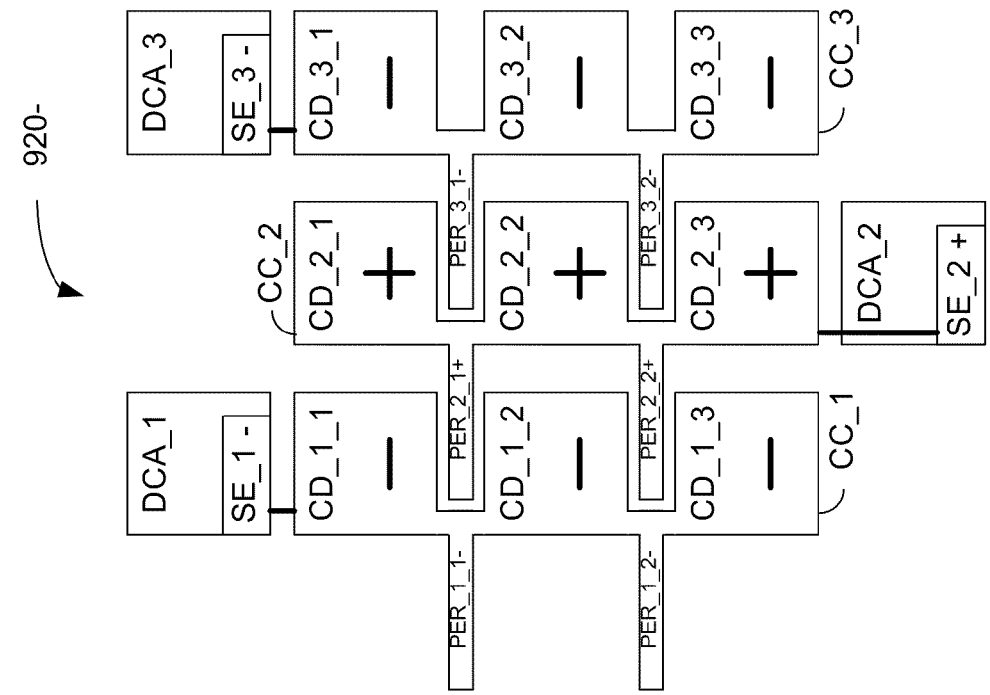
FIGS. 9(c)-9(d) illustrate a pixel design in accordance with one embodiment of the present invention.
Figure 9C:
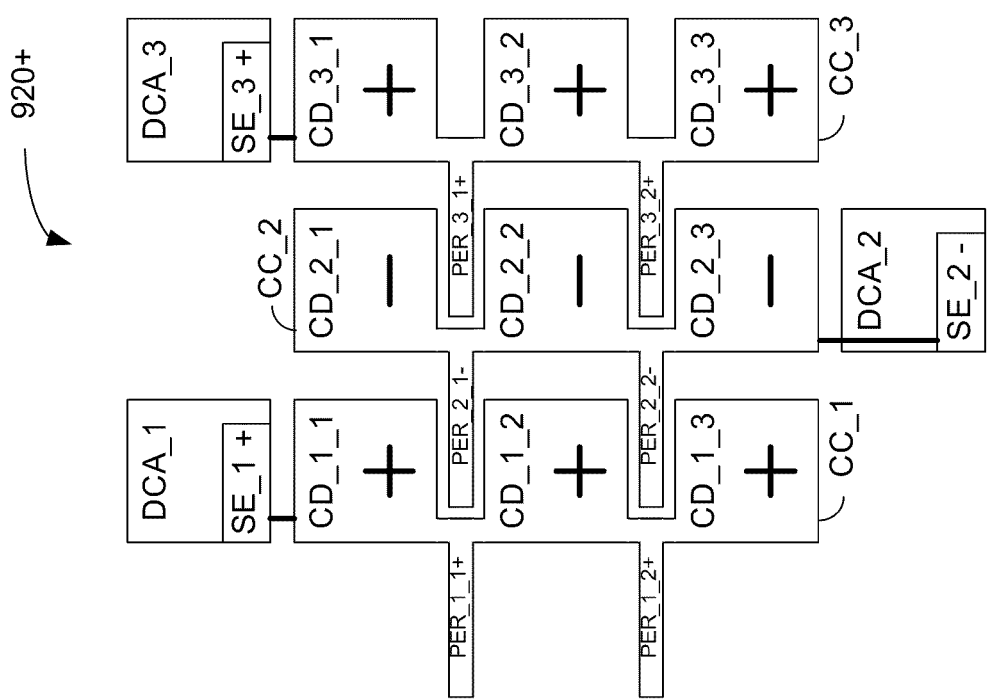
Figure 9E:
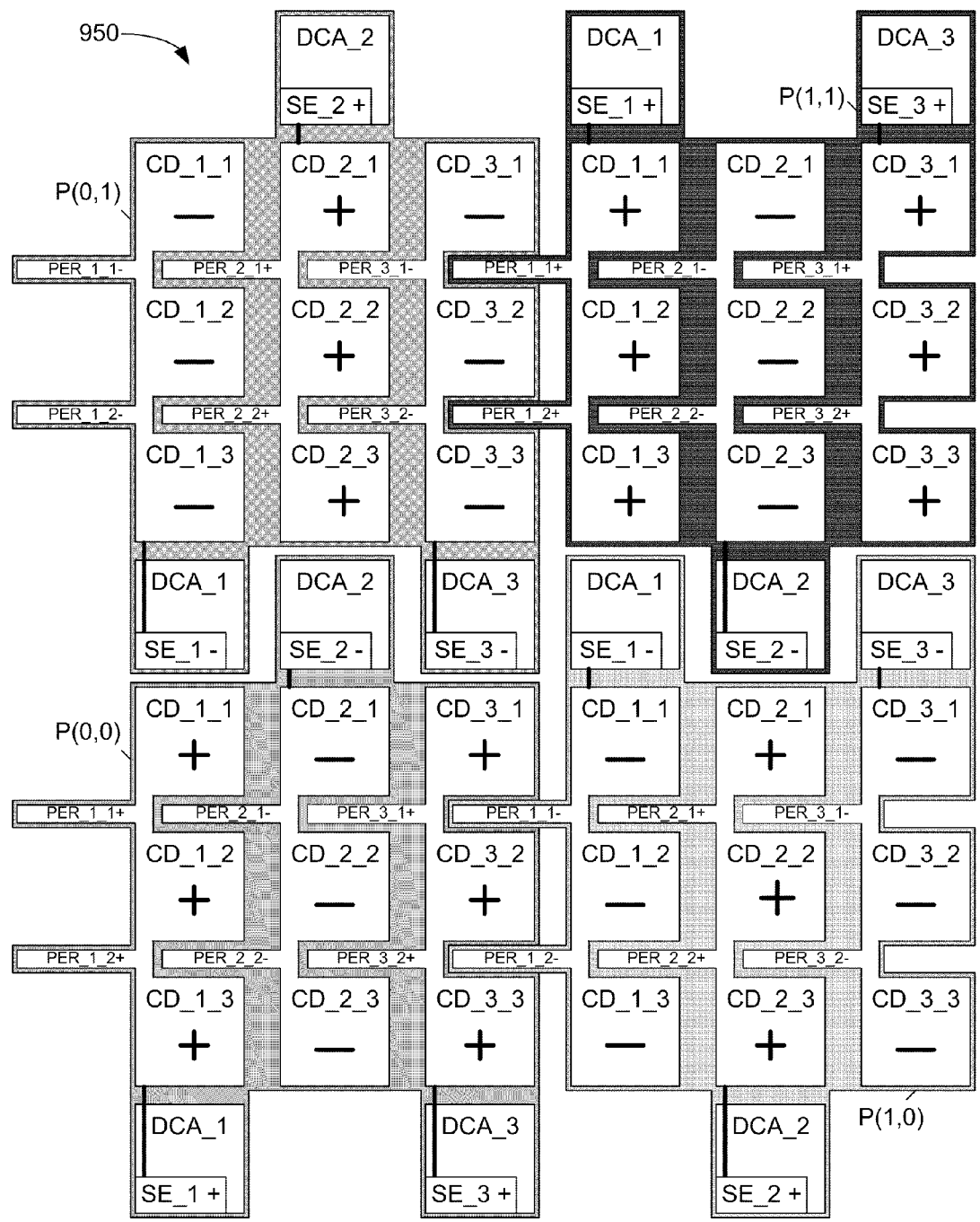
FIG. 9(e) illustrates a liquid crystal display in accordance with one embodiment of the present invention.
Figure 9H:
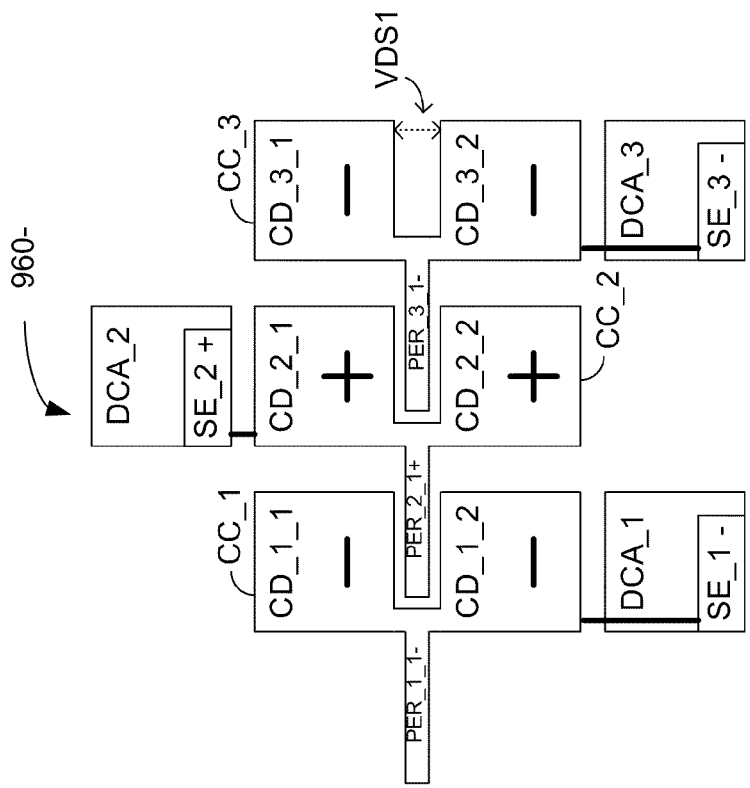
FIGS. 9(g)-9(h) illustrate a pixel design in accordance with one embodiment of the present invention.
Figure 9G:
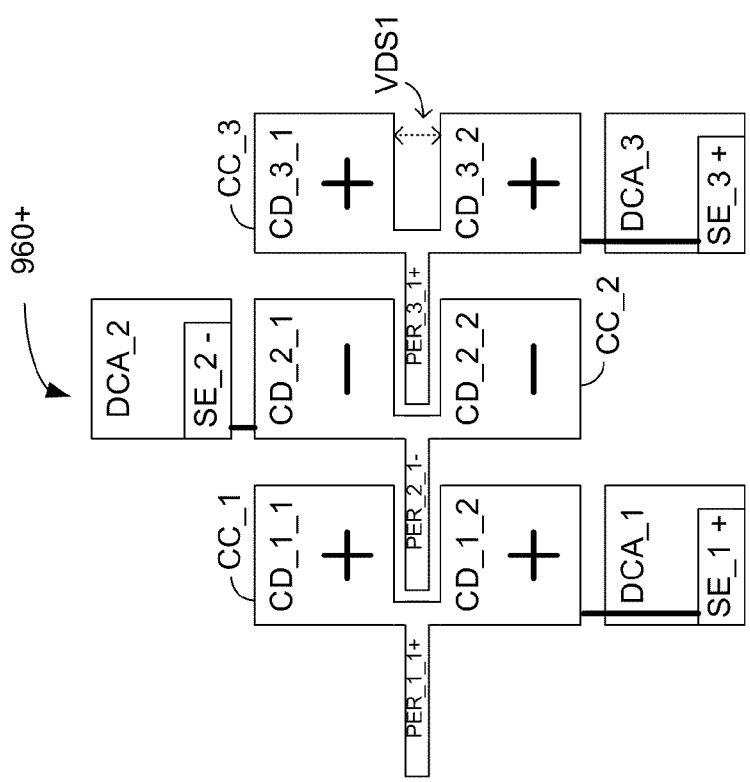
Figure 9J:
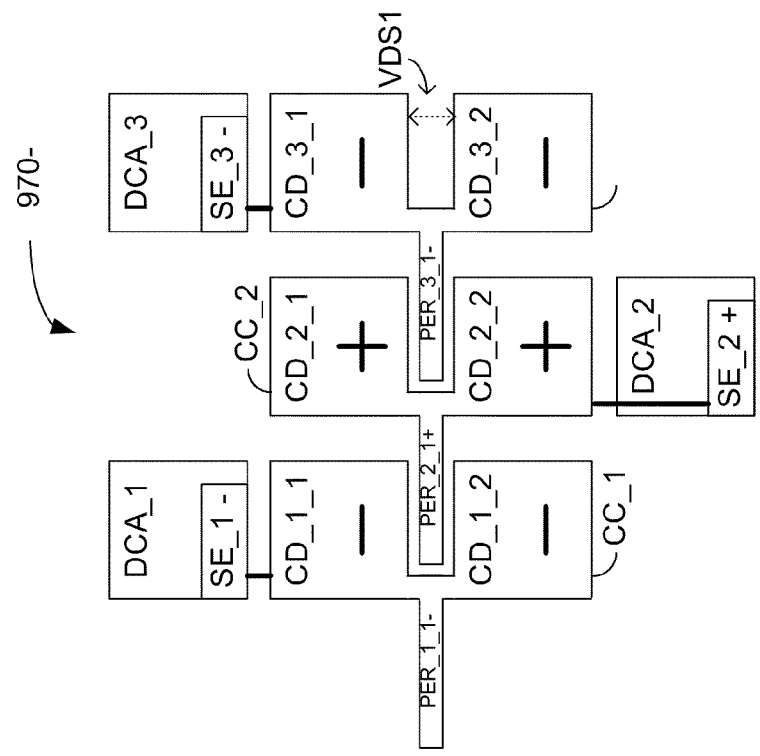
FIGS. 9(i)-9(j) illustrate a pixel design in accordance with one embodiment of the present invention.
Figure 9I:
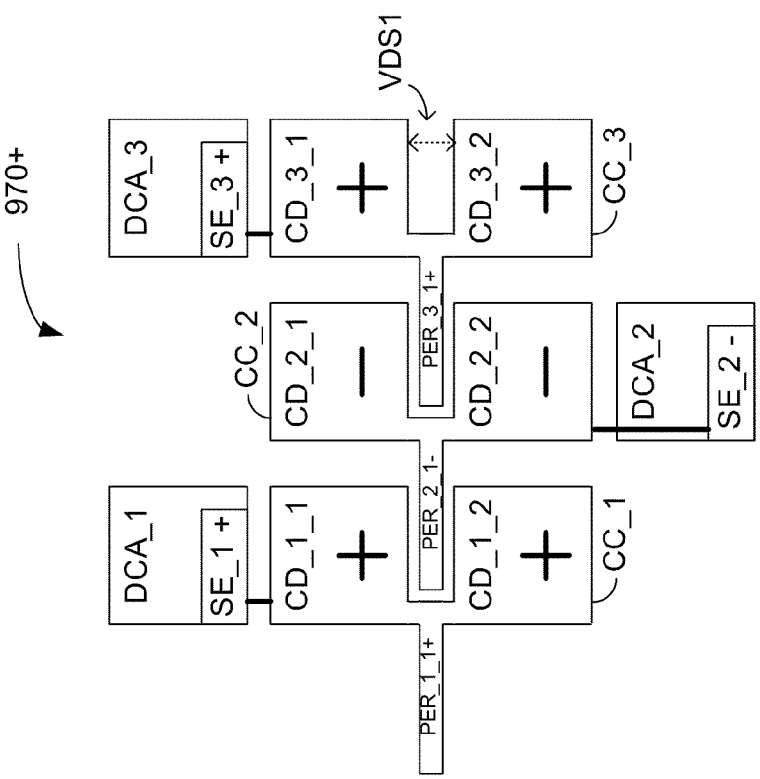
Figure 9K:
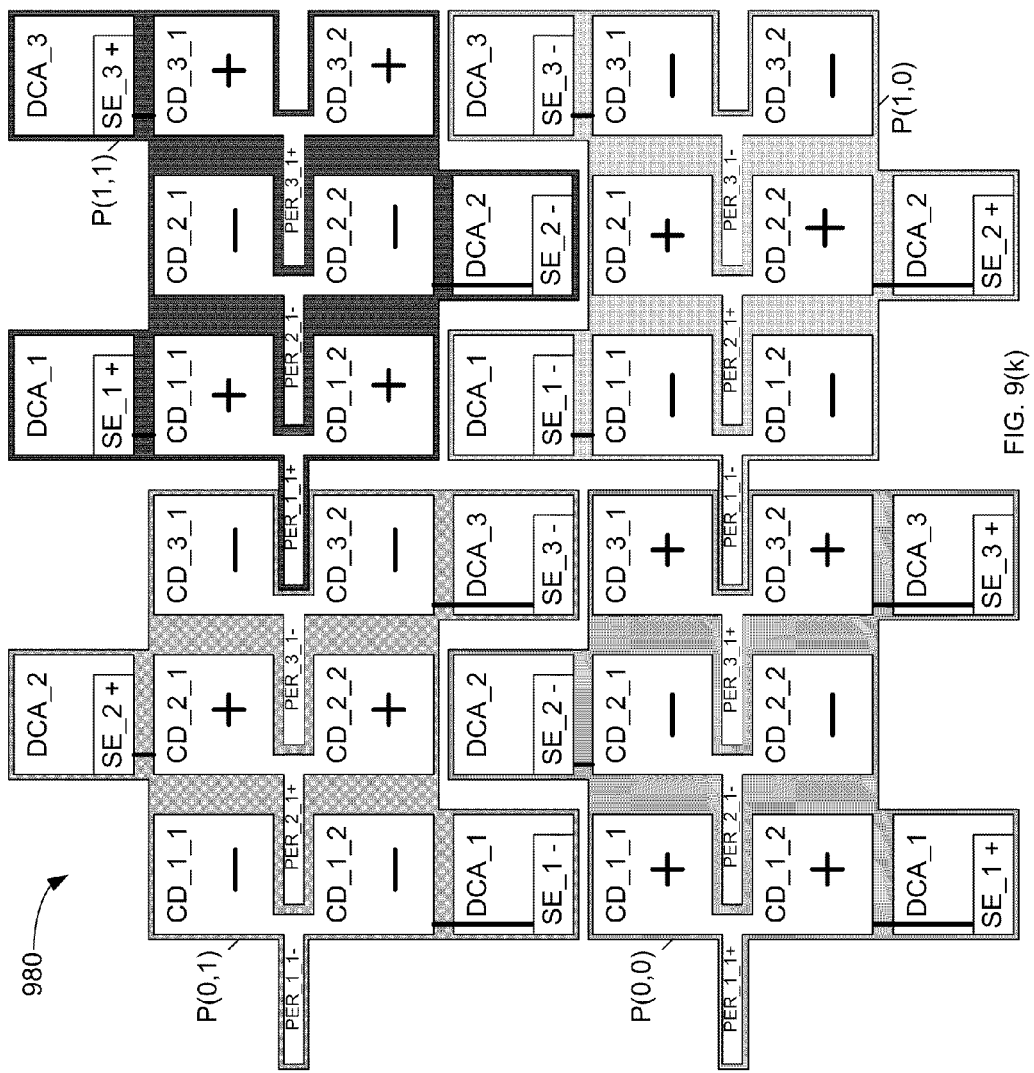
FIG. 9(k) illustrates a liquid crystal display in accordance with one embodiment of the present invention.

FIG. 8(e) shows a portion of a display 850 that combines pixels using pixel designs 810 and pixel design 820. Because the source line and gate line connections for display 850 are the same as the gate line and source line connections for display 750 (FIG. 7(f)), the gate lines and source lines that power the switching elements are omitted in FIG. 8(e). To better illustrate each pixel, the area of each pixel is shaded; this shading is only for illustrative purposes in FIG. 8(e) and has no functional significance. Each row of display 850 has alternating pixels of pixel design 810 and pixel design 820. For example in row 0, pixel P(0,0) uses pixel design 810 and pixel P(1,0) uses pixel design 820. Pixel P(2,0) (not shown) would use pixel design 810. Similarly, in row 1, pixel P(0,1) uses pixel design 810 and pixel P(1,1) uses pixel design 820, and pixel P(2, 1) (not shown) uses pixel design 810. Within a row the associated dots of adjacent pixels are vertically aligned and horizontally separated by one horizontal dot spacing HDS1 (not labeled in FIG. 8(e)). The rows in display 850 are horizontally aligned and vertically interleaved so polarity enhancement regions of one pixel is placed in between color dots of another pixel. For example, polarity enhancement region P_2_1 of pixel P(0, 1) is located in between color dots CD_1_1 and CD_1_2 of pixel P(0, 0). Similarly, polarity extension region PER_3_1 of pixel P(0, 0) is located between color dots CD_2_1 and CD_2_2 of pixel P(0, 1).

All the pixels on a row have the same polarity. However, alternating rows have different polarities. Thus for example, row 0 is shown with positive dot polarity pattern while row 1 is show with negative dot polarity pattern. In the next frame row 0 would have negative dot polarity pattern while row 1 would have positive dot polarity pattern. In general, even numbered rows have a first dot polarity pattern and odd number rows have a second dot polarity pattern. This arrangement of row polarity is an example of switching element row inversion driving scheme, which is often referred to as simply "row inversion." In general a pixel P(X,Y) in display 850 uses pixel design 810 where X is even and uses pixel design 820 where X is odd. Furthermore, pixel P(X,Y) has a first dot polarity pattern when Y is even and a second dot polarity pattern when Y is odd. In a particular embodiment of the present invention, each color dot has a width of 43 micrometers and a height of 47 micrometers. Each associated dot has a width of 43 micrometers and a height of 39 micrometers. The horizontal and vertical dot spacing is 4 micrometers.

As illustrated in FIG. 8(*e*), using the pixel designs described above, the color dots of display 850 have opposite polarity as compared to neighboring polarized components. Thus, the fringe fields in each color dot are amplified to produce multiple liquid crystal domains. Because each row of switching elements have the same polarity, while alternating rows of switching elements of opposite polarity, display 850 uses a switching element row inversion driving scheme.

FIGS. 9(*a*) and 9(*b*) show the positive and negative dot polarity patterns of a pixel design 910. The layout of pixel design 910 is very similar to pixel design 410 (FIGS. 4(*a*) and 4(*b*)). Thus for brevity only the differences are described. Specifically, in pixel design 910 the color components (i.e. color dots and polarity extension regions) are in the same position as in pixel design 410. In addition switching elements SE_1 and SE_3, and device component areas DCA_1 and DCA_3 are also in the same location as in pixel design 410. However, in pixel design 910, switching element SE_2 and device component area DCA_2 is located above color component CC_2. Thus, unlike the previous pixel design, the switching elements of pixel design 910 are in multiple rows. As explained above, each row of switching elements is coupled to a single gate line. Furthermore, only one gate line is active at a time. Thus, for pixel design 910, switching element SE_2 is active at a different time than switching elements SE_1 and SE_3. A driving scheme that is well suited for pixel design 910 is described in U.S. patent application Ser. No. 11/751,469 entitled "Low Cost Switching Element Point Inversion Driving Scheme for Liquid Crystal Displays", by Hiap L. Ong, which is incorporated herein by reference. Furthermore, this driving scheme is illustrated in FIG. 9(*f*). In the positive dot polarity pattern of pixel design 910, which is illustrated in FIG. 9(*a*), color component CC_1 (i.e. color dots CD_1_1, CD_1_2, and CD_1_3, and polarity extension regions PER_1_1 and PER_1_2), color component CC_3 (i.e. color dots CD_3_1, CD_3_2, and CD_3_3, and polarity extension regions PER_3_1 and PER_3_2), and switching elements SE_1 and SE_3 have positive polarity. Color component CC_2 (i.e. color dots CD_2_1, CD_2_2, and CD_2_3, and polarity extension regions PER_2_1 and PER_2_2) and switching element SE_2 have negative polarity. In the negative dot polarity pattern of pixel design 910, which is illustrated in FIG. 9(*b*), color component CC_1 (i.e. color dots CD_1_1, CD_1_2, and CD_1_3, and polarity extension regions PER_1_1 and PER_1_2), color component CC_3 (i.e. color dots CD_3_1, CD_3_2, and CD_3_3, and polarity extension regions PER_3_1 and PER_3_2), and switching elements SE_1 and SE_3 have negative polarity. Color component CC_2 (i.e. color dots CD_2_1, CD_2_2, and CD_2_3, and polarity extension regions PER_2_1 and PER_2_2) and switching element SE_2 have positive polarity.

FIGS. 9(*c*) and 9(*d*) show the positive and negative dot polarity patterns of a pixel design 920. The layout of pixel design 920 is very similar to pixel design 410 (FIGS. 4(*a*) and 4(*b*)). Thus for brevity only the differences are described. Specifically, in pixel design 920 the color components (i.e. color dots and polarity extension regions) are in the same position as in pixel design 410. In addition switching elements SE_2 and device component area DCA_2 are also in the same location as in pixel design 410. However, in pixel design 920, switching elements SE_1 and SE_3 and device component areas DCA_1 and DCA_3 is located above color components CC_1 and CC_3, respectively. Thus, like pixel design 910, the switching elements of pixel design 920 are in multiple rows. In the positive dot polarity pattern of pixel design 920, which is illustrated in FIG. 9(*c*), color component CC_1 (i.e. color dots CD_1_1, CD_1_2, and CD_1_3, and polarity extension regions PER_1_1 and PER_1_2), color component CC_3 (i.e. color dots CD_3_1, CD_3_2, and CD_3_3, and polarity extension regions PER_3_1 and PER_3_2), and switching elements SE_1 and SE_3 have positive polarity. Color component CC_2 (i.e. color dots CD_2_1, CD_2_2, and CD_2_3, and polarity extension regions PER_2_1 and PER_2_2) and switching element SE_2 have negative polarity. In the negative dot polarity pattern of pixel design 920, which is illustrated in FIG. 9(*d*), color component CC_1 (i.e. color dots CD_1_1, CD_1_2, and CD_1_3, and polarity extension regions PER_1_1 and PER_1_2), color component CC_3 (i.e. color dots CD_3_1, CD_3_2, and CD_3_3, and polarity extension regions PER_3_1 and PER_3_2), and switching elements SE_1 and SE_3 have negative polarity. Color component CC_2 (i.e. color dots CD_2_1, CD_2_2, and CD_2_3, and polarity extension regions PER_2_1 and PER_2_2) and switching element SE_2 have positive polarity.

FIG. 9(*e*) shows a portion of a display 950 that combines pixels using pixel designs 910 and pixel design 920. For clarity, the gate lines and source lines that power the switching elements are omitted in FIG. 9(*e*). Gate line and source line connections for display 950 are shown in FIG. 9(*f*). To better illustrate each pixel, the area of each pixel is shaded; this shading is only for illustrative purposes in FIG. 9(*e*) and has no functional significance. Each row of display 950 has alternating pixels of pixel design 910 and pixel design 920. For example in row 0, pixel P(0,0) uses pixel design 910 and pixel P(1,0) uses pixel design 920. Pixel P(2,0) (not shown) would use pixel design 910. Similarly, in row 1, pixel P(0,1) uses pixel design 910 and pixel P(1,1) uses pixel design 920, and pixel P(2, 1) (not shown) uses pixel design 910. The pixels in a row of display 950 are vertically aligned and horizontally separated by horizontal dot spacing HDS1 (not shown in FIG. 9(*e*)). However, the polarity extension regions of the first color component of a first pixel is placed in between the color dots of the third color component of a second pixel to the left of the first pixel. For example polarity enhancement region P_1_1 of pixel P(1, 1) is located in between color dots CD_3_1 and CD_3_2 of pixel P(0, 1) and polarity enhancement region P_1_2 of pixel P(1, 1) is located in between color dots CD_3_2 and CD_3_3 of pixel P(0, 1).

Within a column of pixels, the color components of the pixels are horizontally aligned. However, the device component areas of the pixels are horizontally interleaved. Specifically, the top device component areas (and switching elements) of pixels in a first row are vertically aligned with the bottom device component areas (and switching elements) of pixels in a second row (located above the first row). For example, device component area DCA_2 of pixel P(0, 0) is vertically aligned with device component areas DCA_1 and DCA_3 of pixel P(0, 1). Furthermore, device component area DCA_2 of pixel P(0, 0) is located in between device component areas DCA_1 and DCA_3 of pixel P(0, 1).

The pixels in each column alternate between having the positive dot polarity pattern and having the negative dot polarity pattern. Thus for example, on column 0, pixel P(0, 0) has the positive dot polarity pattern and pixel P(0, 1) has the negative dot polarity pattern. Similarly on column 1, pixel P(1, 0) has the negative dot polarity pattern and pixel P(1, 1) has the positive dot polarity pattern. Furthermore, the pixels on each row also alternate between having the positive dot polarity pattern and having the negative dot polarity pattern. Thus for example, on row 0, pixel P(0, 0) has the positive dot polarity pattern and pixel P(1, 0) has the negative dot polarity pattern. Similarly on row 1, pixel P(0, 1) has the negative dot polarity pattern and pixel P(1, 1) has the positive dot polarity pattern. In general a pixel P(X,Y) in display 950 uses pixel design 910 where X is even and uses pixel design 920 where X is odd. Furthermore, pixel P(X,Y) has a first dot polarity pattern when X+Y is even and a second dot polarity pattern when X+Y is odd. Due to the nature of the pixel designs, each row of switching element in display 950 has the same polarity. Thus, display 950 uses a switching element row inversion driving scheme. In a particular embodiment of the present invention, each color dot has a width of 43 micrometers and a height of 49 micrometers. Each associated dot has a width of 43 micrometers and a height of 39 micrometers. The horizontal and vertical dot spacing is 4 micrometers.

As illustrated in FIG. 9(*e*), using the pixel designs described above, the color dots of display 950 have opposite polarity as compared to neighboring polarized components. Thus, the fringe fields in each color dot are amplified to produce multiple liquid crystal domains.

FIG. 9(*f*) illustrates the same portion of a display 950 as FIG. 9(*e*) (i.e., pixels P(0, 0), P(1, 0), P(0, 1), and P(1, 1)). However, FIG. 9(*f*) emphasizes the gate and source lines and thus for clarity some pixel details (such as color dot references and polarity which are shown in FIG. 9(*e*)) are omitted in FIG. 9(*f*). Furthermore, the area of each pixel is shaded; this shading is only for illustrative purposes in FIG. 9(*f*) and has no functional significance. FIG. 9(*f*) is drawn showing source lines (S_0_1, S_0_2, S_0_3, S_1_1, S_1_2, and S_1_3) and gate lines (G_0, G_1 and G_2). In general, a source line S_X_Z and gate line G_Y is used for the color component CC_Z of pixel P(X, Y). The source terminal of a transistor is coupled to a source line and the gate terminal of the transistor is coupled to a gate line. The drain terminal of the transistor is coupled to the electrode of the various color components. For clarity, transistors, which are used as the switching elements in display 950, are referenced as transistor T(S_X_Z, G_Y) where S_X_Z is the source line coupled to the transistor and G_Y is the gate line coupled to the transistor. Thus transistor 951 in FIG. 9(*f*) is referenced herein as transistor T(S_1_3, G_1) because the source terminal of transistor 951 is coupled to source line S_1_3 and the gate terminal of transistor 951 is coupled to gate line G_1. Each transistor is located within a device component area. Specifically, a transistor T(S_X_Z, G_Y) is located within device component area DCA_Z of pixel P(X, Y). Electrode connections are drawn in bold lines. Thus for example in pixel P(0, 1), which is controlled by gate lines G_1 and G_2 and source lines S_0_1, S_0_2, and S_0_3, the drain terminal of transistor T(S_0_1, G_1) is coupled to the electrode color component CC_1. Similarly, the drain terminal of transistor T(S_0_2, G_2) is coupled to the electrode of color component CC_2 and the drain terminal of transistor T(S_0_3, G_1) is coupled to the electrode of color component CC_3. Furthermore, the gate terminals of transistors T(S_0_1, G_1) and T(SO_3, G_1) are coupled to gate line G_1 while the gate terminal of transistor T(S_0_2, G_2) is coupled to gate line G_2. The source terminals of transistors T(S_0_1, G_1), T(S_0_2, G_2), and T(SO_3, G_1) are coupled to source lines S_0_1, S_0_2, and S_0_3, respectively. Similarly, the components of pixel P(1,1) are coupled to gate lines G_1 and G_2 and source lines S_1_1, S_1_2, and S_1_3. The components of pixel P(0, 0) are coupled to gate lines G_0 and G_1 and source lines S_0_1, S_0_2, and S_0_3; and the components of pixel P(1, 0) are coupled to gate lines G_0 and G_1 and source lines S_1_1, S_1_2, and S_1_3.

As explained above, during operation only one gate line is active at a time. All transistors coupled to the active gate line are rendered conductive by a positive gate impulse from the active gate line. Transistors in other rows are blocked by grounding the non-active gate lines. All source lines are active at the same time and each source line provides video data to one transistor on the active row (as controlled by the active gate line). However, each pixel in display 950 is controlled by two gate lines. Therefore, a special driving scheme is used with display 950 to synchronize the source data with the pixel configurations. Specifically, delayed source signal S_0_2_D, S_1_1_D, and S_1_3_D are applied to source lines S_0_2, S_1_1, and S_1_3, respectively. The delayed source lines can be generated using a delay line or other conventional circuits from source signals S_0_2, S_1_1 and S_1_3 (as used in FIG. 4(*e*) for example). The delay period is equal to one row refresh period. In one embodiment of the application, the delayed source signals are generated from the normal source signals, the driving circuits and controllers do not need to be modified for the use with the novel driving scheme of the present invention. In another embodiment of the application, the delayed source signals are generated from the timing controller, the driving circuits and other controllers do not need to be modified for the use with the novel driving scheme of the present invention. As stated above, the novel driving scheme is described in detail in U.S. patent application Ser. No. 11/751,469, entitled "Low Cost Switching Element Point Inversion Driving Scheme."

FIGS. 9(*g*) and 9(*h*) show the positive and negative dot polarity patterns of a pixel design 960, which is a 2 dot per color component variation of pixel design 910. The layout of pixel design 960 is very similar to pixel design 910 (FIGS. 9(*a*) and 9(*b*)). Thus for brevity only the differences are described. Specifically, in pixel design 960 the color components include only two color dots and only one polarity extension region. The two color dots of the color components of pixel design 960 are arranged in a column with the color dots separated by a first vertical dot spacing VDS1. The color components of pixel design 960 include a single polarity extension region (e.g. PER_1_1), which extends to the left of color dots. The polarity extension region of a color component is vertically centered between the color dots and has a rectangular shape with a height that is less than vertical dot separation VDS1 and a width that is approximately one color dot width CDW. Specifically, in the first color component of pixel design 960, color dot CD_1_1 is vertically adjacent to and above color dot CD_1_2. In addition, color dots CD_1_1 and CD_1_2 are horizontally aligned. Polarity extension region PER_1_1 extends to the left of color dots CD_1_1 and CD_1_2 and is vertically centered between color dot CD_1_1 and CD_1_2. In general, the height of polarity extension regions is 4-6 micrometers and the width is 4-6 micrometers less than the color dot width.

The switching elements and device component areas are arranged in the same pattern relative to the color components in pixel design 960 as in pixel design 910. Specifically, switching elements SE_1 and SE_3 and device component areas DCA_1 and DCA_3 are located below color components CC_1 and CC_3, respectively. Switching element SE_2 and device component area DCA_2 are located above color component CC_2. As explained above, each row of switching elements is coupled to a single gate line. Furthermore, only one gate line is active at a time. Thus, for pixel design 960, switching element SE_2 is active at a different time than switching elements SE_1 and SE_3. Thus, displays using pixel design 960 could use the same driving scheme as described above for pixel design 910. In the positive dot polarity pattern of pixel design 960, which is illustrated in FIG. 9(*g*), color component CC_1 (i.e. color dots CD_1_1, and CD_1_2 and polarity extension regions PER_1_1), color component CC_3 (i.e. color dots CD_3_1 and CD_3_2, and polarity extension regions PER_3_1), and switching elements SE_1 and SE_3 have positive polarity. Color component CC_2 (i.e. color dots CD_2_1 and CD_2_2, and polarity extension regions PER_2_1) and switching element SE_2 have negative polarity. In the negative dot polarity pattern of pixel design 960, which is illustrated in FIG. 9(*h*), color component CC_1 (i.e. color dots CD_1_1, CD_1_2, and polarity extension region PER_1_1), color component CC_3 (i.e. color dots CD_3_1 and CD_3_2, and polarity extension region PER_3_1), and switching elements SE_1 and SE_3 have negative polarity. Color component CC_2 (i.e. color dots CD_2_1 and CD_2_2, and polarity extension region PER_2_1) and switching element SE_2 have positive polarity.

FIGS. 9(*i*) and 9(*j*) show the positive and negative dot polarity patterns of a pixel design 970. The layout of pixel design 970 is very similar to pixel design 920 (FIGS. 9(*c*) and 9(*d*). Thus for brevity only the differences are described. Specifically, in pixel design 970 the color component have two color dots and one polarity extension regions instead of three color dots and two polarity extension regions. The two color dots of the color components of pixel design 970 are arranged in a column with the color dots separated by a first vertical dot spacing VDS1. The color components of pixel design 970 include a single polarity extension region (e.g. PER_1_1), which extends to the left of color dots. The polarity extension region of a color component is vertically centered between the color dots and has a rectangular shape with a height that is less than vertical dot separation VDS1 and a width that is approximately one color dot width CDW. The switching elements and device component area are in the same position as in pixel design 920. Specifically, switching elements SE_1 and SE_3 and device component areas DCA_1 and DCA_3 are located above color components CC_1 and CC_3, respectively. Switching element SE_2 and device component area DCA_2 are located below color component CC_2. As explained above, each row of switching elements is coupled to a single gate line. Thus, like pixel design 960, the switching elements of pixel design 970 are in multiple rows. In the positive dot polarity pattern of pixel design 970, which is illustrated in FIG. 9(*i*), color component CC_1 (i.e. color dots CD_1_1 and CD_1_2, and polarity extension region PER_1_1), color component CC_3 (i.e. color dots CD_3_1 and CD_3_2, and polarity extension region PER_3_1), and switching elements SE_1 and SE_3 have positive polarity. Color component CC_2 (i.e. color dots CD_2_1 and CD_2_2 and polarity extension regions PER_2_1) and switching element SE_2 have negative polarity. In the negative dot polarity pattern of pixel design 970, which is illustrated in FIG. 9(*j*), color component CC_1 (i.e. color dots CD_1_1 and CD_1_2, and polarity extension region PER_1_1), color component CC_3 (i.e. color dots CD_3_1 and CD_3_2, and polarity extension region PER_3_1), and switching elements SE_1 and SE_3 have negative polarity. Color component CC_2 (i.e. color dots CD_2_1 and CD_2_2, and polarity extension region PER_2_1) and switching element SE_2 have positive polarity.

FIG. 9(*k*) shows a portion of a display 980 that combines pixels using pixel designs 960 and pixel design 970. For clarity, the gate lines and source lines that power the switching elements are omitted in FIG. 9(*k*). The gate line and source line connections for display 970 are virtually identical to the gate line and source line connections for display 950, which are shown in FIG. 9(*f*). To better illustrate each pixel, the area of each pixel is shaded; this shading is only for illustrative purposes in FIG. 9(*k*) and has no functional significance. Each row of display 970 has alternating pixels of pixel design 960 and pixel design 970. For example in row 0, pixel P(0,0) uses pixel design 960 and pixel P(1,0) uses pixel design 970. Pixel P(2,0) (not shown) would use pixel design 960. Similarly, in row 1, pixel P(0,1) uses pixel design 960 and pixel P(1,1) uses pixel design 970, and pixel P(2, 1) (not shown) uses pixel design 960. The pixels in a row of display 980 are vertically aligned and horizontally separated by horizontal dot spacing HDS1 (not shown in FIG. 9(*k*)). However, the polarity extension region of the first color component of a first pixel is placed in between the color dots of the third color component of a second pixel to the left of the first pixel. For example polarity enhancement region P_1_1 of pixel P(1, 1) is located in between color dots CD_3_1 and CD_3_2 of pixel P(0, 1).

Within a column of pixels, the color components of the pixels are horizontally aligned. However, the device component areas of the pixels are horizontally interleaved. Specifically, the top device component areas (and switching elements) of pixels in a first row are vertically aligned with the bottom device component areas (and switching elements) of pixels in a second row (located above the first row). For example, device component area DCA_2 of pixel P(0, 0) is vertically aligned with device component areas DCA_1 and DCA_3 of pixel P(0, 1). Furthermore, device component area DCA_2 of pixel P(0, 0) is located in between device component areas DCA_1 and DCA_3 of pixel P(0, 1).

The pixels in each column alternate between having the positive dot polarity pattern and having the negative dot polarity pattern. Thus for example, on column 0, pixel P(0, 0) has the positive dot polarity pattern and pixel P(0, 1) has the negative dot polarity pattern. Similarly on column 1, pixel P(1, 0) has the negative dot polarity pattern and pixel P(1, 1) has the positive dot polarity pattern. Furthermore, the pixels on each row also alternate between having the positive dot polarity pattern and having the negative dot polarity pattern. Thus for example, on row 0, pixel P(0, 0) has the positive dot polarity pattern and pixel P(1, 0) has the negative dot polarity pattern. Similarly on row 1, pixel P(0, 1) has the negative dot polarity pattern and pixel P(1, 1) has the positive dot polarity pattern. In general a pixel P(X,Y) in display 980 uses pixel design 960 where X is even and uses pixel design 970 where X is odd. Furthermore, pixel P(X,Y) has a first dot polarity pattern when X+Y is even and a second dot polarity pattern when X+Y is odd. Due to the nature of the pixel designs, each row of switching element in display 980 has the same polarity.

Thus, display 980 uses a switching element row inversion driving scheme. In a particular embodiment of the present invention, each color dot has a width of 43 micrometers and a height of 49 micrometers. Each associated dot has a width of 43 micrometers and a height of 39 micrometers. The horizontal and vertical dot spacing is 4 micrometers.

As illustrated in FIG. 9(*k*), using the pixel designs described above, the color dots of display 980 have opposite polarity as compared to neighboring polarized components. Thus, the fringe fields in each color dot are amplified to produce multiple liquid crystal domains.

FIGS. 10(*a*) and 10(*b*) show the positive and negative dot polarity patterns of a pixel design 1010. The layout of pixel design 1010 is nearly identical to pixel design 910. Thus for brevity only the differences are described. Specifically, in pixel design 1010, the device component areas are replaced by two associated dots. Thus, device component area DCA_1 is replaced by associated dot AD_1_1 and AD_1_2; device component area DCA_2 is replaced by associated dots AD_2_1 and AD_2_2, and device component area DCA_3 is replaced by associated dots AD_3_1 and AD_3_2. Specifically, associated dot AD_1_2 is horizontally aligned with and below color dot CD_1_3. Associated dot AD_1_1 is horizontally aligned with and below associated dot AD_1_2. Associated dot AD_2_1 is horizontally aligned with and above color dot CD_2_1. Associated dot AD_2_2 is horizontally aligned with and above associated dot AD_2_1. Associated dot AD_3_2 is horizontally aligned with and below color dot CD_3_3. Associated dot AD_3_1 is horizontally aligned with and below associated dot AD_3_2. Switching elements SE_1, SE_2, and SE_3 are located within associated dots AD_1_1, AD_2_1, and AD_3_1.

As explained above, polarized components should have opposite polarity as compared with a neighboring color dot. Thus, associated dots AD_1_2, AD_2_1, and AD_3_2 should have opposite polarity as compared with color dots CD_1_3, CD_2_1, and CD_3_3, respectively. As will be made clear in FIG. 10(*e*), the polarity of associated dots AD_1_1, AD_2_1, and AD_3_1 should be opposite of the polarity of associated dots AD_1_2, AD_2_1, and AD_3_2, respectively.

Thus, in FIG. 10(*a*), which shows the positive dot polarity pattern of pixel design 1010+, switching elements SE_1, and SE_3; color dots CD_1_1, CD_1_2, CD_1_3, CD_3_1, CD_3_2, and CD_3_3; polarity extension regions PER_1_1, PER_1_2, PER_3_1, and PER_3_2, and associated dot AD_1_1, AD_2_1, and AD_3_1 have positive polarity as denoted by "+". Switching element SE_2; color dots CD_2_1, CD_2_2, and CD_2_3; polarity extension regions PER_2_1, and PER_2_2, and associated dots AD_1_2, AD_2_2, and AD_3_2 have negative polarity as denoted by "−".

In FIG. 10(*b*), which shows the negative dot polarity pattern of pixel design 1010−, switching elements SE_1, and SE_3; color dots CD_1_1, CD_1_2, CD_1_3, CD_3_1, CD_3_2, and CD_3_3; polarity extension regions PER_1_1, PER_1_2, PER_3_1, and PER_3_2, and associated dot AD_1_1, AD_2_1, and AD_3_1 have negative polarity as denoted by "−". Switching element SE_2; color dots CD_2_1, CD_2_2, and CD_2_3; polarity extension regions PER_2_1, and PER_2_2, and associated dots AD_1_2, AD_2_2, and AD_3_2 have positive polarity as denoted by "+".

To receive the proper polarity, the electrode of associated dot AD_1_1 is coupled to switching element SE_1. The electrode of associated dot AD_1_2 is coupled to the electrode of color dot CD_2_3 (i.e. the electrode of color component CC_2). The electrode of associated dot AD_2_1 is coupled to a polarity source from another pixel via ITO connector 1012. The electrode of associated dot AD_2_2 is coupled to a polarity source from another pixel via ITO connector 1011. The electrode of associated dot AD_3_1 is coupled to switching element SE_3 and the electrode of associated dot AD_3_2 is coupled to a polarity source from another pixel via ITO connector 1013.

FIGS. 10(*c*) and 10(*d*) show the positive and negative dot polarity patterns of a pixel design 1020. The layout of pixel design 1020 is nearly identical to pixel design 920. Thus for brevity only the differences are described. Specifically, in pixel design 1020, each of the device component areas is replaced by two associated dots. Thus, device component area DCA_1 is replaced by associated dot AD_1_1 and AD_1_2; device component area DCA_2 is replaced by associated dots AD_2_1 and AD_2_2, and device component area DCA_3 is replaced by associated dots AD_3_1 and AD_3_2. Specifically, associated dot AD_1_1 is horizontally aligned with and above color dot CD_1_1. Associated dot AD_1_2 is horizontally aligned with and above associated dot AD_1_1. Associated dot AD_2_2 is horizontally aligned with and below color dot CD_2_3. Associated dot AD_2_1 is horizontally aligned with and below associated dot AD_2_2. Associated dot AD_3_1 is horizontally aligned with and above color dot CD_3_1. Associated dot AD_3_2 is horizontally aligned with and above Associated dot AD_3_1. Switching elements SE_1, SE_2, and SE_3 are located within associated dots AD_1_1, AD_2_1, and AD_3_1.

As explained above, polarized components should have opposite polarity as compared with a neighboring color dot. Thus, associated dots AD_1_1, AD_2_2, and AD_3_1 should have opposite polarity as compared with color dots CD_1_1, CD_2_3, and CD_3_1, respectively. As will be made clear in FIG. 10(*e*), the polarity of associated dots AD_1_2, AD_2_1, and AD_3_2 should be opposite of the polarity of associated dots AD_1_1, AD_2_2, and AD_3_1, respectively.

Thus, in FIG. 10(*c*), which shows the positive dot polarity pattern of pixel design 1020+, switching elements SE_1, and SE_3; color dots CD_1_1, CD_1_2, CD_1_3, CD_3_1, CD_3_2, and CD_3_3; polarity extension regions PER_1_1, PER_1_2, PER_3_1, and PER_3_2, and associated dot AD_1_2, AD_2_2, and AD_3_2 have positive polarity as denoted by "+". Switching element SE_2; color dots CD_2_1, CD_2_2, and CD_2_3; polarity extension regions PER_2_1, and PER_2_2, and associated dots AD_1_1, AD_2_1, and AD_3_1 have negative polarity as denoted by "−".

In FIG. 10(*d*), which shows the negative dot polarity pattern of pixel design 1020−, switching elements SE_1, and SE_3; color dots CD_1_1, CD_1_2, CD_1_3, CD_3_1, CD_3_2, and CD_3_3; polarity extension regions PER_1_1, PER_1_2, PER_3_1, and PER_3_2, and associated dot AD_1_2, AD_2_2, and AD_3_2 have negative polarity as denoted by "−". Switching element SE_2; color dots CD_2_1, CD_2_2, and CD_2_3; polarity extension regions PER_2_1, and PER_2_2, and associated dots AD_1_1, AD_2_1, and AD_3_1 have positive polarity as denoted by "+".

To receive the proper polarity, the electrode of associated dot AD_1_1 is coupled to a polarity source from another pixel via ITO connector 1022. The electrode of associated dot AD_1_2 is coupled to a polarity source from another pixel via ITO connector 1021. The electrode of associated dot AD_2_2 is coupled to the electrode of color dot CD_3_3 (i.e. the electrode of color component CC_3). The electrode of associated dot AD_2_1 is coupled to switching element SE_2. The electrode of associated dot AD_3_1 is coupled to a polarity source from another pixel via ITO connector 1024 and the electrode of associated dot AD_3_2 is coupled to a polarity source from another pixel via ITO connector 1023.

FIG. 10(*e*) shows a portion of a display 1050 that combines pixels using pixel designs 1010 and pixel design 1020. Because the gate line and source line connections in display 1050 is similar to the gate line and source line connection in display 950 (See FIG. 9(*f*)), the gate lines and source lines that power the switching elements are omitted in FIG. 10(*e*). To better illustrate each pixel, the area of each pixel is shaded; this shading is only for illustrative purposes in FIG. 10(*e*) and has no functional significance. Each row of display 1050 has alternating pixels of pixel design 1010 and pixel design 1020. For example in row 0, pixel P(0,0) uses pixel design 1010 and pixel P(1,0) uses pixel design 1020. Pixel P(2,0) (not shown) would use pixel design 1010. Similarly, in row 1, pixel P(0,1) uses pixel design 1010 and pixel P(1,1) uses pixel design 1020. Pixel P(2, 1) (not shown) would use pixel design 1010. The pixels in a row of display 1050 are vertically aligned and horizontally separated by horizontal dot spacing HDS1 (not shown in FIG. 10(*e*)). However, the polarity extension regions of the first color component of a first pixel is placed in between the color dots of the third color component of a second pixel to the left of the first pixel. For example polarity enhancement region PER_1_1 of pixel P(1, 1) is located in between color dots CD_3_1 and CD_3_2 of pixel P(0, 1) and polarity enhancement region P_1_2 of pixel P(1, 1) is located in between color dots CD_3_2 and CD_3_3 of pixel P(0, 1).

Within a column of pixels, the color components of the pixels are horizontally aligned. However, the associated dots of the pixels are horizontally interleaved. Specifically, the top associated dots (and switching elements) of pixels in a first row are vertically aligned with the bottom associated dots (and switching elements) of pixels in a second row (located above the first row). More specifically, the associated dots form 2 rows. For example, associated dot AD_2_1 of pixel P(0, 0) is vertically aligned with associated dots AD_1_1 and AD_3_1 of pixel P(0, 1). Furthermore, associated dot AD_2_2 of pixel P(0, 0) is vertically aligned with associated dots AD_1_2 and AD_3_2 of pixel P(0, 1). In addition, associated dot AD_2_1 of pixel P(0, 0) is located in between associated dots AD_1_1 and AD_3_1 of pixel P(0, 1); and, associated dot AD_2_2 of pixel P(0, 0) is located in between associated dots AD_1_2 and AD_3_2 of pixel P(0, 1).

The pixels in each column alternate between having the positive dot polarity pattern and having the negative dot polarity pattern. Thus for example, on column 0, pixel P(0, 0) has the positive dot polarity pattern and pixel P(0, 1) has the negative dot polarity pattern. Similarly on column 1, pixel P(1, 0) has the negative dot polarity pattern and pixel P(1, 1) has the positive dot polarity pattern. Furthermore, the pixels on each row alternate between having the positive dot polarity pattern and having the negative dot polarity pattern. Thus for example, on row 0, pixel P(0, 0) has the positive dot polarity pattern and pixel P(1, 0) has the negative dot polarity pattern. Similarly on row 1, pixel P(0, 1) has the negative dot polarity pattern and pixel P(1, 1) has the positive dot polarity pattern. In general a pixel P(X,Y) in display 1050 uses pixel design 1010 where X is even and uses pixel design 1020 where X is odd. Furthermore, pixel P(X,Y) has a first dot polarity pattern when X+Y is even and a second dot polarity pattern when X+Y is odd. However due to the nature of the pixel designs, each row of switching element in display 1050 has the same polarity. Furthermore, every other row of switching elements has different polarity. Thus, display 1050 uses a switching element row inversion driving scheme. In a particular embodiment of the present invention, each color dot has a width of 43 micrometers and a height of 49 micrometers. Each associated dot has a width of 43 micrometers and a height of 39 micrometers. The horizontal and vertical dot spacing is 4 micrometers.

As illustrated in FIG. 10(*e*), using the pixel designs described above, the color dots of display 1050 have opposite polarity as compared to neighboring polarized components. Thus, the fringe fields in each color dot are amplified to produce multiple liquid crystal domains.

FIGS. 10(*g*) and 10(*h*) show the positive and negative dot polarity patterns of a pixel design 1060. Please note there is no FIG. 10(*f*) to maintain consistency between FIG. 9(*g*)-9(*k*) and 10(*g*)-10(*k*). The layout of pixel design 1060 is nearly identical to pixel design 960 (FIGS. 9(*g*) and 9(*h*)). Thus for brevity only the differences are described. Specifically, in pixel design 1060, each of the device component areas is replaced by two associated dots. Thus, device component area DCA_1 is replaced by associated dot AD_1_1 and AD_1_2; device component area DCA_2 is replaced by associated dots AD_2_1 and AD_2_2, and device component area DCA_3 is replaced by associated dots AD_3_1 and AD_3_2. Specifically, associated dot AD_1_2 is horizontally aligned with and below color dot CD_1_2. Associated dot AD_1_1 is horizontally aligned with and below associated dot AD_1_2. Associated dot AD_2_1 is horizontally aligned with and above color dot CD_2_1. Associated dot AD_2_2 is horizontally aligned with and above associated dot AD_2_1. Associated dot AD_3_2 is horizontally aligned with and below color dot CD_3_2. Associated dot AD_3_1 is horizontally aligned with and below associated dot AD_3_2. Switching elements SE_1, SE_2, and SE_3 are located within associated dots AD_1_1, AD_2_1, and AD_3_1.

As explained above, polarized components should have opposite polarity as compared with a neighboring color dot. Thus, associated dots AD_1_2, AD_2_1, and AD_3_2 should have opposite polarity as compared with color dots CD_1_2, CD_2_1, and CD_3_2, respectively. As will be made clear in FIG. 10(*k*), the polarity of associated dots AD_1_1, AD_2_1, and AD_3_1 should be opposite of the polarity of associated dots AD_1_2, AD_2_1, and AD_3_2, respectively.

Thus, in FIG. 10(*g*), which shows the positive dot polarity pattern of pixel design 1060+, switching elements SE_1, and SE_3; color dots CD_1_1, CD_1_2, CD_3_1, and CD_3_2; polarity extension regions PER_1_1 and PER_3_1; and associated dot AD_1_1, AD_2_1, and AD_3_1 have positive polarity as denoted by "+". Switching element SE_2; color dots CD_2_1 and CD_2_2; polarity extension region PER_2_1; and associated dots AD_1_2 and AD_2_2 have negative polarity as denoted by "−".

In FIG. 10(*h*), which shows the negative dot polarity pattern of pixel design 1010−, switching elements SE_1, and SE_3; color dots CD_1_1, CD_1_2, CD_3_1, and CD_3_2; polarity extension regions PER_1_1 and PER_3_1; and associated dots AD_1_1, AD_2_1, and AD_3_1 have negative polarity as denoted by "−". Switching element SE_2; color dots CD_2_1 and CD_2_2; polarity extension region PER_2_1; and associated dots AD_1_2, AD_2_2, and AD_3_2 have positive polarity as denoted by "+".

To receive the proper polarity, the electrode of associated dot AD_1_1 is coupled to switching element SE_1. The electrode of associated dot AD_1_2 is coupled to the electrode of color dot CD_2_2 (i.e. the electrode of color component CC_2). The electrode of associated dot AD_2_1 is coupled to a polarity source from another pixel via ITO connector 1061. The electrode of associated dot AD_2_2 is coupled to a polarity source from another pixel via ITO connector 1062. The electrode of associated dot AD_3_1 is coupled to switching element SE_3 and the electrode of associated dot AD_3_2 is coupled to a polarity source from another pixel via ITO connector 1063.

Figure 10D:
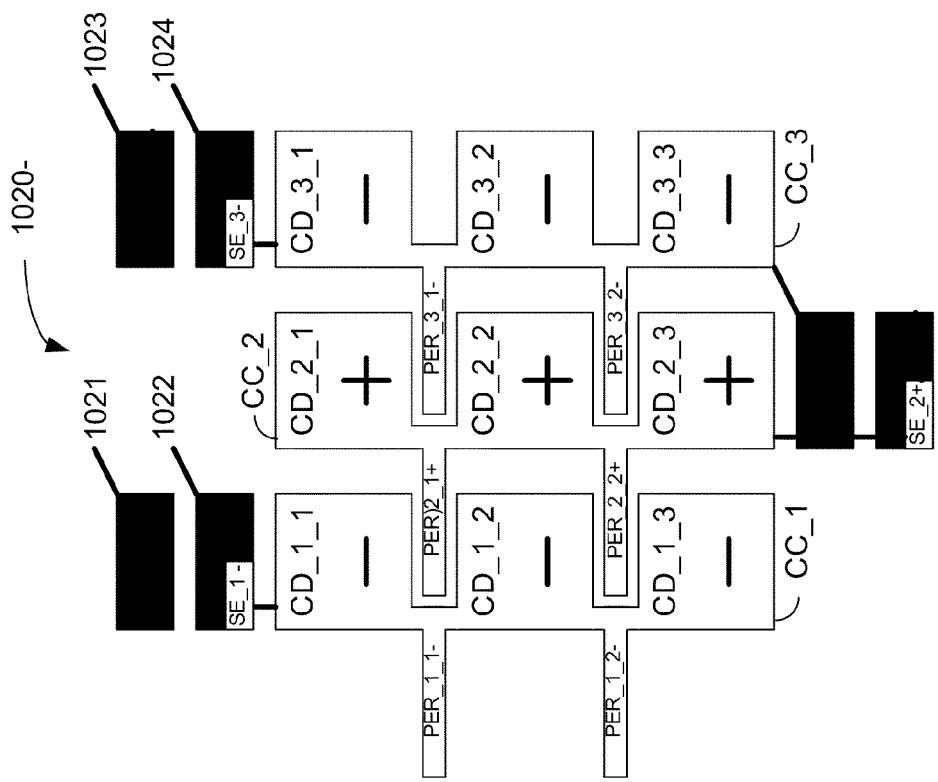
FIGS. 10(c)-10(d) illustrate a pixel design in accordance with one embodiment of the present invention.
Figure 10C:
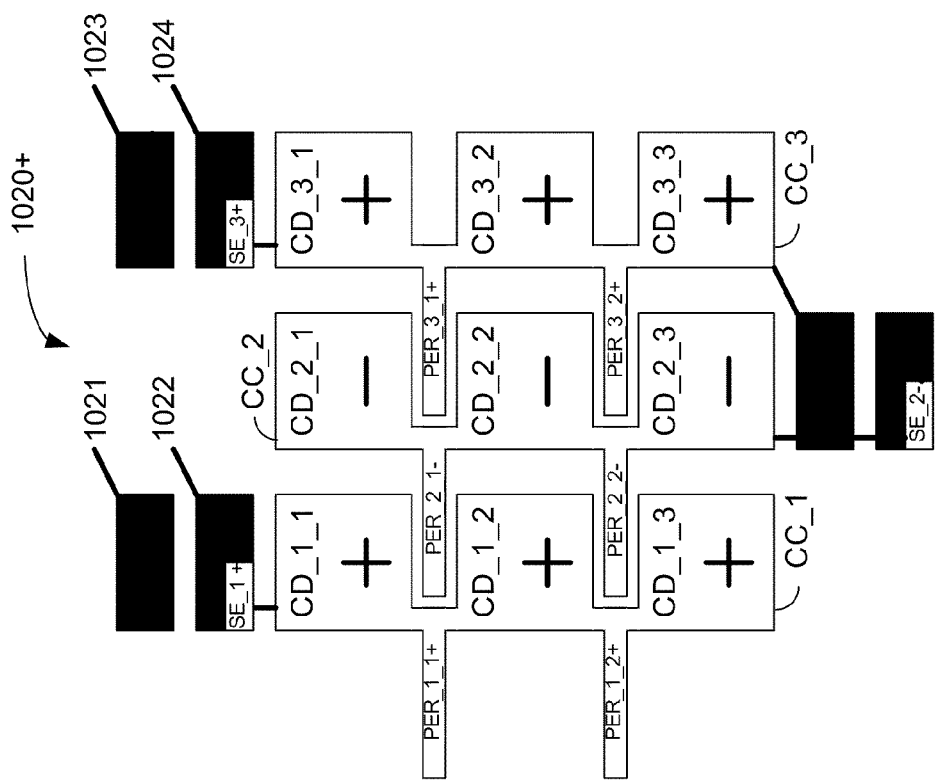
Figure 10E:
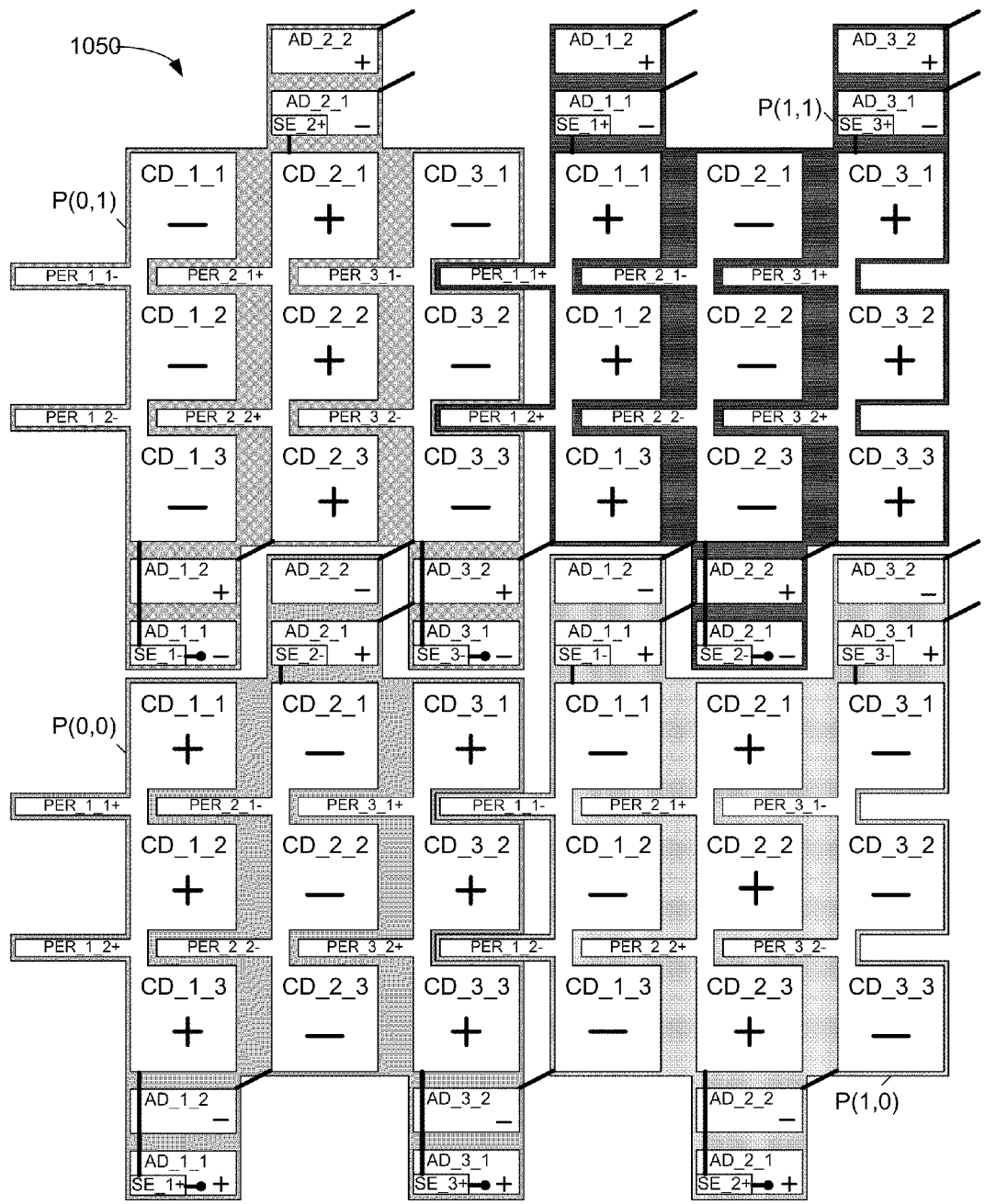
FIG. 10(e) illustrates a liquid crystal display in accordance with one embodiment of the present invention.
Figure 10H:
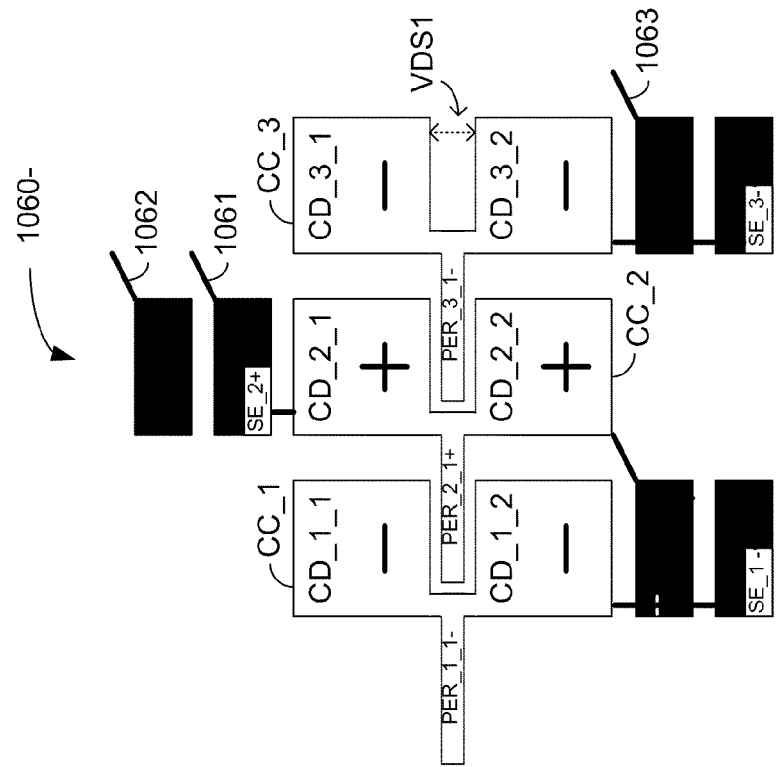
FIGS. 10(g)-10(h) illustrate a pixel design in accordance with one embodiment of the present invention.
Figure 10G:
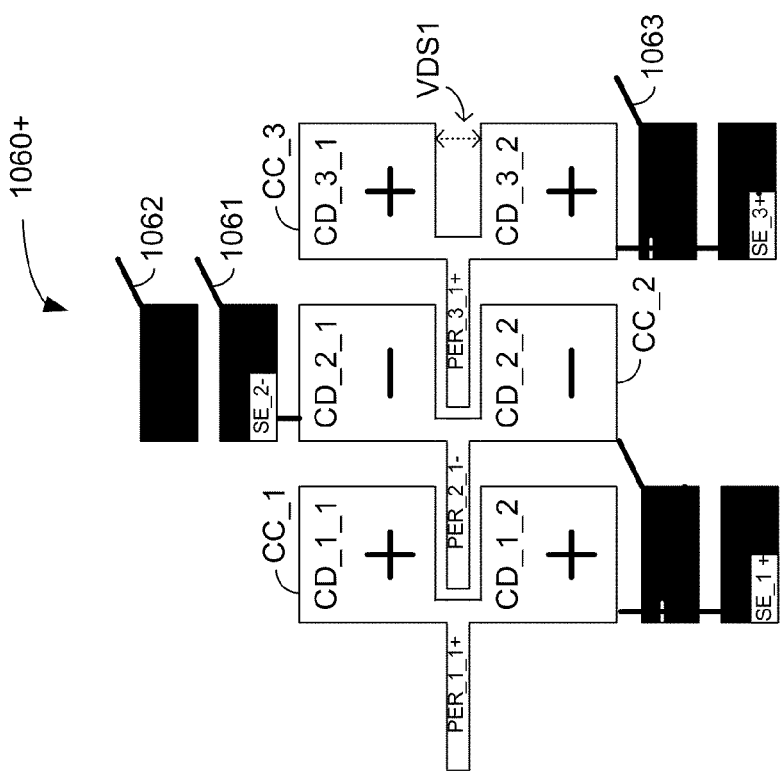
Figure 10J:
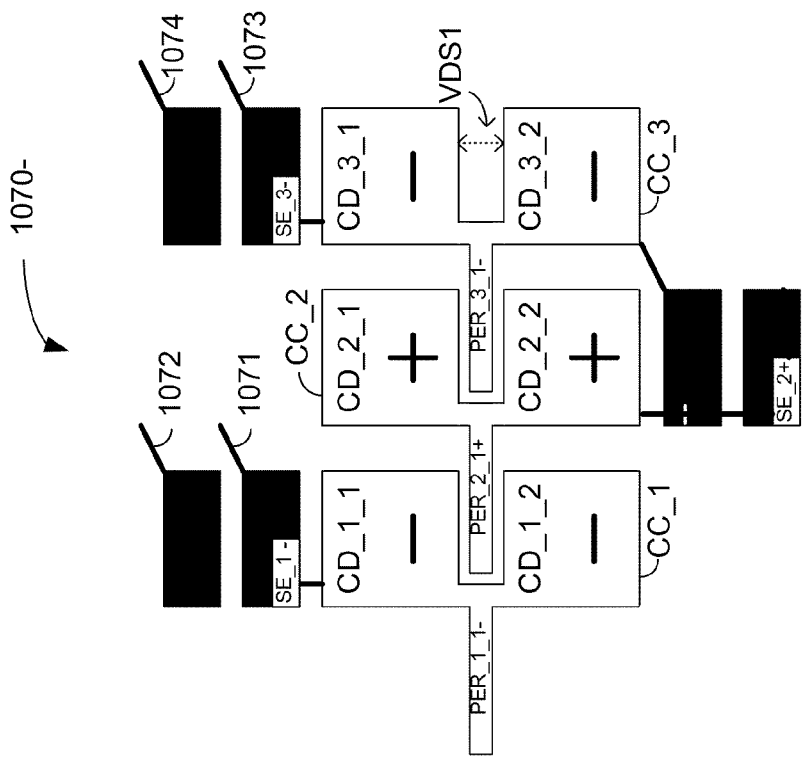
FIGS. 10(i)-10(j) illustrate a pixel design in accordance with one embodiment of the present invention.
Figure 10I:
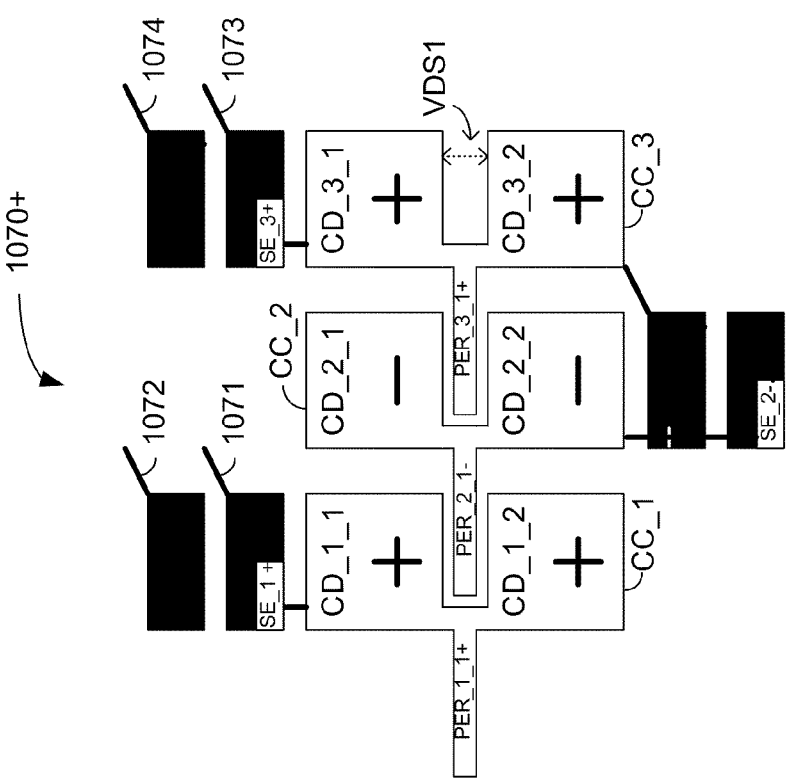

FIGS. 10(i) and 10(j) show the positive and negative dot polarity patterns of a pixel design 1070. The layout of pixel design 1070 is nearly identical to pixel design 970 (FIGS. 9(i) and 9(j). Thus for brevity only the differences are described. Specifically, in pixel design 1070, each of the device component areas is replaced by two associated dots. Thus, device component area DCA_1 is replaced by associated dot AD_1_1 and AD_1_2; device component area DCA_2 is replaced by associated dots AD_2_1 and AD_2_2, and device component area DCA_3 is replaced by associated dots AD_3_1 and AD_3_2. Specifically, associated dot AD_1_1 is horizontally aligned with and above color dot CD_1_1. Associated dot AD_1_2 is horizontally aligned with and above associated dot AD_1_1. Associated dot AD_2_2 is horizontally aligned with and below color dot CD_2_2. Associated dot AD_2_1 is horizontally aligned with and below associated dot AD_2_2. Associated dot AD_3_1 is horizontally aligned with and above color dot CD_3_1. Associated dot AD_3_2 is horizontally aligned with and above Associated dot AD_3_1. Switching elements SE_1, SE_2, and SE_3 are located within associated dots AD_1_1, AD_2_1, and AD_3_1.

As explained above, polarized components should have opposite polarity as compared with a neighboring color dot. Thus, associated dots AD_1_1, AD_2_2, and AD_3_1 should have opposite polarity as compared with color dots CD_1_1, CD_2_2, and CD_3_1, respectively. As will be made clear in FIG. 10(k), the polarity of associated dots AD_1_2, AD_2_1, and AD_3_2 should be opposite of the polarity of associated dots AD_1_1, AD_2_2, and AD_3_1, respectively.

Thus, in FIG. 10(i), which shows the positive dot polarity pattern of pixel design 1070+, switching elements SE_1, and SE_3; color dots CD_1_1, CD_1_2, CD_3_1, and CD_3_2; polarity extension regions PER_1_1 and PER_3_1; and associated dots AD_1_2, AD_2_2, and AD_3_2 have positive polarity as denoted by "+". Switching element SE_2; color dots CD_2_1 and CD_2_2; polarity extension region PER_2_1; and associated dots AD_1_1, AD_2_1, and AD_3_1 have negative polarity as denoted by "−".

In FIG. 10(j), which shows the negative dot polarity pattern of pixel design 1020−, switching elements SE_1, and SE_3; color dots CD_1_1, CD_1_2, CD_3_1, and CD_3_2; polarity extension regions PER_1_1 and PER_3_1; and associated dots AD_1_2, AD_2_2, and AD_3_2 have negative polarity as denoted by "−". Switching element SE_2; color dots CD_2_1 and CD_2_2; polarity extension region PER_2_1; and associated dots AD_1_1, AD_2_1, and AD_3_1 have positive polarity as denoted by "+".

To receive the proper polarity, the electrode of associated dot AD_1_1 is coupled to a polarity source from another pixel via ITO connector 1071. The electrode of associated dot AD_1_2 is coupled to a polarity source from another pixel via ITO connector 1072. The electrode of associated dot AD_2_2 is coupled to the electrode of color dot CD_3_3 (i.e. the electrode of color component CC_3). The electrode of associated dot AD_2_1 is coupled to switching element SE_2. The electrode of associated dot AD_3_1 is coupled to a polarity source from another pixel via ITO connector 1073 and the electrode of associated dot AD_3_2 is coupled to a polarity source from another pixel via ITO connector 1074.

Figure 10K:
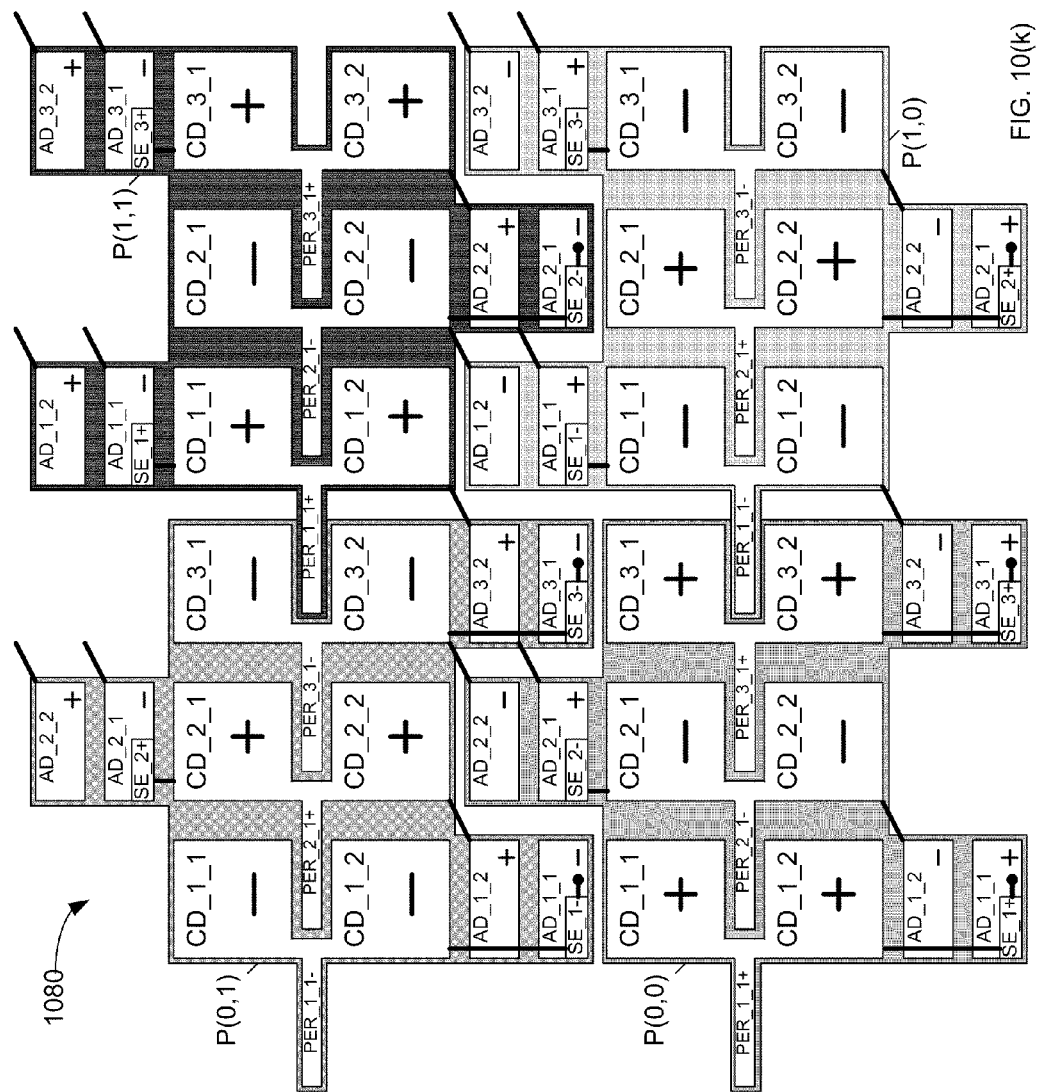
FIG. 10(k) illustrates a liquid crystal display in accordance with one embodiment of the present invention.

FIG. 10(k) shows a portion of a display 1080 that combines pixels using pixel designs 1060 and pixel design 1070. Because the gate line and source line connections in display 1080 is similar to the gate line and source line connection in display 950 (See FIG. 9(f)), the gate lines and source lines that power the switching elements are omitted in FIG. 10(k). To better illustrate each pixel, the area of each pixel is shaded; this shading is only for illustrative purposes in FIG. 10(k) and has no functional significance. Each row of display 1080 has alternating pixels of pixel design 1060 and pixel design 1070. For example in row 0, pixel P(0,0) uses pixel design 1060 and pixel P(1,0) uses pixel design 1070. Pixel P(2,0) (not shown) would use pixel design 1060. Similarly, in row 1, pixel P(0,1) uses pixel design 1060 and pixel P(1,1) uses pixel design 1070. Pixel P(2, 1) (not shown) would use pixel design 1060. The pixels in a row of display 1080 are vertically aligned and horizontally separated by horizontal dot spacing HDS1 (not shown in FIG. 10(k)). However, the polarity extension regions of the first color component of a first pixel is placed in between the color dots of the third color component of a second pixel to the left of the first pixel. For example polarity enhancement region PER_1_1 of pixel P(1, 1) is located in between color dots CD_3_1 and CD_3_2 of pixel P(0, 1).

Within a column of pixels, the color components of the pixels are horizontally aligned. However, the associated dots of the pixels are horizontally interleaved. Specifically, the top associated dots (and switching elements) of pixels in a first row are vertically aligned with the bottom associated dots (and switching elements) of pixels in a second row (located above the first row). More specifically, the associated dots form 2 rows. For example, associated dot AD_2_1 of pixel P(0, 0) is vertically aligned with associated dots AD_1_1 and AD_3_1 of pixel P(0, 1). Furthermore, associated dot AD_2_2 of pixel P(0, 0) is vertically aligned with associated dots AD_1_2 and AD_3_2 of pixel P(0, 1). In addition, associated dot AD_2_1 of pixel P(0, 0) is located in between associated dots AD_1_1 and AD_3_1 of pixel P(0, 1); and, associated dot AD_2_2 of pixel P(0, 0) is located in between associated dots AD_1_2 and AD_3_2 of pixel P(0, 1).

The pixels in each column alternate between having the positive dot polarity pattern and having the negative dot polarity pattern. Thus for example, on column 0, pixel P(0, 0) has the positive dot polarity pattern and pixel P(0, 1) has the negative dot polarity pattern. Similarly on column 1, pixel P(1, 0) has the negative dot polarity pattern and pixel P(1, 1) has the positive dot polarity pattern. Furthermore, the pixels on each row alternate between having the positive dot polarity pattern and having the negative dot polarity pattern. Thus for example, on row 0, pixel P(0, 0) has the positive dot polarity pattern and pixel P(1, 0) has the negative dot polarity pattern. Similarly on row 1, pixel P(0, 1) has the negative dot polarity pattern and pixel P(1, 1) has the positive dot polarity pattern. In general a pixel P(X,Y) in display 1080 uses pixel design 1060 where X is even and uses pixel design 1070 where X is odd. Furthermore, pixel P(X,Y) has a first dot polarity pattern when X+Y is even and a second dot polarity pattern when X+Y is odd. However due to the nature of the pixel designs, each row of switching element in display 1080 has the same polarity. Furthermore, every other row of switching elements has different polarity. Thus, display 1080 uses a switching element row inversion driving scheme. In a particular embodiment of the present invention, each color dot has a width of 43 micrometers and a height of 49 micrometers. Each associated dot has a width of 43 micrometers and a height of 39 micrometers. The horizontal and vertical dot spacing is 4 micrometers.

As illustrated in FIG. 10(k), using the pixel designs described above, the color dots of display 1080 have opposite polarity as compared to neighboring polarized components. Thus, the fringe fields in each color dot are amplified to produce multiple liquid crystal domains.

FIGS. 11(a)-11(g) show additional color components that can be used with different embodiments of the present invention. The color components in FIGS. 11(a)-11(g) can be used with the device component areas, associated dots, and switching element layouts described above.

Figure 11B:
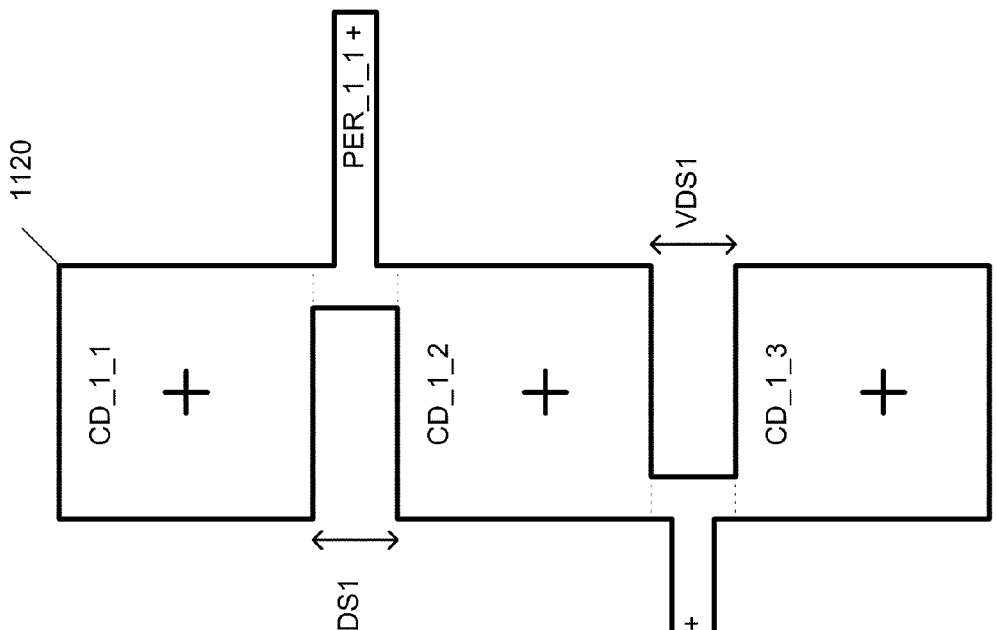
Figure 11A:
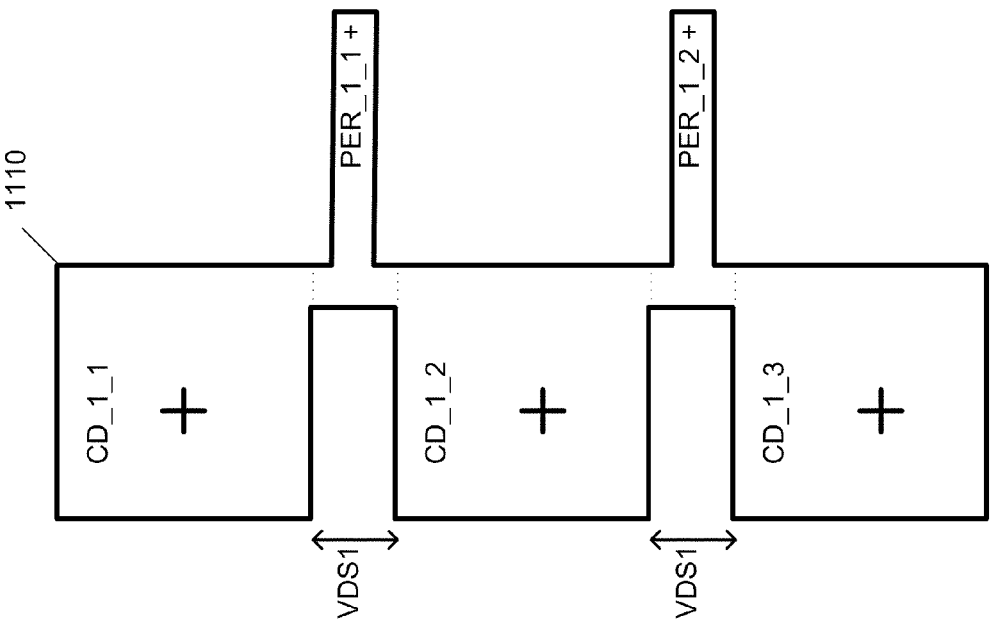

FIG. 11(a) shows color component 1110. In FIG. 11(a), for clarity, dashed lines are used to illustrate a "border" between color dots and polarity extension regions. However, in most embodiments of the present invention the color dots and polarity extension regions share one continuous electrode to minimize manufacturing cost. As shown in FIG. 11(a), the three color dots of color component 1110 are arranged in a column with each adjacent color dot separated by a first vertical dot spacing VDS1. Specifically, color dot CD_1_1 is vertically adjacent to and above color dot CD_1_2, which is vertically adjacent to and above color dot CD_1_3. In addition, color dots CD_1_1, CD_1_2, and CD_1_3 are horizontally aligned. Polarity extension regions PER_1_1 and PER_1_2 extend to the right of color dots CD_1_1, CD_1_2, and CD_1_3. Polarity extension region PER_1_1 is vertically centered between color dot CD_1_1 and CD_1_2. Polarity extension region PER_1_2 is vertically centered between color dots CD_1_2 and CD_1_3. Polarity extension regions PER_1_1 and PER_1_2 have a rectangular shape with a height that is less than vertical dot separation VDS1 and a width that is approximately one color dot width CDW. In general, the height of polarity extension regions is 4-6 micrometers and the width is 4-6 micrometers less than the color dot width. For example in one embodiment of the present invention of the present invention a color dot has a width of 43 micrometers, a height of 47 micrometers and the polarity extension regions have a width of 37 micrometers and a height of 6 micrometers.

FIG. 11(b) shows color component 1120. As shown in FIG. 11(b), the three color dots of color component 1120 are arranged in a column with each adjacent color dot separated by a first vertical dot spacing VDS1. Specifically, color dot CD_1_1 is vertically adjacent to and above color dot CD_1_2, which is vertically adjacent to and above color dot CD_1_3. In addition, color dots CD_1_1, CD_1_2, and CD_1_3 are horizontally aligned. Color component 1120 differs from previous color components because the polarity extension regions extend to both a first side of the color dots and a second side of the color dots. Specifically, polarity extension region PER_1_1 extend to the right of color dots CD_1_1, CD_1_2, and CD_1_3 while polarity extension region PER_1_2 extend to the left of color dots CD_1_1, CD_1_2, and CD_1_3. Polarity extension region PER_1_1 is vertically centered between color dot CD_1_1 and CD_1_2. Polarity extension region PER_1_2 is vertically centered between color dots CD_1_2 and CD_1_3. Polarity extension regions PER_1_1 and PER_1_2 have a rectangular shape with a height that is less than vertical dot separation VDS1 and a width that is approximately one color dot width CDW. In general, the height of polarity extension regions is 4-6 micrometers and the width is 4-6 micrometers less than the color dot width.

FIG. 11(c) shows color component 1130, which includes three polarity extension regions. As shown in FIG. 11(c), the three color dots of color component 1130 are arranged in a column with each adjacent color dot separated by a first vertical dot spacing VDS1. Specifically, color dot CD_1_1 is vertically adjacent to and above color dot CD_1_2, which is vertically adjacent to and above color dot CD_1_3. In addition, color dots CD_1_1, CD_1_2, and CD_1_3 are horizontally aligned. Polarity extension regions PER_1_1, PER_1_2, and PER_1_3 extend to the left of the column of color dots (i.e., color dots CD_1_1, CD_1_2, and CD_1_3). Polarity extension region PER_1_1 is vertically centered between color dot CD_1_1 and CD_1_2. Polarity extension region PER_1_2 is vertically centered between color dots CD_1_2 and CD_1_3. Polarity extension region PER_1_3 is vertically below color dot CD_1_3. Generally the extended portion of polarity extension region PER_1_3 is below color dot CD_1_3 by the same distance that the extended portion of polarity extension region PER_1_2 is below color dot CD_1_2. Polarity extension regions PER_1_1, PER_1_2, and PER_1_3 have a rectangular shape with a height that is less than vertical dot separation VDS1 and a width that is approximately one color dot width CDW. In general, the height of polarity extension regions is 4-6 micrometers and the width is 4-6 micrometers less than the color dot width.

FIG. 11(d) shows color component 1140, which includes four polarity extension regions. As shown in FIG. 11(d), the three color dots of color component 1140 are arranged in a column with each adjacent color dot separated by a first vertical dot spacing VDS1. Specifically, color dot CD_1_1 is vertically adjacent to and above color dot CD_1_2, which is vertically adjacent to and above color dot CD_1_3. In addition, color dots CD_1_1, CD_1_2, and CD_1_3 are horizontally aligned. Polarity extension regions PER_1_1, PER_1_2, PER_1_3, and PER_1_4, extend to the left of the column of color dots (i.e., color dots CD_1_1, CD_1_2, and CD_1_3). Polarity extension region PER_1_1 is vertically centered between color dot CD_1_1 and CD_1_2. Polarity extension region PER_1_2 is vertically centered between color dots CD_1_2 and CD_1_3. Polarity extension region PER_1_3 is vertically below color dot CD_1_3. Generally, the extended portion of polarity extension region PER_1_3 is below color dot CD_1_3 by the same distance that the extended portion of polarity extension region PER_1_2 is below color dot CD_1_2. Polarity extension region PER_1_4 is vertically above color dot CD_1_1. Generally, the extended portion of polarity extension region PER_1_4 is above color dot CD_1_1 by the same distance that the extended portion of polarity extension region PER_1_1 is above color dot CD_1_2. Polarity extension regions PER_1_1, PER_1_2, PER_1_3, and PER_1_4, have a rectangular shape with a height that is less than vertical dot separation VDS1 and a width that is approximately one color dot width CDW. In general, the height of polarity extension regions is 4-6 micrometers and the width is 4-6 micrometers less than the color dot width.

Figure 11F:
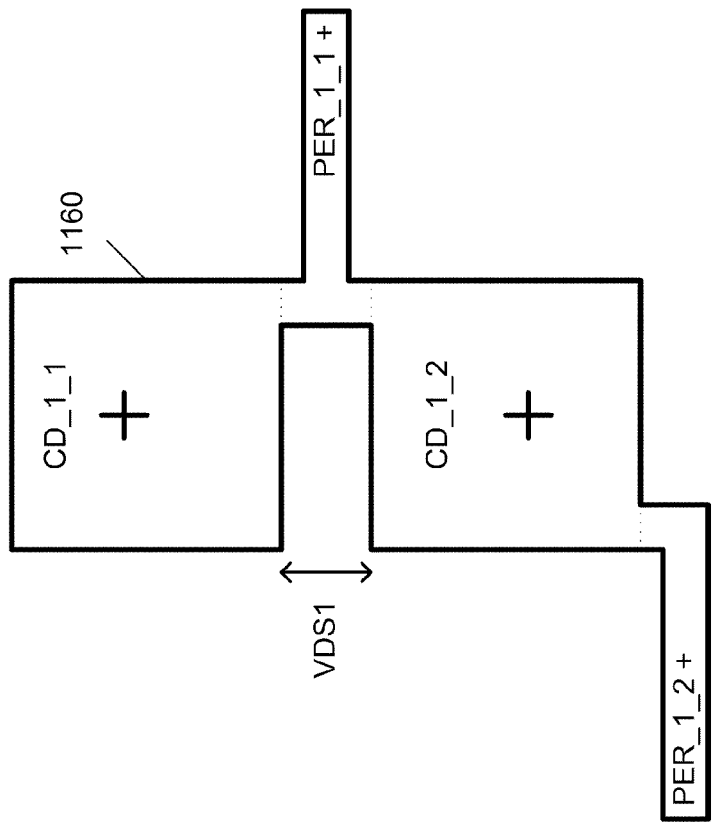
Figure 11E:
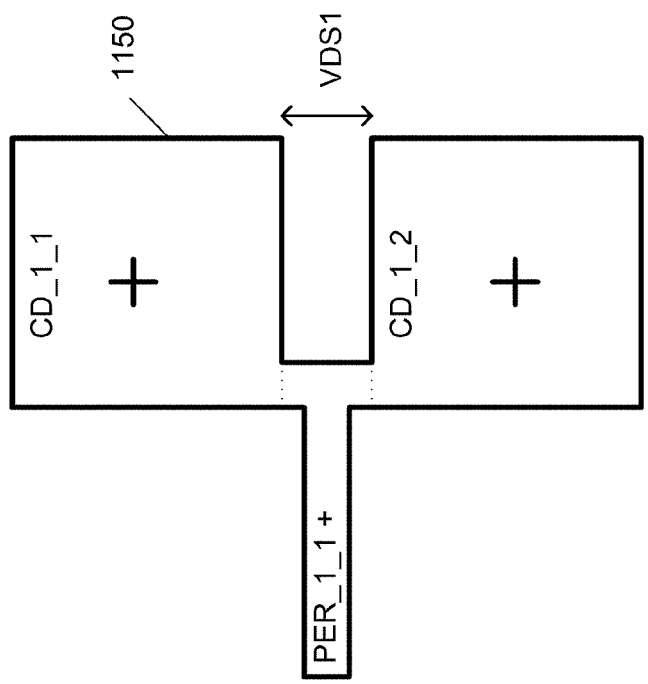

FIG. 11(e) shows color component 1150, which includes two color dots rather than three. As shown in FIG. 11(e), the two color dots of color component 1150 are arranged in a column with the color dot separated by a first vertical dot spacing VDS1. Specifically, color dot CD_1_1 is vertically adjacent to and above color dot CD_1_2. In addition, color dots CD_1_1 and CD_1_2 are horizontally aligned. Color component 1150 includes a single polarity extension region PER_1_1, which extends to the left of color dots CD_1_1 and CD_1_2. Polarity extension region PER_1_1 is vertically centered between color dot CD_1_1 and CD_1_2. Polarity extension region PER_1_1 has a rectangular shape with a height that is less than vertical dot separation VDS1 and a width that is approximately one color dot width CDW. In general, the height of polarity extension regions is 4-6 micrometers and the width is 4-6 micrometers less than the color dot width.

FIG. 11(f) shows a color component 1160, which also uses two color dots with two polarity extension regions. As shown in FIG. 11(f), the two color dots of color component 1160 are arranged in a column with the color dot separated by a first vertical dot spacing VDS1. Specifically, color dot CD_1_1 is vertically adjacent to and above color dot CD_1_2. In addition, color dots CD_1_1 and CD_1_2 are horizontally aligned. Color component 1160 includes a first polarity extension region PER_1_1, which extends to the right of color dots CD_1_1 and CD_1_2 and a second polarity extension region PER_1_2 that extends to the left of color dots CD_1_1 and CD_1_2. Polarity extension region PER_1_1 is vertically centered between color dot CD_1_1 and CD_1_2. Polarity extension region PER_1_2 is vertically below color dot CD_1_2. Generally, the extended portion of polarity extension region PER_1_2 is below color dot CD_1_2 by the same distance that the extended portion of polarity extension region PER_1_1 is below color dot CD_1_1. Polarity extension regions PER_1_1 and PER_1_2 have a rectangular shape with a height that is less than vertical dot separation VDS1 and a width that is approximately one color dot width CDW. In general, the height of polarity extension regions is 4-6 micrometers and the width is 4-6 micrometers less than the color dot width.

Figure 11G:
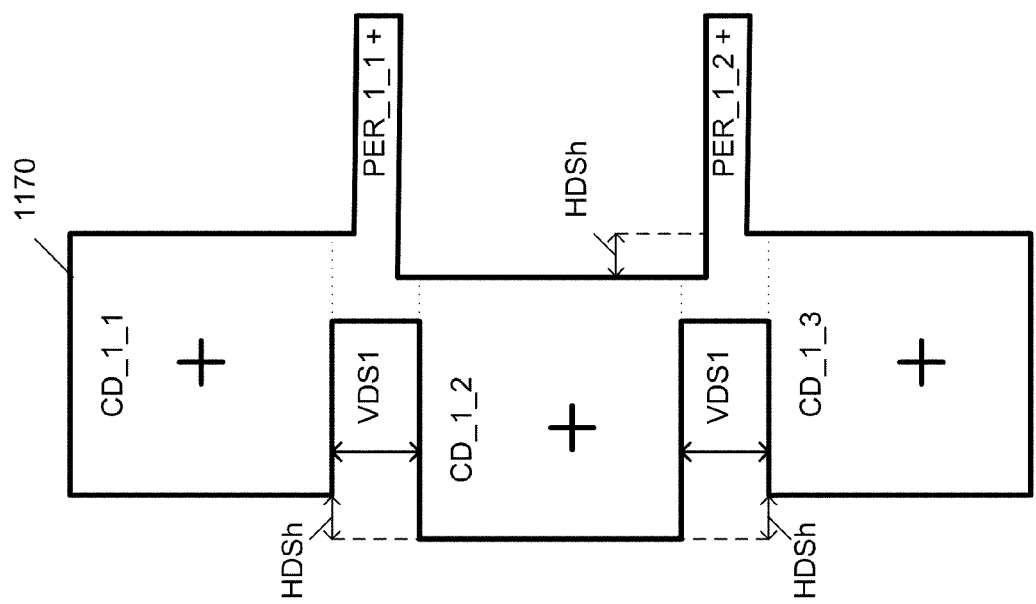

FIG. 11(g) shows color component 1170. Color component 1170 is similar to color component 1110, except that color dots CD_1_1 and CD_1_3 are shifted horizontally from color dot CD_1_2. Specifically, as shown in FIG. 11(g), color dot CD_1_1 is vertically adjacent to and above color dot CD_1_2. However, color dot CD_1_1 is horizontally shifted to the right of color dot CD_1_2 by horizontal dot shift HDSh. Furthermore, color dot CD_1_1 is vertically separated from color dot CD_1_2 by first vertical dot spacing VDS1. Similarly, color dot 1_2 is vertically adjacent to and above color dot CD_1_3. However color dot CD_1_3 is horizontally shifted to the right of color dot CD_1_2 by horizontal dot shift HDSh. Furthermore, color dot CD_1_2 is separated from color dot CD_1_3 by first vertical dot spacing VDS1. Thus, in color component 1170, vertically adjacent color dots are horizontally shifted from each other by a horizontal dot shift HDSh, while in color component 1110 (FIG. 11(a)), vertically adjacent color dots are horizontally aligned.

Polarity extension regions PER_1_1 and PER_1_2 extend to the right of color dots CD_1_1, CD_1_2, and CD_1_3. Polarity extension region PER_1_1 is vertically centered between color dot CD_1_1 and CD_1_2. Polarity extension region PER_1_2 is vertically centered between color dots CD_1_2 and CD_1_3. Polarity extension regions PER_1_1 and PER_1_2 have a rectangular shape with a height that is less than vertical dot separation VDS1 and a width that is approximately one color dot width CDW. In general, the height of polarity extension regions is 4-6 micrometers and the width is 4-6 micrometers less than the color dot width. For example in one embodiment of the present invention of the present invention a color dot has a width of 43 micrometers, a height of 47 micrometers and the polarity extension regions have a width of 37 micrometers and a height of 6 micrometers. In color component 1170, both color CD_1_1 and CD_1_3 are horizontally shifted from color dot CD_1_2 by the same amount and in the same direction. However, in other embodiments of the present invention, color dots may be shifted in different directions and may be shifted by different distances. Furthermore, the various different arrangement of polarity extension regions described above (and below) can be combined with shifted color dots.

The principles of the present invention can encompass a wide variety of color components. One skilled in the art can use the principles described herein to define pixels with color components having differing shapes, number of color components, and number of polarity extension regions. For example, one variant would be to have a color component with two color dots with a polarity extension region extending to the right of the color dots. Other examples can include color components having four color dots with three polarity extension regions.

Figure 12A:
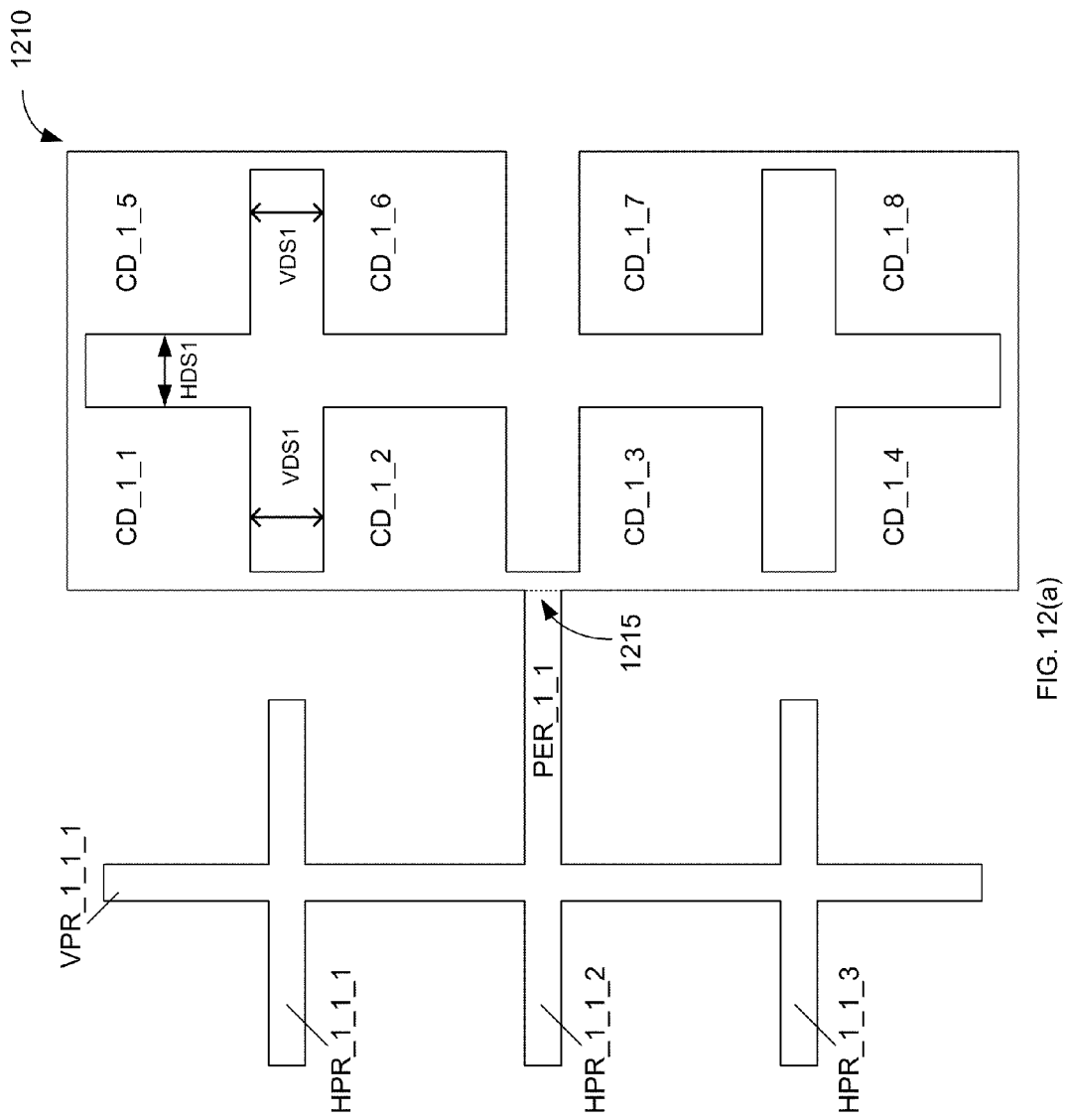

Furthermore, many embodiments of the present invention may use more complex polarity extension regions. For example FIG. 12(a) shows color component 1210 having a complex polarity extension region PER_1_1. For clarity, a dashed line 1215 is used to illustrate a "border" between color dots and the polarity extension region. However, in most embodiments of the present invention the color dots and polarity extension regions share one continuous electrode and are formed in the same metal process to minimize manufacturing cost. As shown in FIG. 12(a), color component 1210 includes eight color dots arranged in an array having two columns of four color dots. The two columns are vertically aligned so that the eight color dots also form four rows of color dots. The columns of color dots are separated by a first horizontal dot spacing HDS1. Each vertically adjacent color dot in a column is separated by a first vertical dot spacing VDS1. Specifically, in the first column of color dots, color dot CD_1_1 is above color dot CD_1_2, which is above color dot CD_1_3, which is above color dot CD_1_4. In the second column of color dots, which is to the right of the first column of color dots, color dot CD_1_5 is above color dot CD_1_6, which is above color dot CD_1_7, which is above color dot CD_1_8. (As explained above in the notation "color dot CD_X_Y", X specifies a color component CC_X within a pixel, while Y specifies the color dots within color component CC_X.) The color dots are electrically coupled along the outer edge of the array of color dots, except for the space between color dots CD_1_6 and CD_1_7. Specifically, the bottom right corner of color dot CD_1_7 is coupled to the top right corner of color dot CD_1_8; the bottom left corner of color dot CD_1_8 is coupled to the bottom right corner of color dot CD_1_4; the top left corner of color dot CD_1_4 is coupled to the bottom left corner of color dot CD_1_3; the top left corner of color dot CD_1_3 is coupled to the bottom left corner of color dot CD_1_2; the top left corner of color dot CD_1_2 is coupled to the bottom left corner of color dot CD_1_1; the top right corner of color dot CD_1_1 is coupled to the top left corner of color dot CD_1_5; and the bottom right corner of color dot CD_1_5 is coupled to the top right corner of color dot CD_1_6. To lower manufacturing cost, the color dots and the connections between the color dots can be formed in a single metal process. However, some embodiments of the present invention may use different process steps to form the color dots and to couple the color dots.

Figure 13A:
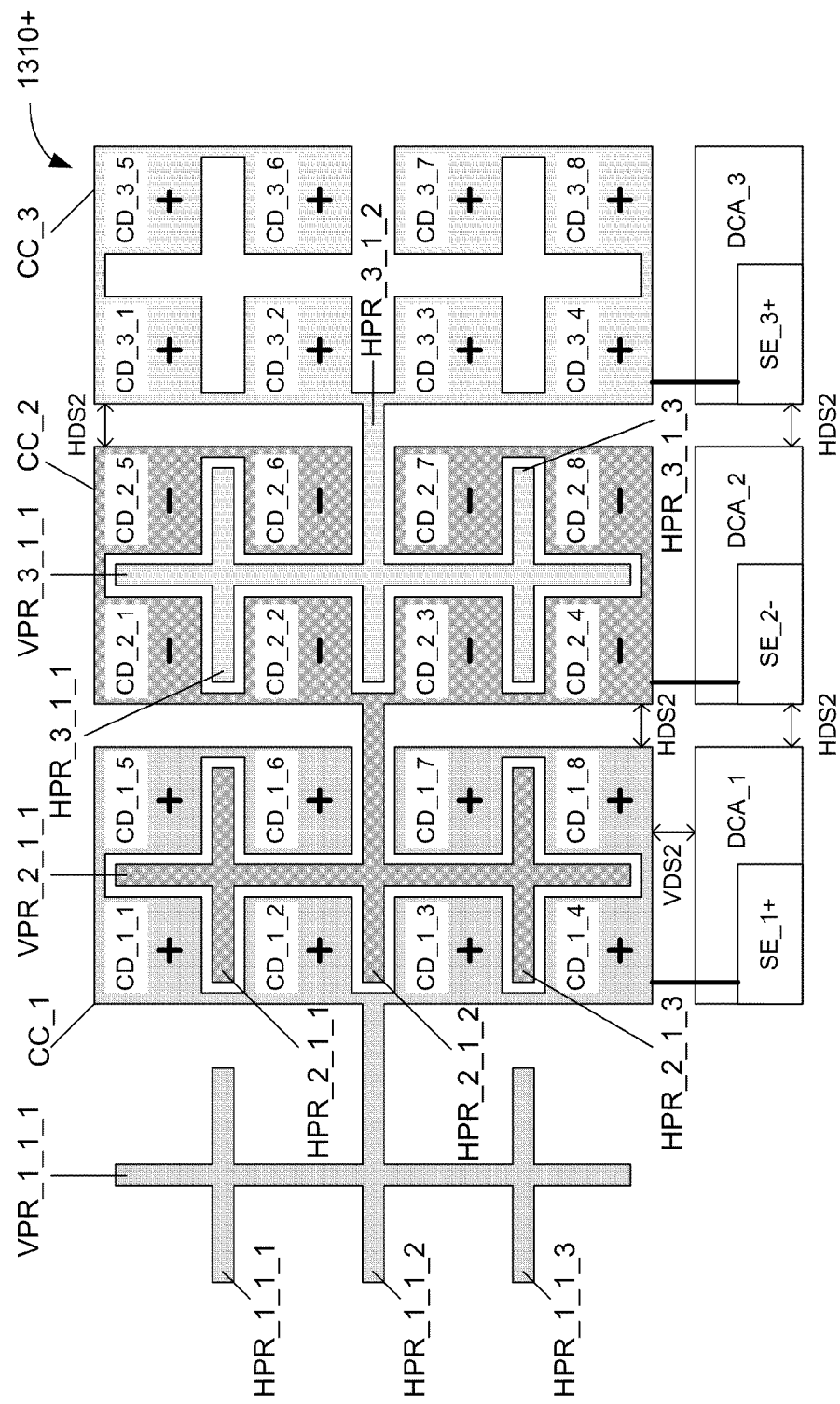
FIGS. 13(a)-13(b) illustrate a pixel design in accordance with one embodiment of the present invention.
Figure 13B:
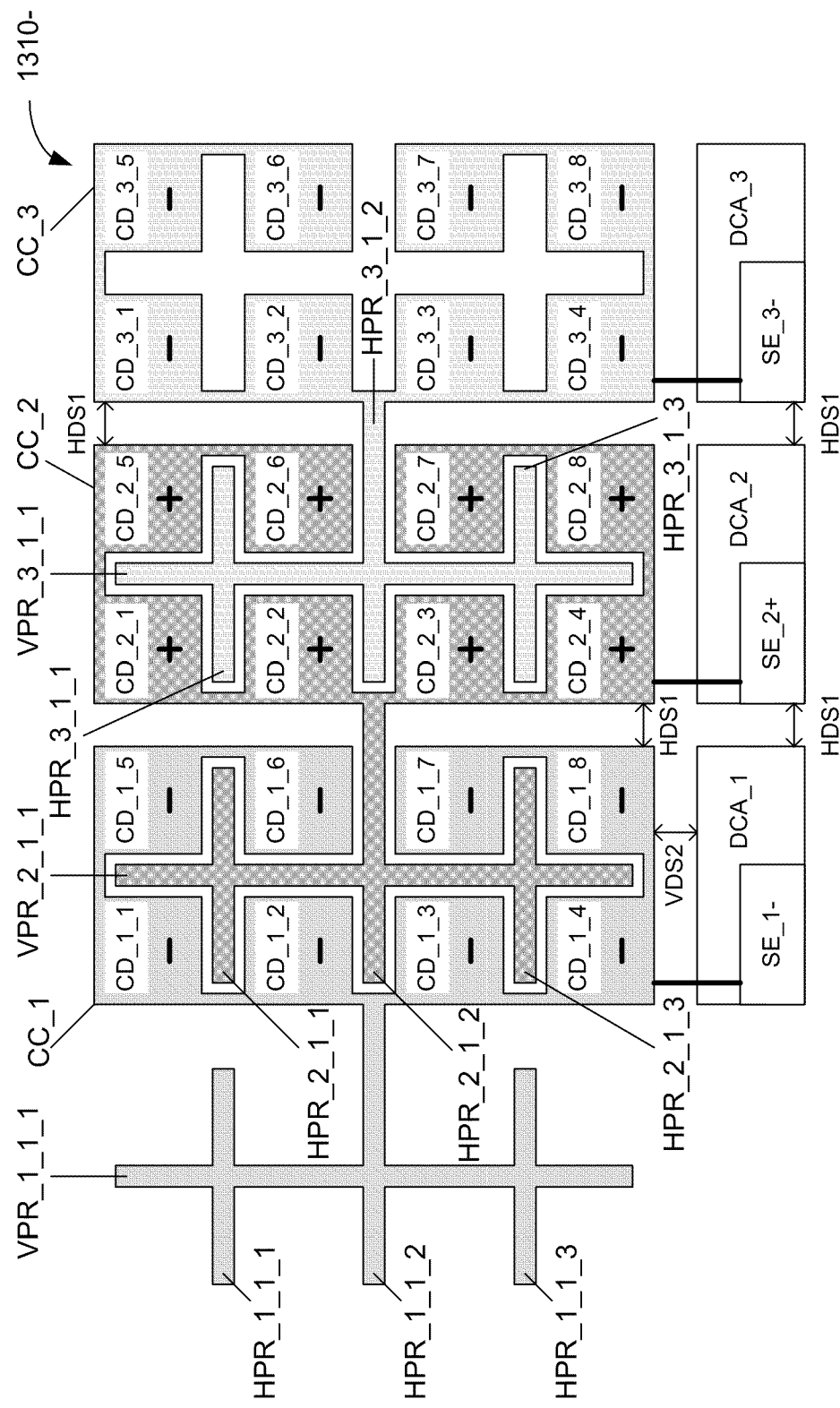
Figure 13C:
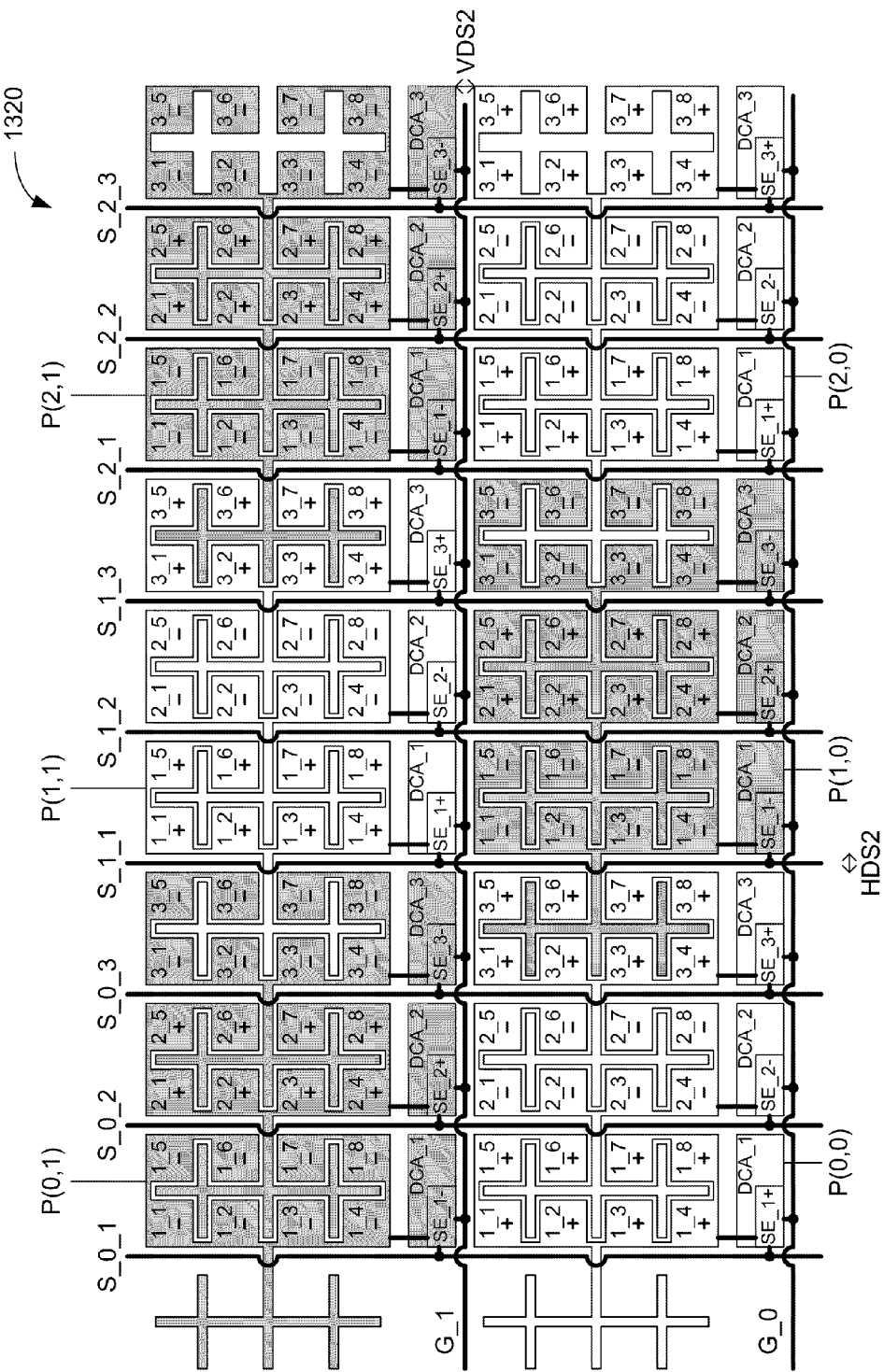
FIG. 13(c) illustrates a liquid crystal display and the associated source lines and gate lines in accordance with one embodiment of the present invention.

Polarity extension regions PER_1_1 extend to the left of the color dots in color component 1210. (As explained above in the notation "polarity extension region PER_X_Y", X specifies a color component CC_X in a pixel, and Y specifies the polarity extension regions in color component CC_X.) Unlike the polarity extension regions described previously, polarity extension region PER_1_1 includes three horizontal polarized regions (HPR_1_1_1, HPR_1_1_2, and HPR_1_1_3) and a vertical polarized region VPR_1_1_1. In the notation "horizontal polarized region HPR_X_Y_Z" and vertical polarized region VPR_X_Y_Z, X specifies a color component CC_X, Y specifies the polarity extension region (i.e. PER_X_Y), and Z specifies the horizontal polarized region or vertical polarized region within the polarity extension region. For clarity, FIG. 12(b) shows color component 1210 with horizontal polarized regions HPR_1_1_1, HPR_1_1_2, and HPR_1_1_3 shaded for clarity. Similarly, FIG. 12(c) shows color component 1210 with vertical polarized region VPR_1_1_1 shaded for clarity. Polarity extension region PER_1_1 is designed to fit in the space between the color dots of an adjacent color component (as illustrated in FIGS. 13(a), 13(b), and 13(c)). Thus, horizontal polarized region_1_2 is coupled to the bottom left corner of color dot CD_1_2 and the top left corner of color dot CD_1_3 and extends to the left of the color dots. The length of horizontal polarized region HPR_1_1_2 is slightly less than the width of two color dots plus the two times the first horizontal dot spacing HDS1. Horizontal polarized region HPR_1_1_1 is vertically aligned between color dots CD_1_1 and CD_1_2 and horizontal polarized region HPR_1_2 is vertically aligned between color dots CD_1_2 and CD_1_3. Horizontal polarized regions HPR_1_1_1 and HPR_1_1_3 are separated from the first column of color dots by slightly more than first horizontal dot spacing HDS1. The length of horizontal polarized regions HPR_1_1_1 and HPR_1_1_3 is slightly less than the width of two color dots plus first horizontal dot offset HDS1. Vertical polarized region VPR_1_1_1 is horizontally centered with horizontal polarized regions HPR_1_1_3 and HPR_1_1_1 and extends from above horizontal polarized region HPR_1_1_1 to below horizontal polarized region HPR_1_1_3. The length of vertical polarized region VPR_1_1_1 is slightly less than four times the height of a color dot plus three times first vertical dot spacing VDS1. In a specific embodiment of the present invention, the height and width of a color component of a display pixel is 300 um and 100 um, respectively, the height and width of the color dots are 58.5 um and 37.0 um, respectively, the first horizontal dot spacing HDS1 is 12 um, the first vertical dot spacing VDS1 is 12 um, the length of horizontal polarized region HPR_1_1_2 is 92 um, the length of horizontal polarized region HPR_1_1_1 and HPR_1_1_3 are 78 um, the height of the horizontal polarized regions is 4 um, length of vertical polarized region VPR_1_1_1 is 254 um, and the width of vertical polarized region VPR_1_1_1 is 4 um.

Color component 1210 can be used with the device component areas, associated dots, and switching element inversion schemes described above and illustrated in FIGS. 7(a)-7(f), 8(a)-8(e), 9(a)-9(f), and 10(a)-10(e). For example, FIGS. 13(a) and 13(b) show different dot polarity patterns of a pixel design 1310 (labeled 1310+ and 1310-) that can be used in displays having a switching element point inversion driving scheme or a switching element column inversion driving scheme.

Pixel design 1310 has three color components CC_1, CC_2 and CC_3, for clarity the color components each color component is shaded differently. Each of the three color components has the same arrangement of color dots (8 color dots) and a polarity extension region (having three horizontal polarized regions and one vertical polarized region) as color component 1210, described above. Pixel design 1310 also includes a switching element for each color component (referenced as SE_1, SE_2, and SE_3). Specifically, Switching elements SE_1, SE_2, and SE_3 are coupled to color component CC_1, CC_2, and CC_3, respectively. Switching elements SE_1, SE_2, and SE_3 are arranged in a row. Device component areas DCA_1, DCA_2, and DCA_3 are indicated around switching element SE_1, SE_2, and SE_3 respectively. Specifically, device component areas DCA_1, DCA_2, and DCA_3 also form a row and are separated by second horizontal dot spacing HDS2, which may differ from first horizontal dot spacing HDS1 of FIG. 12(a). Device component areas DCA_1, DCA_2, and DCA_3, have a width approximately equal to two times the width of a color dot plus the horizontal dot spacing HDS1. Color components CC_1, CC_2, and CC_3 are vertically aligned and arranged horizontally in a row, with the color dots of color components CC_1, CC_2, and CC_3 horizontally aligned with device component areas DCA_1, DCA_2, and DCA_3, respectively. The row of color components is separated from the row of device component areas by vertical dot spacing VDS2, which may differ from vertical dot spacing VDS1 of FIG. 12(a).

The polarity extension region of color component CC_2 is placed in the spaces between the color dots of color component CC_1. Specifically, vertical polarized region VPR_2_1_1 is located between the first column of color dots of color component CC_1 (i.e., color dots CD_1_1, CD_1_2, CD_1_3, and CD_1_4) and the second column of color dots of color component CC_1 (i.e., color dots CD_1_5, CD_1_6, CD_1_7, and CD_1_8). Horizontal polarized region HPR_2_1_1 is located between the first row of color dots of color component CC_1 (i.e. color dots CD_1_1 and CD_1_5) and the second row of color dots of color component CC_1 (i.e. color dots CD_1_2 and CD_1_6). Horizontal polarized region HPR_2_1_2 is located between the second row of color dots of color component CC_1 (i.e. color dots CD_1_2 and CD_1_6) and the third row of color dots of color component CC_1 (i.e. color dots CD_1_3 and CD_1_7). Horizontal polarized region HPR_2_1_3 is located between the third row of color dots of color component CC_1 (i.e. color dots CD_1_3 and CD_1_7) and the fourth row of color dots of color component CC_1 (i.e. color dots CD_1_4 and CD_1_8).

Similarly, the polarity extension region of color component CC_3 is located in the spaces between the color dots of color component CC_2. Specifically, vertical polarized region VPR_3_1_1 is located between the first column of color dots of color component CC_2 (i.e., color dots CD_2_1, CD_2_2, CD_2_3, and CD_2_4) and the second column of color dots of color component CC_2 (i.e., color dots CD_2_5, CD_2_6, CD_2_7, and CD_2_8). Horizontal polarized region HPR_3_1_1 is located between the first row of color dots of color component CC_2 (i.e. color dots CD_2_1 and CD_2_5) and the second row of color dots of color component CC_2 (i.e. color dots CD_2_2 and CD_2_6). Horizontal polarized region HPR_3_1_2 is located between the second row of color dots of color component CC_2 (i.e. color dots CD_2_2 and CD_2_6) and the third row of color dots of color component CC_2 (i.e. color dots CD_2_3 and CD_2_7). Horizontal polarized region HPR_3_1_3 is located between the third row of color dots of color component CC_2 (i.e. color dots CD_2_3 and CD_2_7) and the fourth row of color dots of color component CC_2 (i.e. color dots CD_2_4 and CD_2_8).

The polarity of the color dots, associated dots, polarized extension regions, and switching elements are shown using "+" and "−" signs. Thus, in FIG. 13(a), which shows the positive dot polarity pattern of pixel design 1310+, switching elements SE_1 and SE_3; color dots CD_1_1, CD_1_2, CD_1_3, CD_1_4, CD_1_5, CD_1_6, CD_1_7, CD_1_8, CD_3_1, CD_3_2, CD_3_3, CD_3_4, CD_3_5, CD_3_6, CD_3_7, and CD_3_8; and polarity extension regions PER_1_1 (including vertical polarized region VPR_1_1_1 and horizontal polarized regions HPR_1_1_1, HPR_1_1_2, and HPR_1_1_3) and PER_3_1 (including vertical polarized region VPR_3_1_1 and horizontal polarized regions HPR_3_1_1, HPR_3_1_2, and HPR_3_1_3), have positive polarity as denoted by "+". Switching element SE_2; color dots CD_2_1, CD_2_2, CD_2_3, CD_2_4, CD_2_5, CD_2_6, CD_2_7, and CD_2_8; and polarity extension region PER_2_1 (including vertical polarized region VPR_2_1_1 and horizontal polarized regions HPR_2_1_1, HPR_2_1_2, and HPR_2_1_3) have negative polarity as denoted by "−". Device component areas DC_1, DCA_2, and DCA_3 are not polarized.

FIG. 13(b) shows the negative dot polarity pattern of pixel design 1310−. For the negative dot polarity pattern, switching elements SE_1 and SE_3; color dots CD_1_1, CD_1_2, CD_1_3, CD_1_4, CD_1_5, CD_1_6, CD_1_7, CD_1_8, CD_3_1, CD_3_2, CD_3_3, CD_3_4, CD_3_5, CD_3_6, CD_3_7, and CD_3_8; and polarity extension regions PER_1_1 (including vertical polarized region VPR_1_1_1 and horizontal polarized regions HPR_1_1_1, HPR_1_1_2, and HPR_1_1_3) and PER_3_1 (including vertical polarized region VPR_3_1_1 and horizontal polarized regions HPR_3_1_1, HPR_3_1_2, and HPR_3_1_3), have negative polarity as denoted by "−". Switching element SE_2; color dots CD_2_1, CD_2_2, CD_2_3, CD_2_4, CD_2_5, CD_2_6, CD_2_7, and CD_2_8; and polarity extension region PER_2_1 (including vertical polarized region VPR_2_1_1 and horizontal polarized regions HPR_2_1_1, HPR_2_1_2, and HPR_2_1_3) have positive polarity as denoted by "+". Device component areas DC_1, DCA_2, and DCA_3 are not polarized.

Pixels using pixel design 1310 of FIGS. 13(a) and 13(b) can be used in displays using switching element column inversion driving schemes or switching element point inversion driving scheme. FIG. 13(c) shows a portion of display 1320 using pixels P(0, 0), P(1, 0), P(2, 0), P(0, 1), P(1, 1), and P(1, 2) of pixel design 1310 with a switching element point inversion driving scheme. FIG. 13(c) also shows gate lines G_0 and G_1 and source lines S_0_1, S_0_2, S_0_3, S_1_3, S_1_2, S_1_3, S_2_1, S_2_2, and S_2_3. The color dots of FIG. 13(c) are labeled "X_Y" rather than "CD_X_Y" due to space limitations. In display 1320 the pixels are arranged so that pixels in a column alternate between having the positive dot polarity pattern and having the negative dot polarity pattern and pixels in each row alternate between having the positive dot polarity pattern and having the negative dot polarity pattern. Thus, pixel P(1, 0) in the first row and pixels P(0, 1) and P(2, 1) in the second row have the negative dot polarity pattern. For clarity, pixels P(0, 1), P(1, 0), and P(2, 1) are shaded. Pixels P(0, 0) and P(2, 0) in the first row and pixel P(1, 1) in the second row has the positive dot polarity pattern. However, at the next frame the pixels will switch dot polarity patterns. Thus in general a pixel P(X, Y) has a first dot polarity pattern when X+Y is even and a second dot polarity pattern when X+Y is odd.

Furthermore, in each row of pixels the polarity extension regions of the first color component are placed in between the color dots of the third color component of an adjacent pixel. Thus, a close examination of display 1320 shows that if a color dot has a first polarity, any neighboring polarized components have a second polarity. For example, Color dot CD_3_6 of pixel P(0, 1) has negative polarity while, color dot CD_1_2 of pixel P(1, 1), vertical polarized region VPR_2_1_1, and horizontal polarized regions HPR_2_1_1 and HPR_2_1_2 have positive polarity.

FIG. 13(c) also shows source lines (S_0_1, S_0_2, S_0_3, S_1_1, S_1_2, S_1_3, S_2_1, S_2_2, and S_2_3) and gate lines (G_0, and G_1). In general, a source line S_X_Z and gate line G_Y is used for the color component CC_Z of pixel P(X, Y). Specifically, for a switching element SE_Z in pixel P(X, Y), the first power terminal of switching element SE_Z is coupled to source line S_X_Z, the second power terminal of switching element SE_Z is coupled to color component CC_Z, and the control terminal of switching element SE_Z is coupled to gate line G_Y. For example in pixel P(0, 1), which is controlled by gate line G_1 and source lines S_0_1, S_0_2, and S_0_3, the first power terminal of switching elements SE_1 is coupled to source line S_0_1, the second power terminal of switching element SE_1 is coupled to the electrode color component CC_1, and the control terminal of switching element SE_1 is coupled to gate line G_1. In embodiments of the present invention that use MOS transistors for switching elements, the source terminal of the MOS transistor is equivalent to the first power terminal of the switching element, the drain terminal of the MOS transistor is equivalent to the second power terminal of the switching element, and the gate terminal of the MOS transistor is equivalent to the control terminal of the switching element.

In a specific embodiment of the present invention, the height and width of a color component of a display pixel is 300 um and 100 um, respectively, the height and width of the color dots are 58.5 um and 37.0 um, respectively, horizontal dot spacing HDS1 (FIG. 12(a)) is 12 um horizontal dot spacing HDS2 is 14 um, the vertical dot spacing VDS1 (FIG. 12(a)) is 12 um vertical dot spacing VDS2 is 4 um, the length of horizontal polarized region HPR_1_1_2 is 92 um, the length of horizontal polarized region HPR_1_1_1 and HPR_1_1_3 are 78 um, the height of the horizontal polarized regions is 4 um, length of vertical polarized region VPR_1_1_1 is 254 um, and the width of vertical polarized region VPR_1_1_1 is 4 um.

Even though, AIFF MVA LCDs in accordance with the present invention provide wide viewing angle at a low cost, some embodiments of the present invention use optical compensation methods to further increase the viewing angle. For example, some embodiments of the present invention use negative birefringence optical compensation films with vertical oriented optical axis on the top or bottom substrate or both top and bottom substrates to increase viewing angle. Other embodiments may use uniaxial optical compensation films or biaxial optical compensation films with a negative birefringence. In some embodiments, positive compensation films with a parallel optical axis orientation can add to the negative birefringence film with a vertical optical axis orientation. Furthermore, multiple films that include all combinations could be used. Other embodiments may use a circular polarizer to improve the optical transmission and viewing angle. Other embodiments may use a circular polarizer with the optical compensation films to further improve the optical transmission and viewing angle. Furthermore, some embodiments of the present invention use black matrix (BM) to cover associated dots (ADs) and/or polarity extension regions (PERs) to make the associated dots and/or polarity extension regions opaque. Use of the black matrix improves the contrast ratio of the display and may provide better color performance. In other embodiments, some or all of the black matrix may be removed (or omitted) to make the associated dots and/or polarity extension regions transparent, which would improve light transmittance in the display. Improved light transmittance can lower the power requirements of the display.

In the various embodiments of the present invention, novel structures and methods have been described for creating a multi-domain vertical alignment liquid crystal display without the use of physical features on the substrate. The various embodiments of the structures and methods of this invention that are described above are illustrative only of the principles of this invention and are not intended to limit the scope of the invention to the particular embodiment described. For example, in view of this disclosure those skilled in the art can define other pixel definitions, dot polarity patterns, pixel designs, color components, polarity extension regions, polarities, fringe fields, electrodes, substrates, films, and so forth, and use these alternative features to create a method or system according to the principles of this invention. Thus, the invention is limited only by the following claims.

What is claimed is:

1. A pixel of a display comprising:
a first color component having
a first first-component color dot;
a second first-component color dot adjacent to the first first-component color dot in a first dimension; and
a first first-component polarity extension region coupled to the first first-component color dot and the second first-component color dot, wherein the first first-component polarity extension region extends beyond the first first-component color dot and the second first-component color dot along a second dimension and wherein the first-component polarity extension is located between the first first-component color dot and the second first component-color dot in the first dimension; and
a second color component having:
a first second-component color dot;
a second second-component color dot adjacent to the first second-component color dot in the first dimension;
a first second-component polarity extension region coupled to the first second-component color dot and the second second-component color dot, wherein the first second-component polarity extension region extends beyond the first second-component color dot and the second second-component color dot along the second dimension.

2. The pixel of claim 1, wherein the first color component is offset vertically from the second color component.

3. The pixel of claim 2, further comprising:
a first switching element coupled to the first color component;
a second switching element coupled to the second color component; wherein the second switching element and the first switching element form a switching element row; and
wherein the first color component is on a first side of the switching element row and the second color component is on a second side of the switching element row.

4. The pixel of claim 3, wherein the first switching element and the second switching element are configured with a first polarity.

5. The pixel of claim 3, further comprising:
a first first-component associated dot encompassing the first switching element;
a second first-component associated dot adjacent to the first color component and the first first-component associated dot in the first dimension;
a first second-component associated dot encompassing the second switching element;
a second second-component associated dot, wherein the first second-component associated dot is adjacent to the second second-component associated dot and the second color component; and
wherein the first color component, the second color component, the first first-component associated dot, and the second second-component associated dot are configured to have a first polarity and the second first-component color dot and the first second-component color dot have a second polarity.

6. The pixel of claim 3,
wherein the first color component further comprises
a second first-component polarity extension region coupled to the first first-component color dot, wherein the second first-component polarity extension region extends beyond the first first-component color dot and the second first-component color dot along the second dimension; and
a third first-component color dot adjacent to the first first-component color dot in the first dimension and coupled to the second first-component polarity extension region; and
wherein the second color component further comprises
a second second-component polarity extension region coupled to the second second-component color dot, wherein the second second-component polarity extension region extends beyond the first second-component color dot and the second second-component color dot along the second dimension; and
a third second-component color dot adjacent to the second second-component color dot in the first dimension and coupled to the second second-component polarity extension region.

7. The pixel of claim 3, further comprising
a third switching element adjacent to the second-switching element in the first dimension in the switching element row; and
a third color component coupled to the third switching element having:
a first third-component color dot;
a second third-component color dot adjacent to the first third-component color dot in the first dimension;
a first third-component polarity extension region coupled to the first third-component color dot and the second third-component color dot, wherein the first third-component polarity extension region extends beyond the first third-component color dot and the second third-component color dot along the second dimension; and
wherein the third color component is on the first side of the switching element row.

8. A display comprising:
a first pixel comprising
a first first-pixel color component color component comprising:
a first first-pixel first-component color dot;
a second first-pixel first-component color dot adjacent to the first first-pixel first-component color dot in a first dimension; and
a first first-pixel first-component polarity extension region coupled to the first first-pixel first-component color dot and the second first-pixel first-component color dot, wherein the first first-pixel first-component polarity extension region extends beyond the first first-pixel first-component color dot and the second first-pixel first-component color dot along a second dimension and wherein the first first-pixel first-component polarity extension region is located between the first first-pixel first-component color dot and the second first-pixel first-component color dot;
a second pixel comprising
a first second-pixel color component;
a first second-pixel first-component color dot;
a second second-pixel first-component color dot adjacent to the first second-pixel first-component color dot in the first dimension; and
a first second-pixel first-component polarity extension region coupled to the first second-pixel first-component color dot and the second second-pixel first-component color dot, wherein the first second-pixel first-component polarity extension region extends beyond the first second-pixel first-component color dot and the second second-pixel first-component color dot along a second dimension; and wherein, the first second-pixel first-component polarity extension region extends between the first first-pixel first-component color dot and the second first-pixel first-component color dot.

9. The display of claim 8, wherein:

the first first-pixel color component further comprises
- a third first-pixel first-component color dot adjacent to the second first-pixel first-component color dot in the first dimension; and
- a second first-pixel first-component polarity extension region coupled to the second first-pixel first-component color dot and the third first-pixel first-component color dot, wherein the second first-pixel first-component polarity extension region extends beyond the second first-pixel first-component color dot and the third first-pixel first-component color dot along the second dimension; and the first second-pixel color component further comprises
- a third second-pixel first-component color dot adjacent to the second second-pixel first-component color dot in the first dimension; and
- a second second-pixel first-component polarity extension region coupled to the second second-pixel first-component color dot and the third second-pixel first-component color dot, wherein the second second-pixel first-component polarity extension region extend between the second first-pixel first-component color dot and the third first-pixel first-component color dot along the second dimension.

10. The display of claim 9, wherein the first first-pixel color component further comprises
- a third first-pixel first-component color dot adjacent to the first first-pixel first-component color dot in the second dimension; and
- a fourth first-pixel first-component color dot adjacent to the second first-pixel first-component color dot in the second dimension and adjacent to the third first-pixel first-component in the first dimension; and wherein the first second-pixel first-component polarity extension region comprises:
- a first horizontal polarized region extending between the first first-pixel first-component color dot and the second first-pixel first-component color dot and between the third first-pixel first-component color dot and the fourth first-pixel first-component color dot; and
- a vertical polarized region extending between the first first-pixel first-component color dot and the third first-pixel first-component color dot and between the second first-pixel first-component color dot and the fourth first-pixel first-component color dot.

11. The display of claim 10, wherein the first pixel further comprises a first first-pixel switching element coupled to the first first-pixel color component;

wherein the second pixel further comprises a first second-pixel switching element coupled to the first second-pixel color component; and wherein the first first-pixel switching element and the first first-pixel color component are configured to have a first polarity and the first second-pixel switching element and the first second-pixel color component are configured to have a second polarity.

12. The display of claim 10, wherein the first first-pixel color component further comprises
- a fifth first-pixel first-component color dot adjacent to the first first-pixel first-component color dot in the first dimension;
- a sixth first-pixel first-component color dot adjacent to the third first-pixel-first-component color dot in the first dimension and adjacent to the fifth first-pixel first component color dot in the second dimension;
- a seventh first-pixel first-component color dot adjacent to the second first-pixel first-component color dot in the first dimension; and
- an eighth first-pixel first-component color dot adjacent to the fourth first-pixel-first-component color dot in the first dimension and adjacent to the seventh first-pixel first component color dot in the second dimension;

wherein the first second-pixel first-component polarity extension region further comprises:
- a second horizontal polarized region extending between the first first-pixel first-component color dot and the fifth first-pixel first-component color dot and between the third first-pixel first-component color dot and the sixth first-pixel first-component color dot; and
- a third horizontal polarized region extending between the second first-pixel first-component color dot and the seventh first-pixel first-component color dot and between the fourth first-pixel first-component color dot and the eighth first-pixel first-component color dot; and wherein the vertical polarized region extends between the seventh first-pixel first-component color dot and the eighth first-pixel first-component color dot and between the fifth first-pixel first-component color dot and the sixth first-pixel first-component color dot.

13. The display of claim 10, wherein the first second-pixel color component further comprises
- a third second-pixel first-component color dot adjacent to the first second-pixel first-component color dot in the second dimension; and
- a fourth second-pixel first-component color dot adjacent to the second second-pixel first-component color dot in the second dimension and adjacent to the third second-pixel first-component in the first dimension; and wherein the second pixel further comprises a second second-pixel color component comprising:
- a first second-pixel second-component color dot;
- a second second-pixel second-component color dot adjacent to the first second-pixel first-component color dot in the first dimension; and
- a first second-pixel second-component polarity extension region coupled to the first second-pixel second-component color dot and the second second-pixel second-component color dot, wherein the first second-pixel second-component polarity extension region comprises:
  - a first horizontal polarized region extending between the first second-pixel first-component color dot and the second second-pixel first-component color dot and between the third second-pixel first-component color dot and the fourth second-pixel first-component color dot; and a vertical polarized region extending between the first second-pixel first-component color dot and the third second-pixel first-component color dot and between the second second-pixel first-component color dot and the fourth second-pixel first-component color dot.

* * * * *